US007039821B1

(12) United States Patent
Potega

(10) Patent No.: US 7,039,821 B1
(45) Date of Patent: May 2, 2006

(54) HARDWARE FOR CONFIGURING AND DELIVERING POWER

(76) Inventor: Patrick H. Potega, 7021 Vicky Ave., West Hills, CA (US) 91307-2314

( * ) Notice: Subject to any disclaimer, the term of this patent is extended or adjusted under 35 U.S.C. 154(b) by 0 days.

(21) Appl. No.: 09/475,946

(22) Filed: Dec. 31, 1999

Related U.S. Application Data

(60) Provisional application No. 60/114,412, filed on Dec. 31, 1998.

(51) Int. Cl.
*G06F 1/26* (2006.01)

(52) U.S. Cl. ........................ 713/340; 713/300; 327/100

(58) Field of Classification Search ................. 713/300, 713/310, 320, 330, 340; 327/100, 102, 103; 307/28, 31; 323/313; 345/156; 715/700, 716
See application file for complete search history.

(56) References Cited

U.S. PATENT DOCUMENTS 5,111,148 A * 5/1992 Senoo et al. ................ 324/433
5,160,882 A * 11/1992 Ten Eyck ................... 323/314
5,283,762 A * 2/1994 Fujishima .............. 365/189.09
5,387,820 A * 2/1995 Imagawa ..................... 307/31

* cited by examiner

*Primary Examiner*—Thuan Du

(57) ABSTRACT

Hardware assemblies, either embedded (100) or external (400), which use software (101 or 800) for processes (330 to 356) such as acquiring power-related values (342), principally by the use of a connector (132) that accesses a battery (134), in order for a processor (102) to calculate an optimized power signal (338), and then to configure an output (344) of a power supply (122) to deliver the power signal to a powered device (136).

23 Claims, 45 Drawing Sheets

Software for In-line Corded Device

Vmin and Vmax Compared to Standard Battery Pack Voltages

| Voltages Are Shown As Design Minimum/Maximum Values | | | | | |
|---|---|---|---|---|---|
| | Ni-Cad | NiMH | Li-Ion (Coke) | Li-Ion (Graphite) | Li-Polymer |
| Cell Voltage | 1.25/1.299 | 1.25/1.32 | 2.50/4.20 | 3.60/4.10[1] | 3.0/4.20 |
| Cells/Pack[2] | | | | | |
| 3 | --- | --- | 7.50/12.60 | 10.80/12.30 | 9.0/12.60 |
| 4 | 5.00/5.196 | 5.00/ 5.28 | 10.00/16.80 | 14.4/16.4 | 12.0/16.80 |
| 6 | 7.5/7.794 | 7.5/7.92 | 7.50/12.60 | 10.8/12.3 | 9.0/12.60 |
| 8 | 10.0/10.392 | 10.0/10.56 | 10.00/16.80 | 14.4/16.4 | 12.0/16.80 |
| 10 | 12.5/12.99 | 12.5/13.2 | --- | --- | --- |
| 12 | 15.00/15.588 | 15.00/15.840 | --- | --- | --- |
| Minimum Cell Voltage[3] | | | | | |
| 4 | 4.00 | 4.00 | 10.00 | 10.00 | 10.00 |
| 6 | 6.00 | 6.00 | 7.50 | 7.50 | 7.50 |
| 8 | 8.00 | 8.00 | 10.00 | 10.00 | 10.00 |
| 10 | 10.00 | 10.00 | --- | --- | --- |
| 12 | 12.00 | 12.00 | --- | --- | --- |
| Load Current[4] | >1C | 0.5C | 1C | 1C | 1C |

[1] Graphite-based Li-Ion cells are rated @ 3.0-4.1 VDC. Coke-based Li-Ion cells are rated @ 2.5-4.2 VDC.

[2] Voltage and cells-per-pack do not take into consideration whether cells in a pack are series or parallel wired. For example, a 14.4-volt Li-Ion pack can have two cell wiring configurations. Four-cell packs yield a 14.4 VDC pack rated @ 2025 MAh, while 8-cell packs are rated @ 14.4 VDC 4050 MAh.

[3] "Minimum Cell Voltage" is the lowest voltage to which a cell can safely be discharged.

[4] Load current is typically expressed as a ratio of charge rate.

| Connector Position | Software/Hardware Sensing Function |
|---|---|
| Not Connected | Sense voltage first. If no voltage detected, apply low power and sense current.[1] |
| Position #1 (To Battery Cells) | Sense voltage.[2] |
| Position #2 (To Powered Device) | Sense voltage first. If no voltage detected, apply low power and sense current.[3] |

[1] If connector cover 530 in Fig. 6D is used, the resistive value of element 534 is predetermined and available in a software look-up table.
[2] Voltage detected will be from the battery, and not the power supply.
[3] Detected current will not be the same as that in footnote #1.

| Look-up Table: Line Load (Resistive Values) | | |
|---|---|---|
| Line Load (Ω Value)[1] | Identifier | Hardware Description |
| .20 Ohms | $LL^0$ | No power cord (power receptacle empty) |
| .45 Ohms | $LL^1$ | Power cord only (no connector attached) |
| .85 Ohms | $LL^2$ | Power cord, with connector attached (connector cap is attached) |
| .60 Ohms | $LL^3$ | Power cord, with connector attached (connector cap removed). Assembly is not inserted in battery pack. |
| $LL^4 = LL^3$ + Variable[2] | $LL^4$ | Power cord, with connector attached (connector cap removed). Assembly inserted in battery pack, but with GREEN Side #2 upward (correct insertion, but battery pack removed). |
| $LL^5 = LL^3$ + Variable[3] | $LL^5$ | Power cord, with connector attached (connector cap removed). Assembly inserted in battery pack, but with GREEN Side #2 upward (correct insertion, battery pack inserted in powered device). Powered Device is OFF. |
| $LL^5$ @ Vout | $LL^6$ | Computed value of $LL^5$ @ Vout. Basis is $LL^5$ @ low voltage. |
| $LL^7 = LL^6$ + Variable[4] | $LL^7$ | Power cord, connector assembly inserted #2, with powered device's switch turned on (computed @ Vout). |

Allowable error = 5%

[1] The Ohm values shown are not necessarily indicative of actual resistance readings of actual devices. Since resistive values of any element can be manipulated at the time of manufacture, it would be prudent to use resistors to rectify any deviation from a set target value.

[2] The added load of a removed battery pack cannot be determined as a real-time event, but can only be a pre-determined load, or range of loads.

[3] "Variable" is added load of powered device circuits between the battery pack and the ON/OFF switch.

[4] "Variable" is a detectable (and likely significant) increase in powerline load, as compared to known value $LL^6$.

HARDWARE FOR CONFIGURING AND DELIVERING POWER

This application claims benefit of 60/114,412, filed Dec. 31, 1998.

FIELD OF THE INVENTION

The invention relates to hardware, specifically to such hardware assemblies that interact with software to configure an optimized power signal that is delivered to a powered device.

CROSS-REFERENCE TO RELATED APPLICATIONS

This application claims priority of "Hardware to Configure Battery and Power Delivery Software," U.S. Provisional Patent Application No. 60/114,412, dated Dec. 31, 1998; and claims benefit of "Systems for Configuring and Delivering Power, " International Patent Application No. PCT/US99/31195, dated Dec. 31, 1999; and "Software for Configuring and Delivering Power," U.S. patent application Ser. No. 09/475,945, dated Dec. 31, 1999 (previously filed as "Software to Configure Battery and Power Delivery Hardware," U.S. Provisional Patent Application No. 60/114,398, dated Dec. 31, 1998.) Further benefit is claimed of "Universal Power Supply," now U.S. Pat. No. 6,459,175, issued Oct. 1, 2002, previously filed as U.S. patent application Ser. No. 09/193,790, dated Nov. 17, 1998 (also as International Patent Application No. PCT/US98/24403, dated Nov. 17, 1998, dated Nov. 17, 1998, and issued as Singapore Patent No. 73192, Jun. 11, 2002), filed previously as U.S. Provisional Patent Application No. 60/065,773, dated Nov. 17, 1997; "Power Supply Methods and Configurations," (a division of "Universal Power Supply") filed as U.S. patent application Ser. No. 10/262,380, dated Sep. 30, 2002; and "Method and Apparatus for Transferring Electrical Signals Among Electrical Devices," now U.S. Pat. No. 6,634,896, issued Oct. 21, 2003, previously filed as U.S. patent application Ser. No. 09/378,781, dated Aug. 23, 1999 (and as International Patent Application No. PCT/US99/19181, dated Aug. 23, 1999, withdrawn Oct. 6, 2004) as a CIP of "Apparatus for Monitoring Temperature of a Power Source," now U.S. Pat. No. 6,152,597 issued Nov. 28, 2000, filed previously as U.S. patent application Ser. No. 09/105,489, dated Jun. 26, 1998 (and as International Patent Application No. PCT/US98/12807, filed Jun. 26, 1998), filed previously as U.S. Provisional Patent Application No. 60/051,035, dated Jun. 27, 1997, and "A Resistive Ink-Based Thermistor," U.S. Provisional Patent Application No. 60/055,883, dated Aug. 15, 1997, and "Apparatus for a Power and/or Data I/O," U.S. Provisional Patent Application No. 60/097,748, filed Aug. 24, 1998. This application further claims the benefit of "Apparatus for Enabling Multiple Modes of Operation Among a Plurality of Devices," filed as U.S. patent application No. 09/699,216, dated Oct. 27, 2000, a CIP of "Apparatus for Monitoring Temperature of a Power Source," ∂as well as three divisionals of[ "Methods and Apparatus for Transferring Electrical Signals Among Multiple Devices," Pat. No. 6,634,896, issued Oct. 21, 2003, specifically, "Connector Assembly for Electrical Signal Transfer Among Multiple Devices," now U.S. Pat. No. 6,866,527, issued Mar. 5, 2005, filed previously as U.S. patent application Ser. No. 10/403,253, dated Mar. 31, 2003, "Positionable Inter-Connect Apparatus for Electrically Coupling Selected Electrical Devices, U.S. patent application Ser. No. 10/401,637, dated Mar. 27, 2003, and "Interface Apparatus for Selectively Connecting Electrical Devices," U.S. patent application Ser. No. 10/402,709, dated Mar. 29, 2003.

SUMMARY OF THE INVENTION

According to the present invention, electronic processor assisted methods for hardware assemblies and related software to acquire and analyze information about the power requirements of a powered device, then to configure a power source (which may be embedded, or external) to deliver an optimized power signal to said powered device. These methods may be effected, for example, by a processor implementing a sequence of machine-readable instructions. These instructions may reside in various types of signal-bearing media. In this respect, another embodiment of the present invention concerns a programmed product which includes a signal-bearing medium embodying a program of machine-readable instructions, executable by a digital processor to perform method steps to effect battery and power delivery procedures of the present invention. The signal-bearing media may include, for example, random access memory (RAM) provided within, or otherwise coupled to, the processor.

Alternatively, the instructions may be contained in other signal-bearing media, such as one or more magnetic data storage diskettes, direct access data storage disks (e.g., a conventional hard drive or a RAID array), magnetic tape, alterable or non-alterable electronic read-only memory (e.g., EEPROM, ROM), flash memory, optical storage devices (e.g., CD-ROM or WORM), signal-bearing media including transmission media such as digital, analog, and communication links and wireless, and propagated signal media. In an illustrative embodiment, the machine-readable instructions may constitute lines of compiled "C" language code or "C++" object-oriented code.

OVERVIEW

The hardware and software herein can be represented in a multiplicity of modalities, as illustrated in the various figures, and as discussed in the Description. This Overview is intended to describe the hardware and software in a basic way, in order to better indicate the inter-connectivity and inter-operability of the various major elements of the invention. Specific details of hardware elements and software processes are not within the scope of this overview. References to figures (and their related text in the Description) should be used to provide more details than are available in this simplified overview.

FIG. 2B depicts an embedded power assembly 100. "Embedded" indicates that assembly 100 is permanently located and non-transportable. A non-limiting example of such an embedded power assembly would be an assembly 100 mounted beneath a passenger seat on a commercial aircraft. Passengers can access a power assembly 100 in order to power various electronic devices they bring aboard the aircraft, such as laptop computers, personal video viewers, audio players, etc. Power assembly 100 provides an accessible power port 103 which, in the aircraft example, is typically a female receptacle mounted on (or in the vicinity of) the aircraft seat's armrest.

Continuing the example cited, passengers can bring abroad a variety of powered devices 136 in FIG. 2, ranging from laptop computers (which can require specific input voltages in the range of 12–24 VDC), to personal video viewers and hand-held video game players (which can operate at input voltages from 3–9 volts). Historically, the embedded power unit in an aircraft seat has output a fixed voltage (15 VDC). Passengers accessing the embedded power unit were required to bring aboard an external DC/DC power adapter, which converted the fixed 15-volt source at the seat to the correct voltage for a particular powered device.

Embedded power assembly 100 (FIG. 2B) solves the issue of a passenger being required to provide a suitable power adapter. Assembly 100 has a configurable power supply 122, which can be controlled by MCU 102 to output a voltage (in a range from 3–24-volts) compliant with a multiplicity of powered devices 136. Thus, as shown in FIG. 2B, a simple two-conductor power cord assembly 115A can be used to deliver power from an embedded power assembly 100, to a variety of powered devices 100. A low-cost cord 115A can be provided by the airline, in the non-limiting example cited, thus eliminating the need for a passenger to carry a dedicated power adapter for every electronic (or electrical device).

Peculiarities of Powering Devices

Powered devices 136 (FIG. 2B) not only have particular input voltage requirements, but they also typically require a unique connector at their power ports 109A. To date, over 40 power connector variants have been identified just for laptop computers. Often, similarly dimensioned connectors (e.g., a variety of connectors generically classified as "5 mm barrel connectors," will mechanically fit powered devices for which they were not intended. Both voltage mismatches, and/or reversed polarity, can result from this power connector inter-changeability.

The invention employs a power connector 132 (FIG. 2B), which attaches to a powered device 136 at its battery pack 134, instead of at the traditional power-input port 109A found on today's electronic equipment. By attaching to a powered device's battery pack, the number of connector variants can be specific to battery connections (see FIGS. 6A, 6F-, 7, and 8). Another benefit achieved by powering a powered device 136 through its battery port is that a power assembly 100 can easily identify the correct voltage required by a particular powered device. One method of performing a voltage identification is for MCU 102 to sample—on powerlines 114 and 166—the voltage of a battery 134. MCU 102's software 101 executes a process to acquire, and optimize, what becomes the output voltage requirement for configurable power supply 122. MCU 102 then uses that voltage information, sending a voltage-control signal along line 130B to configurable power supply 122. Power supply then outputs the correct voltage signal on conductors 118 and 120. When MCU 102 closes powerline switches 112A, the power signal travels through connector 103, then along powerlines 114 and 116, into connector 132. Connector 132 is unique, in that by inserting it in one of its two positions, it creates an electrical path within battery pack 134 which bypasses the battery cells. This temporary bypass circuit reroutes the incoming power signal directly to the powered device 136. Powered device 136 recognizes the power as being delivered from its battery 134, while the actual power source is the embedded power supply 100. When power adapter assembly 400A is used in place of power cord assembly 115A, powered device 134 gets its power from power box 400.

Placing a power connector interface in a battery pack also allows users to upgrade their equipment to be compliant with a power assembly 100 (FIG. 2B). Batteries, whether rechargeable or primary, are virtually always user removable (or replaceable). Since batteries wear out and need replacing periodically, users need only replace a worn battery pack with a unit configured with a connector 132. Thus, a battery-based power connector is a convenient, and low-cost, way to upgrade almost any powered device. As discussed above, user costs are further reduced by eliminating the need to purchase the traditional external power adapter required to connect to embedded power systems on aircraft (or in an automobile, as the cigarette-lighter power port). Furthermore, safety is achieved by an embedded power assembly 100 being able to power a device 136 with the right voltage. Further safety is achieved by switches 112A changing the polarity on powerlines 114 and 116 (see FIG. 13A and the related text for details).

When external power adapter assembly 400A is attached to embedded power supply 100, the two devices are capable of communicating with each other. One of the communications methods described herein is powerline modulation. This inter-device communication capability allows both assembly 100 and 400A to interact constructively (see FIG. 13A, and related text). The communications link between external adapter assembly 400A also extends to communicating with a smart battery 134, so that the smart battery can communicate data such as the battery manufacturer's design voltage, remaining battery capacity, etc.

Interchangeable Power-Delivery Hardware

Embedded power assembly 100 (FIG. 2B) can power a powered device 136 using a simple power cord assembly 115A, comprised of a connector 103, power conductors 114 and 116, and a battery connector 132. But, as previously indicated, there are embedded power supplies which output a fixed voltage. Non-limiting examples of fixed-voltage power assemblies include the aircraft seat units already indicated, as well as a fixed-voltage car cigarette-lighter port (SAE spec J1211) indicates a design voltage for a cigarette lighter port as 9–16 VDC, but the typical nominal voltage delivered in most cars is in the 11–14 VDC range. Users of powered devices 1365 which are equipped with a battery pack 134 should be able to connect their powered devices to their cars, or to aircraft seats that deliver a fixed 15-volt output.

External power-conversion adapter assembly 400A (FIG. 2B) operates in most ways just like embedded power assembly 100. Power converter box 400 also has an MCU, a configurable power converter, powerline switches, and this hardware operates with software 800 (detailed drawings of a generic power box 400 appear as FIG. 13A, and software 800 is illustrated as flowchart 800 in FIGS. 1A-1–1A-9). Power cords 505 and 507 are analogous to power cords 114 and 116 in cord assembly 115A. Connector element 103 is interchangeable with that element of cord assembly 115A, so that either simple power cord assembly 115A, or power adapter assembly 400A can be connected to an embedded power assembly 100.

External Power Adapter Variants

As with an embedded power assembly 100 (FIG. 2B), so too with external power assembly 400A is there an implicit "Universal" power-delivery capability. One external adapter 400, that is capable of configuring its power output to match the various voltage input requirements of a multiplicity of powered devices 136, can replace a number of discrete, device-specific power adapters. The Description discusses a number of ways that a single external adapter 400 can replace the various variants of device-specific adapters commonly available.

Today's electronics goods, whether they be notebook computers, handheld video game machines, Personal Digital Assistants (PDAs), tape recorders, or any other type of battery-powered devices, usually ship with an AC/DC adapter. If the user wants to use the devices while traveling in a car, or on a plane, a separate DC/DC power adapter may be either available from the device manufacturer, or can be purchased in the aftermarket. Purchasing such optional external adapters from the manufacturer can be costly, or the manufacturer may not offer such a product (less than 50% of laptops even have an aircraft-style power adapter available at all, and few OEM laptop vendors offer such a product).

In the electronics goods aftermarket, companies like Radio Shack (Fort Worth, Tex.), and Targus (Irvine, Calif.), offer power adapters specific to laptop computers, but these are often costly (80–129 U.S.), and experience has shown that it can take many weeks to get delivery of such products. Once the purchaser disposes (or upgrades to a newer model) of the powered device, the power adapter usually cannot be reused, and must be discarded. Also, as previously indicated, there is a risk of connecting the wrong adapter to a particular powered device. This problem is especially pronounced in larger companies, where a variety of laptop computer models and brands may be used, and there are power adapters on hand that look similar to each other, have mechanically-compatible connectors, yet deliver non-compatible voltages.

"Universal" power adapters are available in the marketplace. Radio Shack, for example, stocks power adapters with selectable voltage dials, so that a user can manually set an output from as many as six voltages. Other adapter vendors, such as Targus, and Nesco (Van Nuys, Calif.), offer so-called "universal" adapters that require a user to mate a particular connector tip (or power cord/tip assembly), in order to achieve a particular output voltage. While these devices may offer some slight cost savings over dedicated, device-specific power adapters, they can hardly be considered universal. Not all connector tips offered by Targus, for example, cover the over 250 models of laptop computers in the marketplace (Targus claims compatibility with only IBM, Toshiba and Compaq). Both the Targus interchangeable connector tips, and the Nesco "smart" power cords suffer from the already-identified problem of power connectors that mechanically are interchangeable among a variety of non-voltage-compatible devices, so a user is still faced with the problem of configuring the power adapter in a way that results in an incorrect voltage being delivered to a particular laptop.

In summary, users are faced with either purchasing costly device-specific power adapters, having to deal with knowing enough about a powered device's voltage requirements to properly turn a dial on a manually-selectable power adapter's dial, or to configure connector tips or cords in a way that will exactly match the power requirements of a particular powered device. Power adapter assembly 400A (FIG. 2B) solves these problems. Power box 400 automatically configures its output voltage, based on power requirements its MCU and software 800 acquire from a powered device's battery.

Power box 400 can exist in several variants. A simple power module (see FIG. 11) connects between a user's fixed-voltage, device-specific external adapter and a powered device, in order to confirm that the output voltage of the fixed-voltage adapter is compatible with the powered device requirements. This intermediate module can also assist a user in setting the dial of a multi-voltage selectable power module to a correct voltage.

In another modality, a manually-selectable voltage adapter can have sufficient hardware and software from a power box 400 (FIG. 2B) incorporated so that a user receives a visual indicator—such as an LED—to indicate that a correct voltage has been matched on a voltage-indicator dial (see FIG. 13-1). The adapter in FIG. 13 also represents a data-enabled external adapter, which is capable of various data communications with an embedded power supply, or a powered device. The hardware and software of a power box 400 can even be integrated into a battery pack, as indicated in FIG. 10, which would result in either the elimination of any external adapters at all, or in a battery pack providing an LED indicator when the correctly matched adapter is in the circuit.

Thus, an external power-conversion adapter assembly 400A can replace (or enhance the proper operation of) a variety of commonly available power adapters, with a single "one-size-fits-all" adapter that is used with a multiplicity of powered devices.

As presented herein, software associated with adapter assembly 400A assumes that every battery-powered device to which the adapter will be connected is previously unknown and, as such, the software performs various acquisition and evaluation operations directed to the device's battery each time a device is connected.

LIST OF DRAWING FIGURES

FIG. 1A-1–1A-9 depict a flowchart of the software processes that primarily operate with external power hardware.

FIG. 2 is a diagrammatic illustration of an embedded power supply and a powered device.

FIGS. 4-1 and 4-2 (prior art) illustrate a schematic of a generic switching power supply configured to be controllable by a microcontroller, or other external processor.

FIG. 5 (prior art) shows a schematic of the microcontroller in FIGS. 3A and 3B, configured to control a switching power supply such as that shown in FIGS. 4-1 and 4-2.

FIGS. 6 to 6C illustrate a male connector, and (diagrammatically) its mating female receptacle with related circuits created when the male connector is inserted in two positions.

FIGS. 6E to 6F–1 depict a variant of the connector assembly in FIGS. 6–6C with two placements of a diode in the circuit.

FIG. 7 illustrates a flexible connector interface that can be installed in battery-powered devices to redirect power to a battery, or to a powered device.

FIG. 8 shows a multi-contact male connector (plug) which can be rotated to create different electrical paths to a battery, or a powered device.

FIGS. 13 and 13-1 illustrate the details of an external power adapter that has a manually-selectable output voltage, and wired and wireless data ports.

FIG. 15 illustrates a look-up table in chart form which associates a battery's minimum and maximum voltages with individual cell voltages and the number of cells in a battery pack.

FIG. 17 illustrates a chart listing the three positions of a connector in FIGS. 6–6C.

FIG. 20 illustrates a lookup table used by software in FIGS. 1-1–1-4 and FIGS. 1A-1–1A-9, which correlates line load values to various hardware states.

HARDWARE

Figure 1:
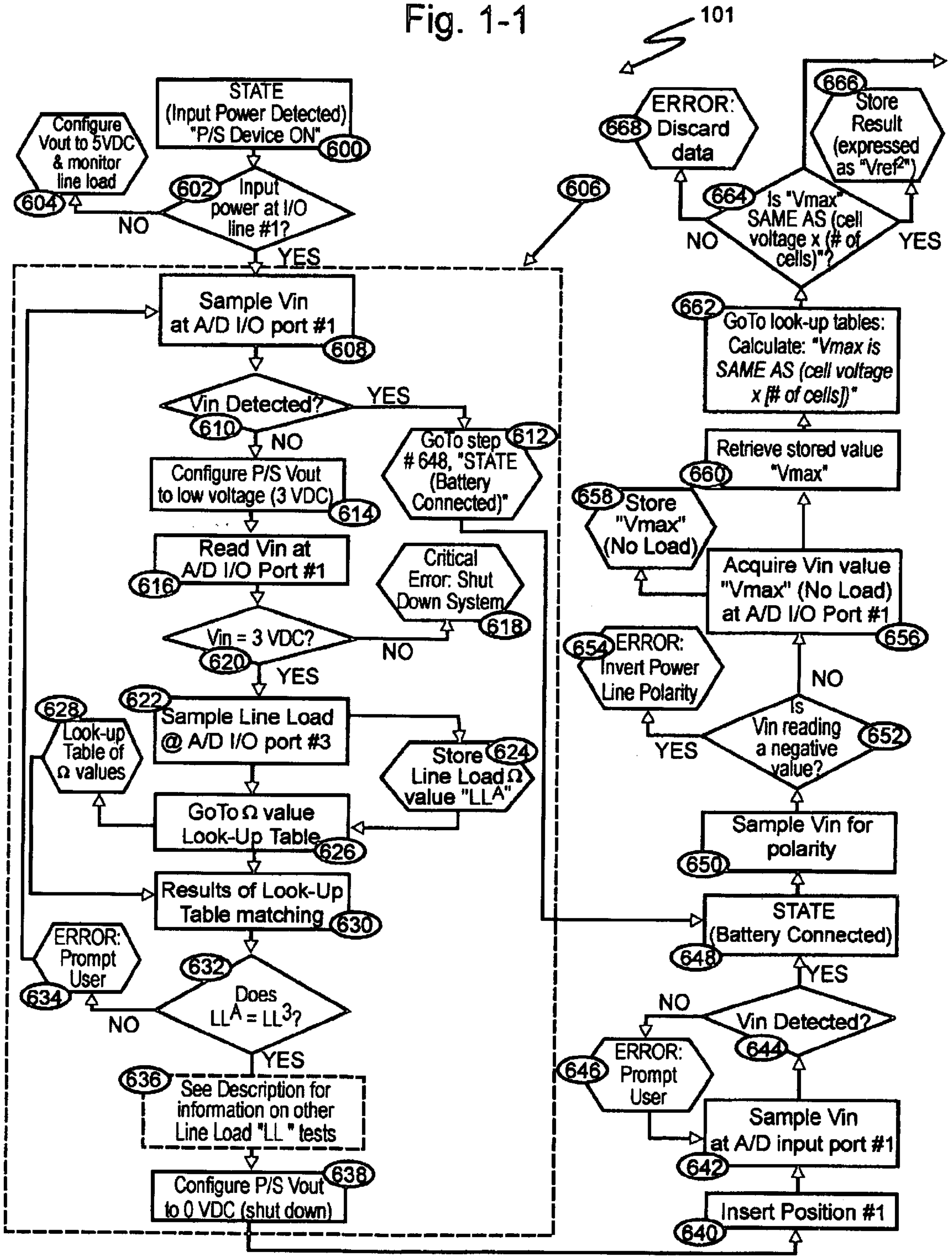
FIGS. 1-1–1-4 illustrate in flowchart form the processes of software that primarily operates with embedded power hardware.

Note: Matter presented in this section is often also described in other sections, such as in the various software. Any relevant matter is assumed to be included here by reference, as if it were presented here in fill.

Principally, a software program operates on a hardware platform comprised of a processor, memory (both volatile or non-volatile), controller, and at least one data-acquisition I/O port. A configurable power supply can be used, but such a device is not essential to the operation of the software. The elements can be combined as a single device (as a non-limiting example, a microcontroller), or as discrete sub-assemblies in a multiplicity of combinations. Some or all of the elements can be included in a configurable power supply.

One of the principal functions of the hardware, when used with software 101 (FIGS. 1-1–1-4) or software 800 (FIGS. 1A-1–1A-9) is to acquire information from a powered device about its power requirements, such as its actual input voltage parameters (and perhaps current-load). For example, a device's power-requirement information can be acquired as an analog voltage signal from a battery pack 134, as is shown in FIG. 2. Battery voltage (and/or current) is converted at MCU 102 in hardware assembly 100 to a digital data signal. A digital signal is processed, as described in software 101 and 800, and sent as a voltage command to configurable power supply 122. Power supply 122 configures its output voltage based on information from a processor in MCU 102. Thus, powered device 136's correct voltage is properly delivered to it by power supply 122, along conductors 114 and 116 in FIG. 2. Assembly 100 in FIG. 2 can also monitor the electrical load of powered device 136 (see U.S. patent application Ser. No. 09/193,790, and International Application No. PCT/US98/24403).

Digital Data

Information about the proper input voltage requirements of a powered device 136 (FIG. 2) can also be from data stored in a powered device 136. Powered device's memory 104B (volatile or non-volatile) stores information, which is retrieved by resident software. Through a multiplicity of available data I/O ports at powered device 136, voltage information is delivered to an appropriate I/O port at hardware assembly 100 in FIG. 2. Prior art FIGS. 3A and B show a variety of data I/Os at MCU 102. Synchronous, serial, and $I^2C$ data links can be created, as a non-limiting example of data I/Os. Should powered device 136 be capable of storing its voltage and load requirements as digital data, that data being communicated to hardware assembly 100 by a multiplicity of methods, including but not limited to, powerline modulation, and wireless infrared.

FIG. 2 shows two conductors 114 and 116 that electrically connect hardware assembly 100 to powered device 136, via associated battery pack 134. These two conductors can function as data lines, as well as powerlines. This would be practical if battery pack 134 is a "smart" battery capable of data communications. Smart batteries, non-limiting examples of which are those defined in the SMBus specifications (available at www.sbs-forum.org), can be modified to include a modulator/demodulator for powerline modulation. Also, revisions to the SMBus specifications allow for battery and host data available on a standard PCI bus. Conductors 114 and 116 can be used for powerline modulation, or additional lines can be added (SMBus is a four-wire data bus, and Dallas 1-Wire only requires three).

As shown in FIG. 2, two-wire analog data acquisition is achievable using powerline modulation. This shared two-wired power and data topology is viable because power supply 122 is controllable, so it can be shut down, or reconfigured to a compatible voltage with powerline modulation during periods of data acquisition.

Alternative Data Acquisition

Figure 3A:
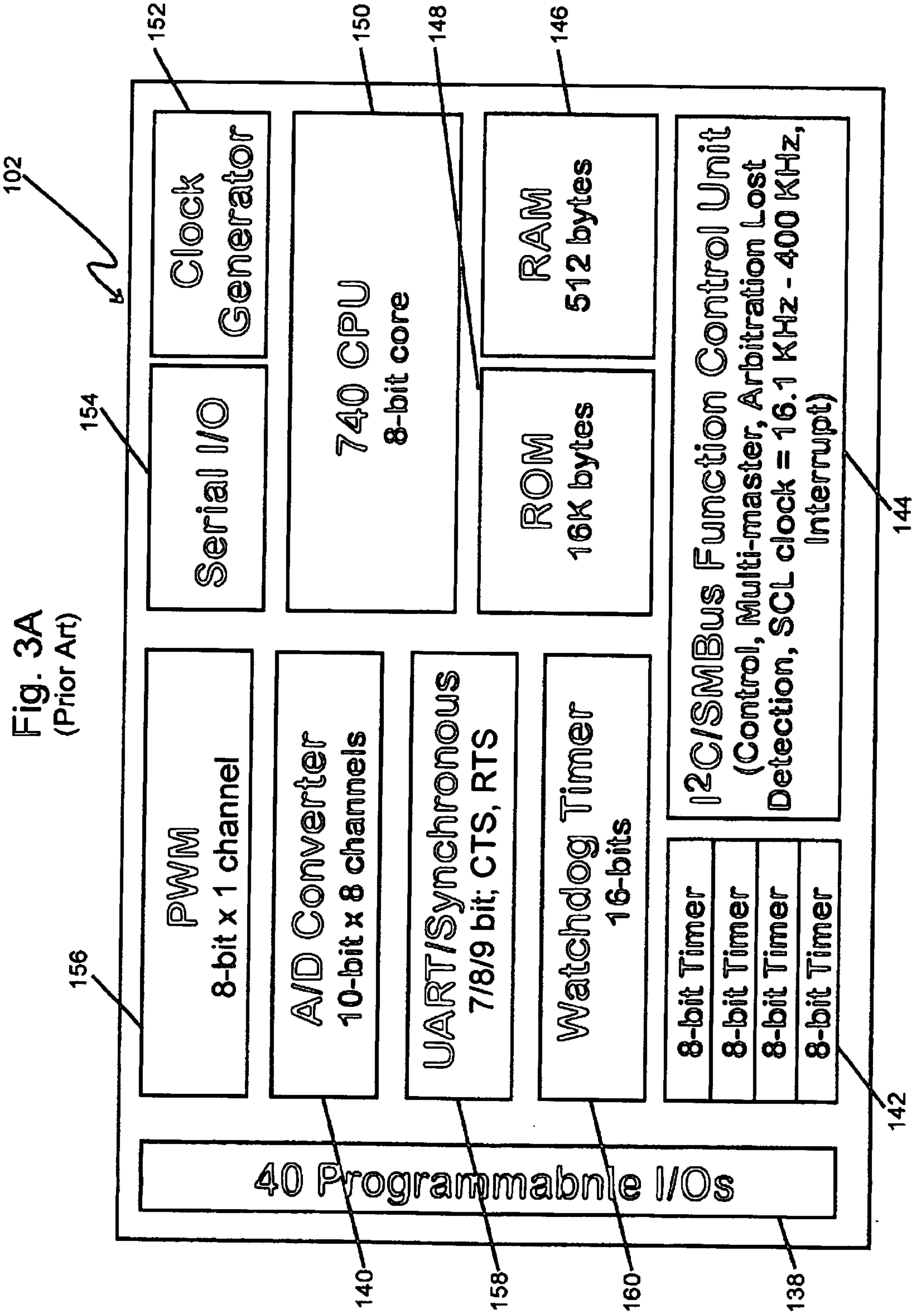
FIG. 3A (prior art) shows the elements in a typical microcontroller unit (MCU).

The 40 programmable I/Os 138, or serial I/O 154, in FIG. 3A can be used to create a digital data path. As a non-limiting example, 40 programmable I/Os 138 can create a parallel port. Serial I/O 154 can be, as another non-limiting example, configured to drive an infrared or RF circuit for wireless data communications between hardware assembly 100 and powered device 136 in FIG. 2. $I^2C$ and SMBus capabilities of the Mitsubishi M37515 (which is compliant with $I^2C$ data protocols) simplify the functionality and implementation of this new digital I/O path. Furthermore, the M37515 (or equivalent) can be readily programmed to communicate with a "smart battery" 134 in FIG. 2 by using SMBus-compliant function control unit 144.

Data communications between a powered device 136 (FIG. 2) and hardware assembly 100 is not restricted to hardwired connectivity. Wireless data communications, for example using infrared (134C), RF, or acoustic arrays, can be created with appropriate communications devices in hardware assembly 100. Software 101 in FIGS. 1-1–1-4 (and software 800 in FIGS. 1A-1–1A-9) are not limited to any particular data communications method between powered device 136 and hardware assembly 100. For purposes of the processes defined in software 101 and 800, the method of data acquisition by a hardware assembly 100 from powered device 136 or battery pack 134 is not limited to the analog methods described herein.

Intermediate Hardware

FIG. 2 shows an embodiment of hardware assembly 100, in which MCU 102 is indirectly connected to power supply 122. Intermediate device 126 is a computer with a display screen (see FIG. 18 for an example of a "Power Monitor" screen display). Data from MCU 102 is sent to computer/display 126 along data lines 130. Computer 126 also controls power supply 122 via data lines 124. Computer 126 is not essential to the operation of the invention's hardware and software. It serves a useful function in providing a display for acquired voltage and current-load values, as illustrated in the "Power Monitor" screen in FIG. 18. In some applications, a graphical user interface and display screen is indicated as user prompts in software 101 and 800 (FIGS. 1-1–1-4 and FIGS. 1A-1–1A-9). This is discussed later under "GUI Considerations."

Figures 1, 2:
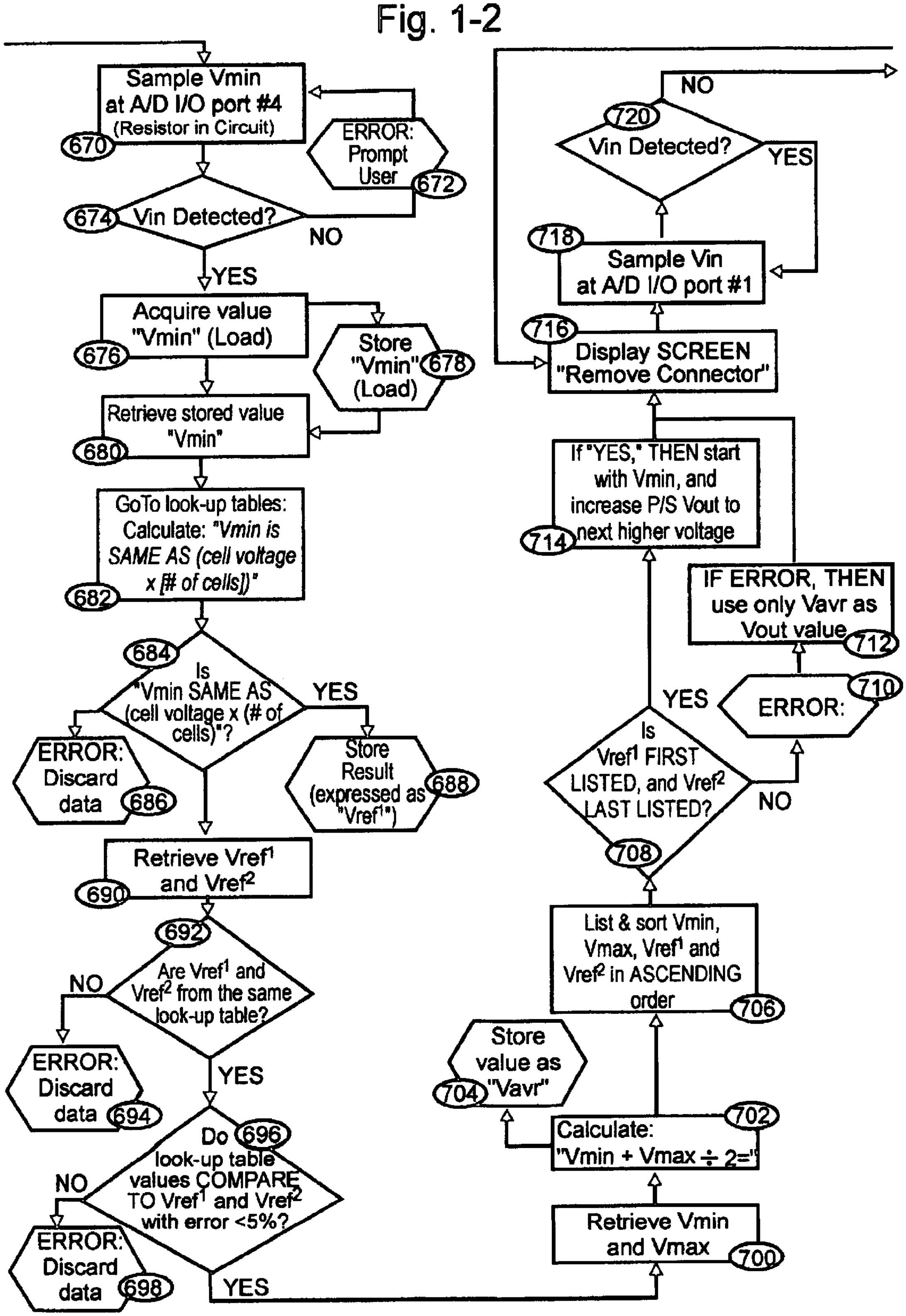
Figures 1, 2, 3:
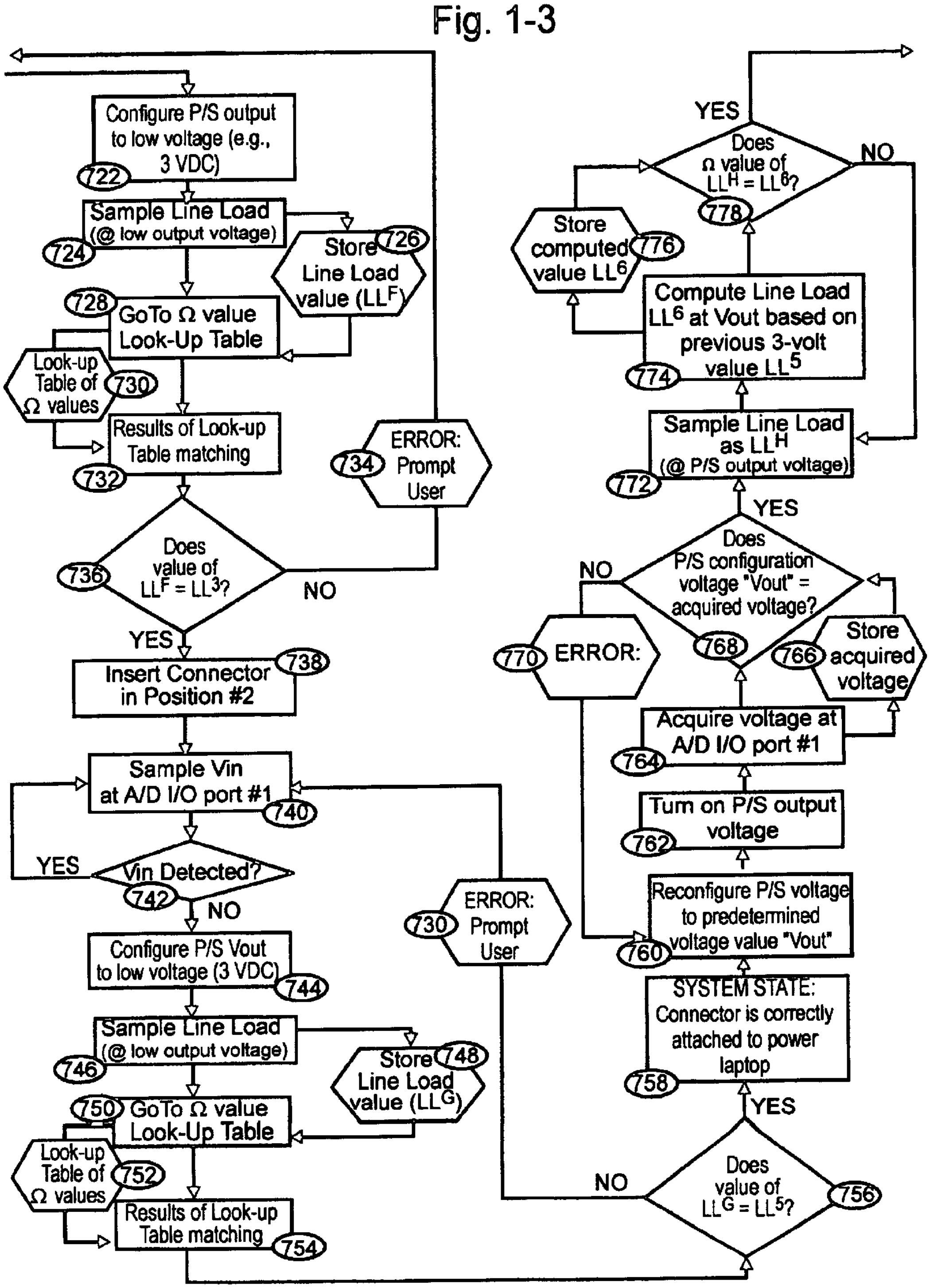
Figures 1, 2, 3, 4:
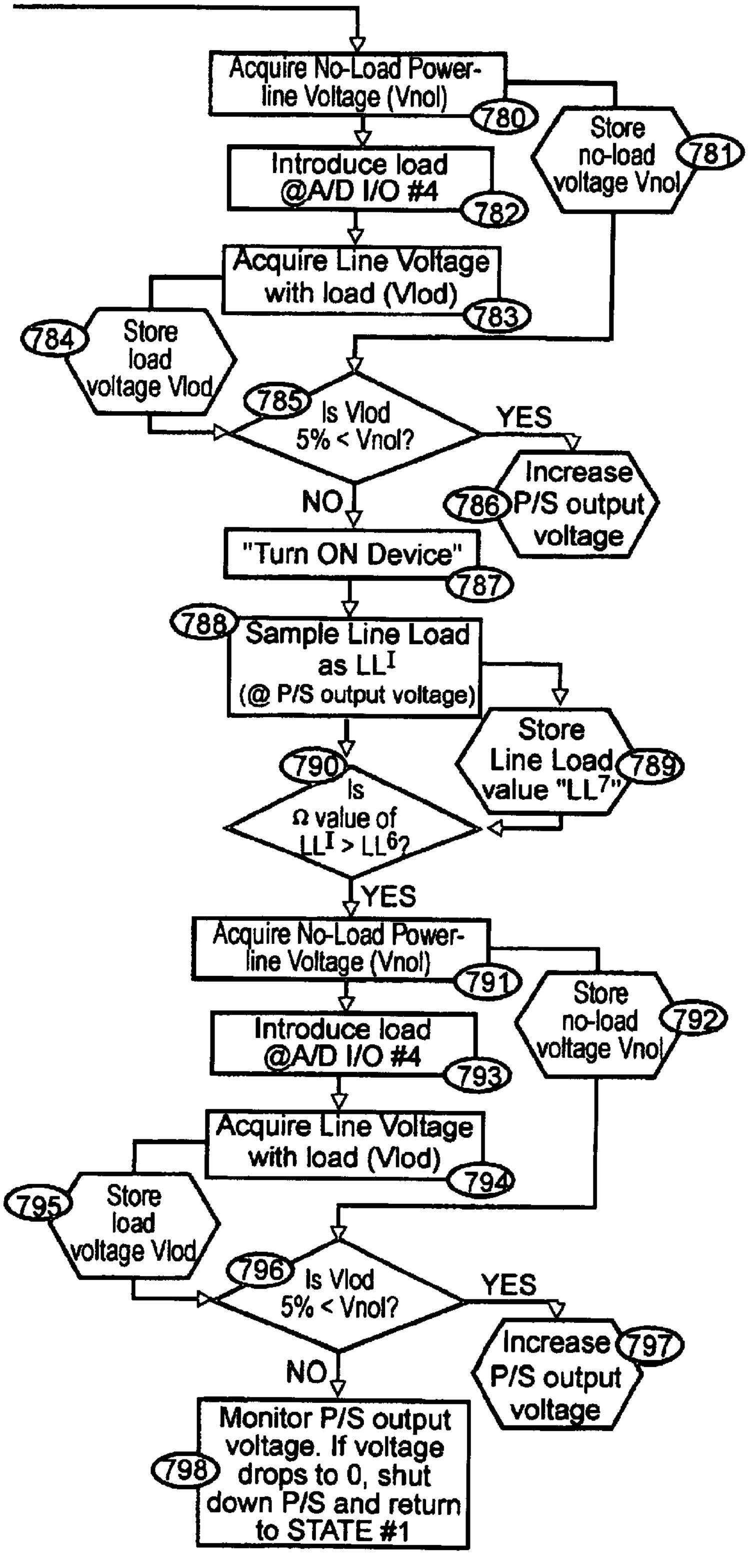
Figures 1, 1A:
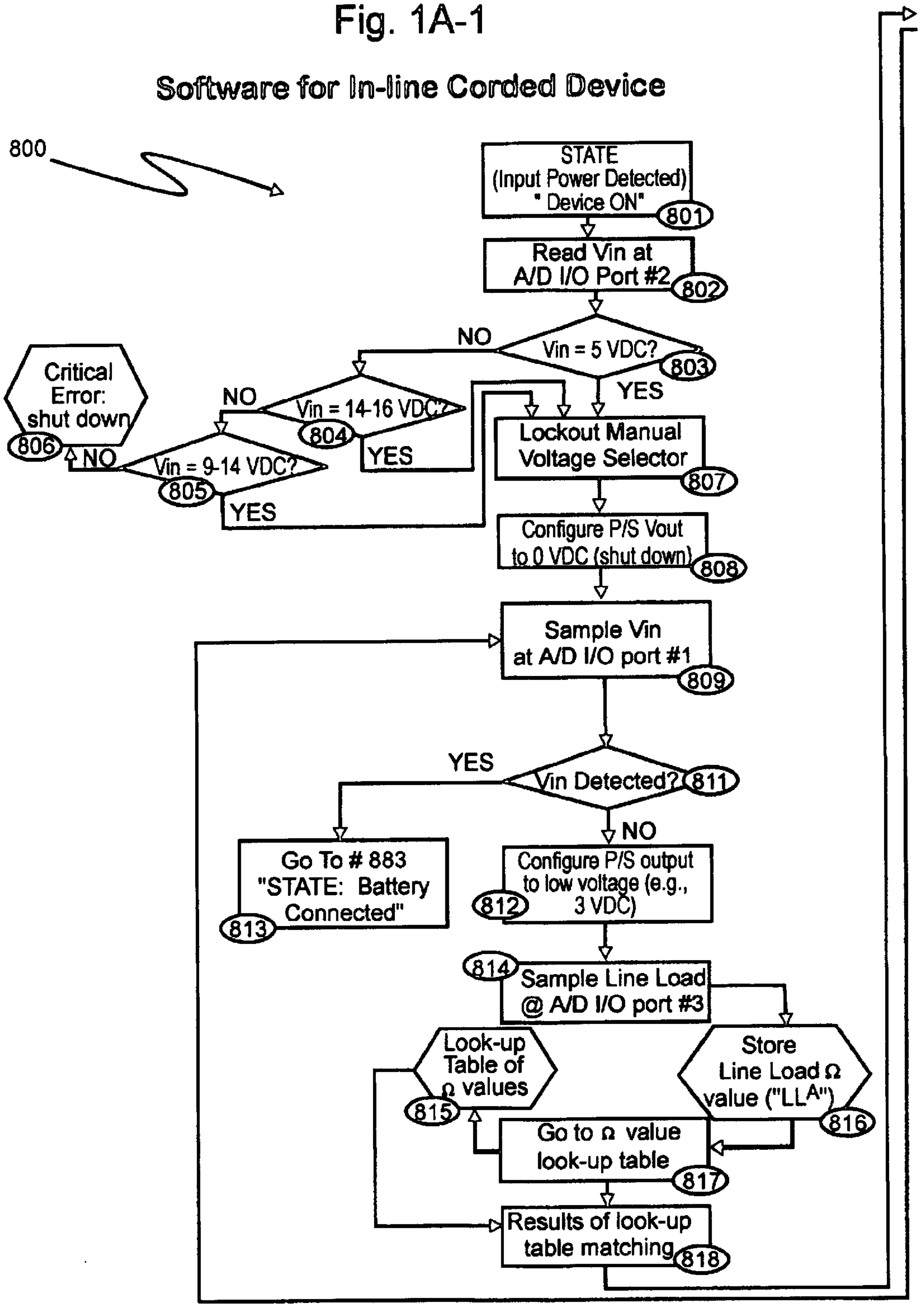
Figures 1, 1A, 2:
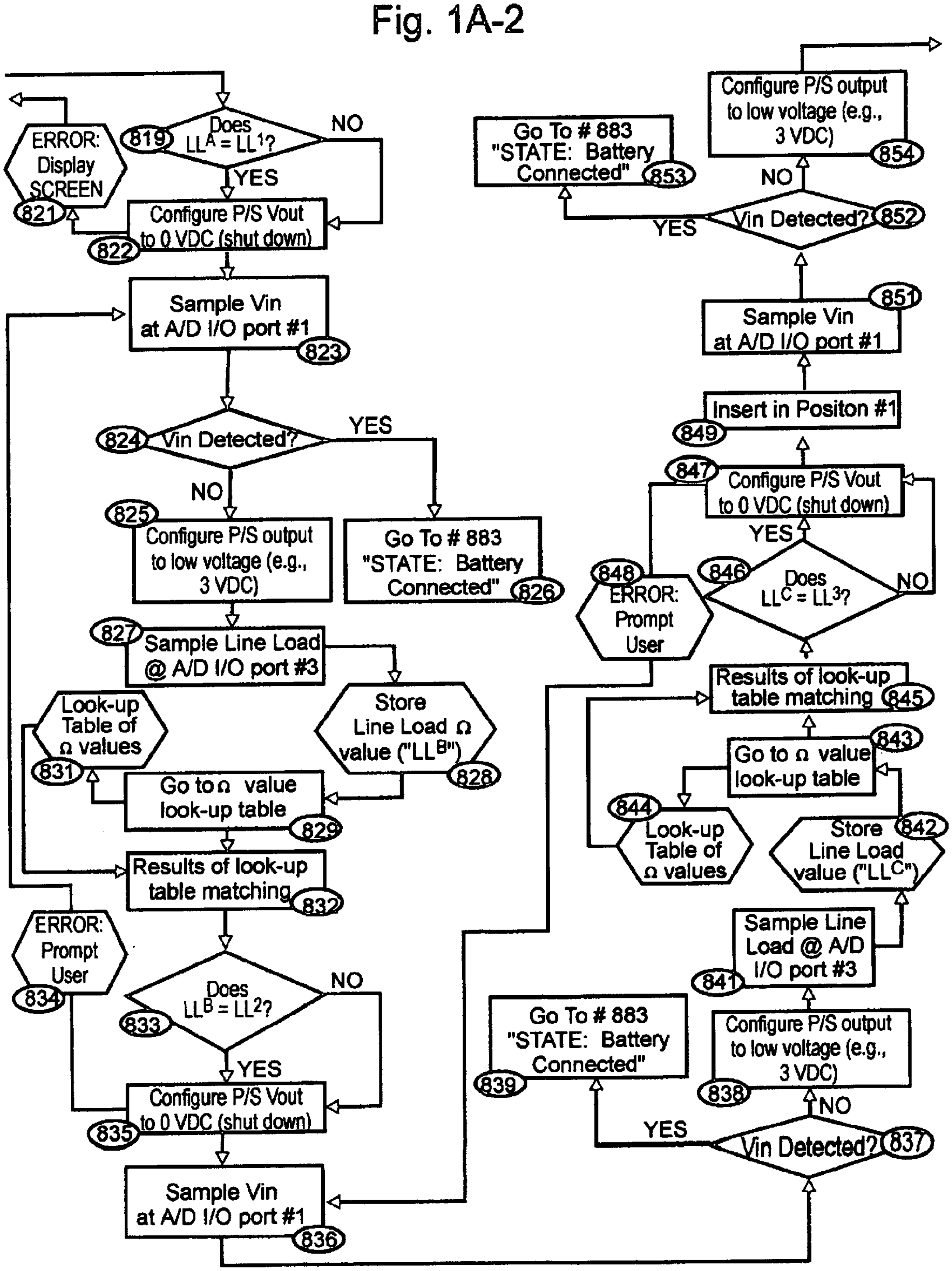
Figures 1, 1A, 2, 3:
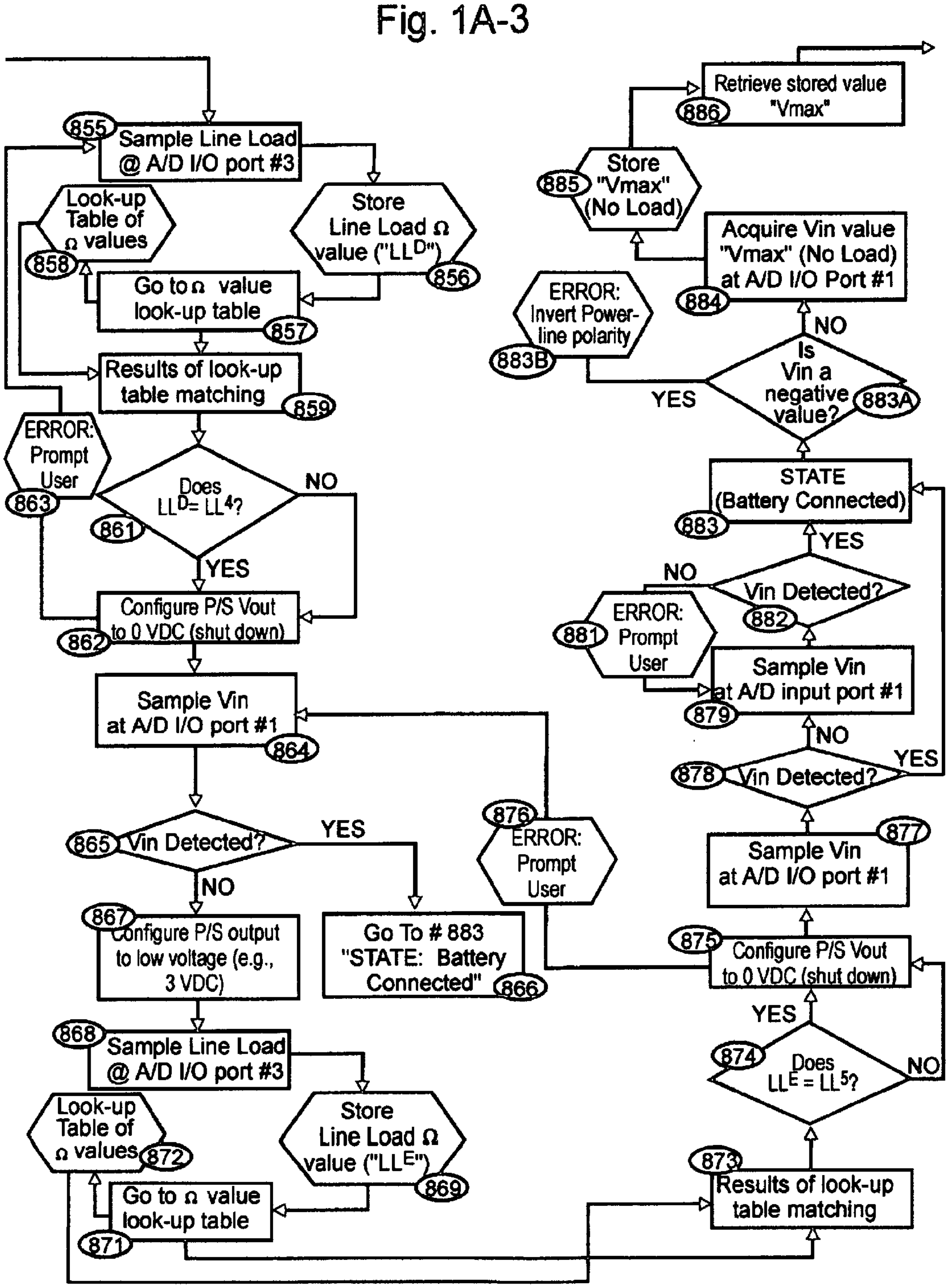
Figures 1, 1A, 2, 3, 4:
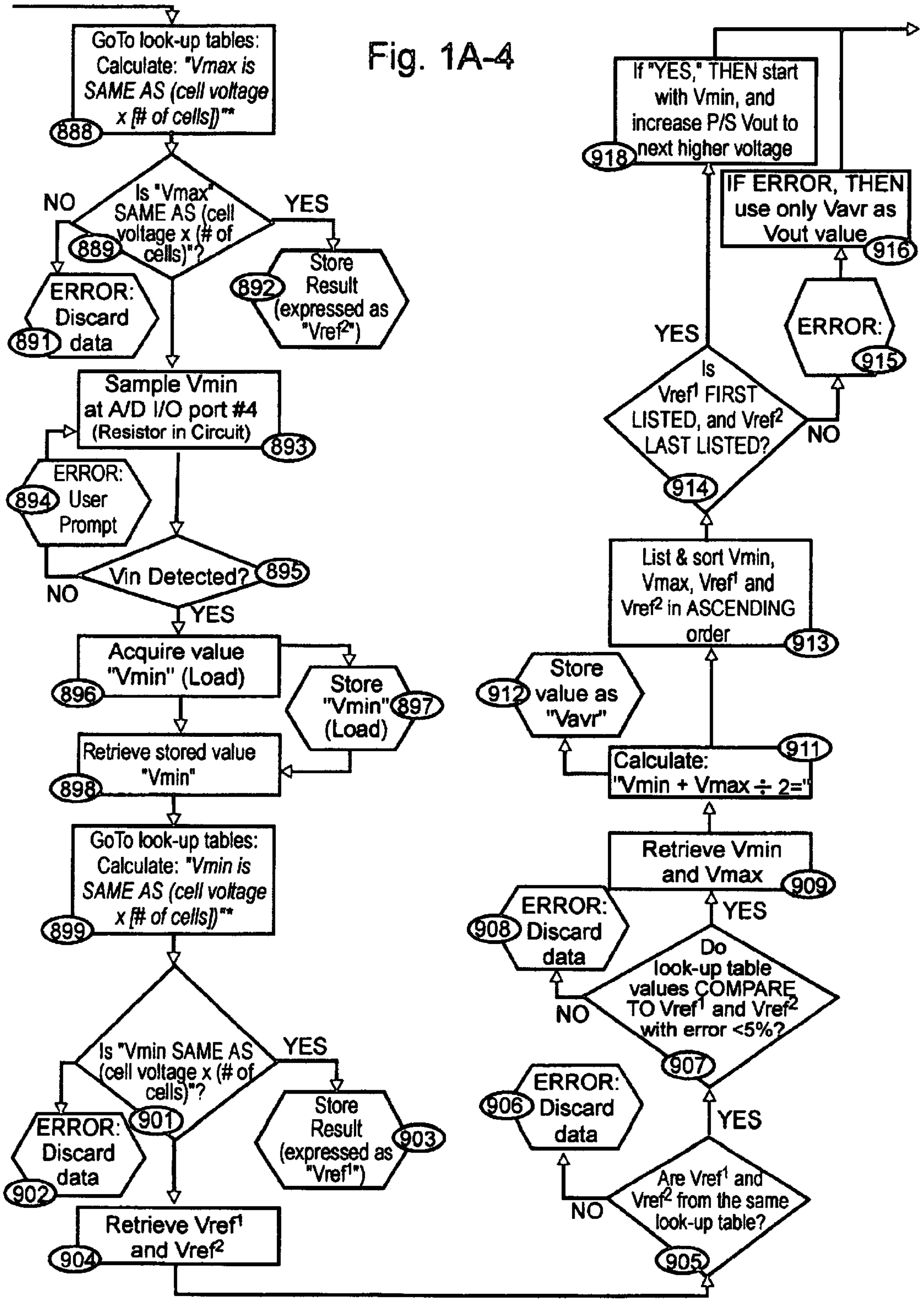
Figures 1, 1A, 2, 3, 4, 5:
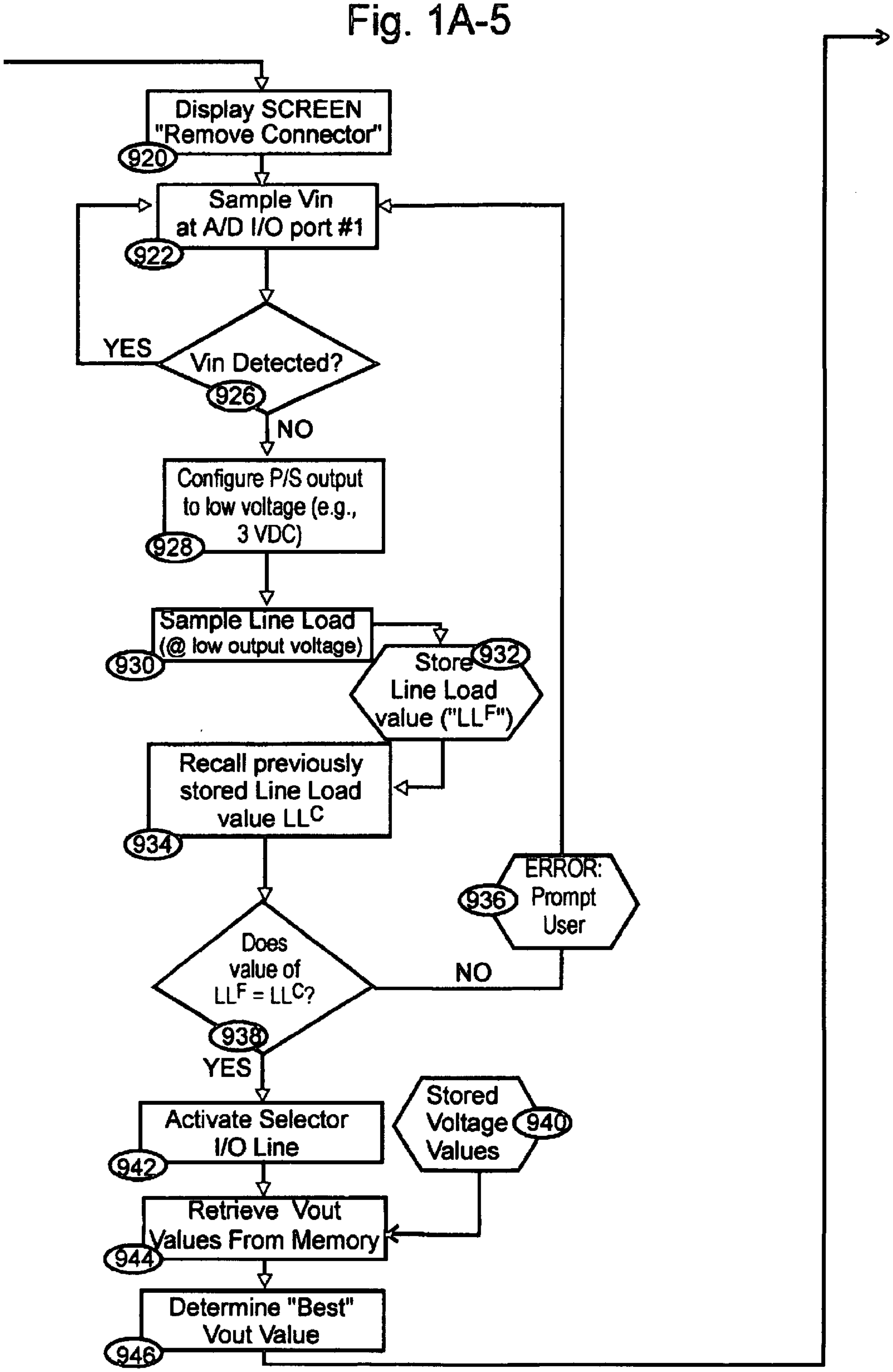

Hardware assembly 375 in FIG. 5 eliminates data control lines 124, and relocates them between MCU 102 and power supply 122, so that MCU 102 directly controls the output voltage of power supply 122.

Master Control Unit

Figures 2, 2A:
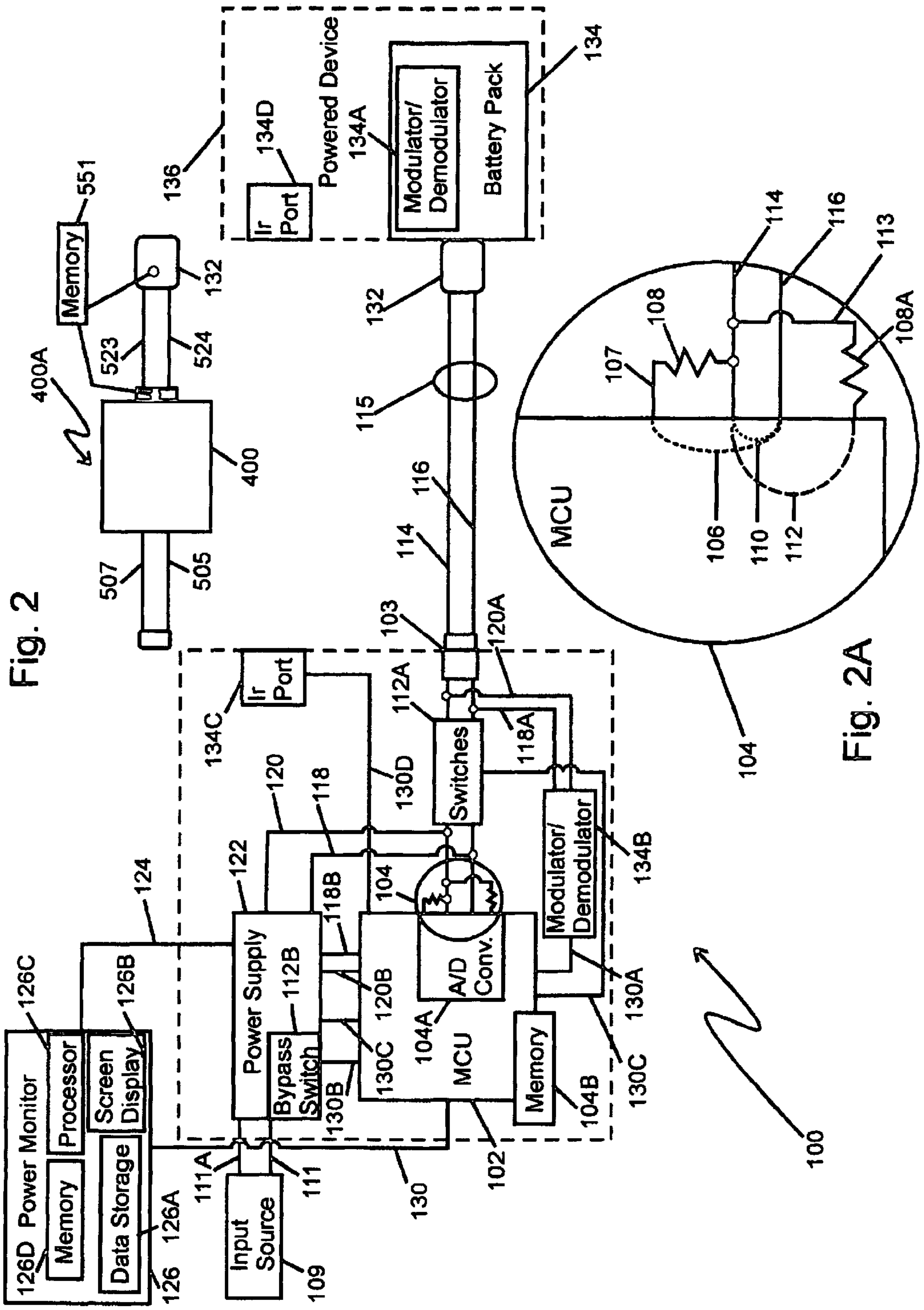

An example of an MCU, 102 in FIG. 2 is a Mitsubishi M37515 (FIGS. 3A and B). MCU 102 has a plurality of I/O ports 138, at least one of which is an A/D port. FIG. 2A details three A/D I/O ports 106, 110, and 112. Each of these is used to acquire powerline voltage (or current), with I/O port 106 reading voltage under a load condition. The load is provided by a power resistor 108 (or equivalent) in powerline 167. I/O port 110 senses voltage as a no-load value at powerlines 114 and 116. I/O port 112 detects current at powerlines 113 and 114. Powerlines 107, and 113 are all tied to primary conductor 116, which is one of two conductors comprising cable 115. Additional circuits shown in FIG. 5A can be implemented at the appropriate I/O ports for current and load-test states.

Figure 13:
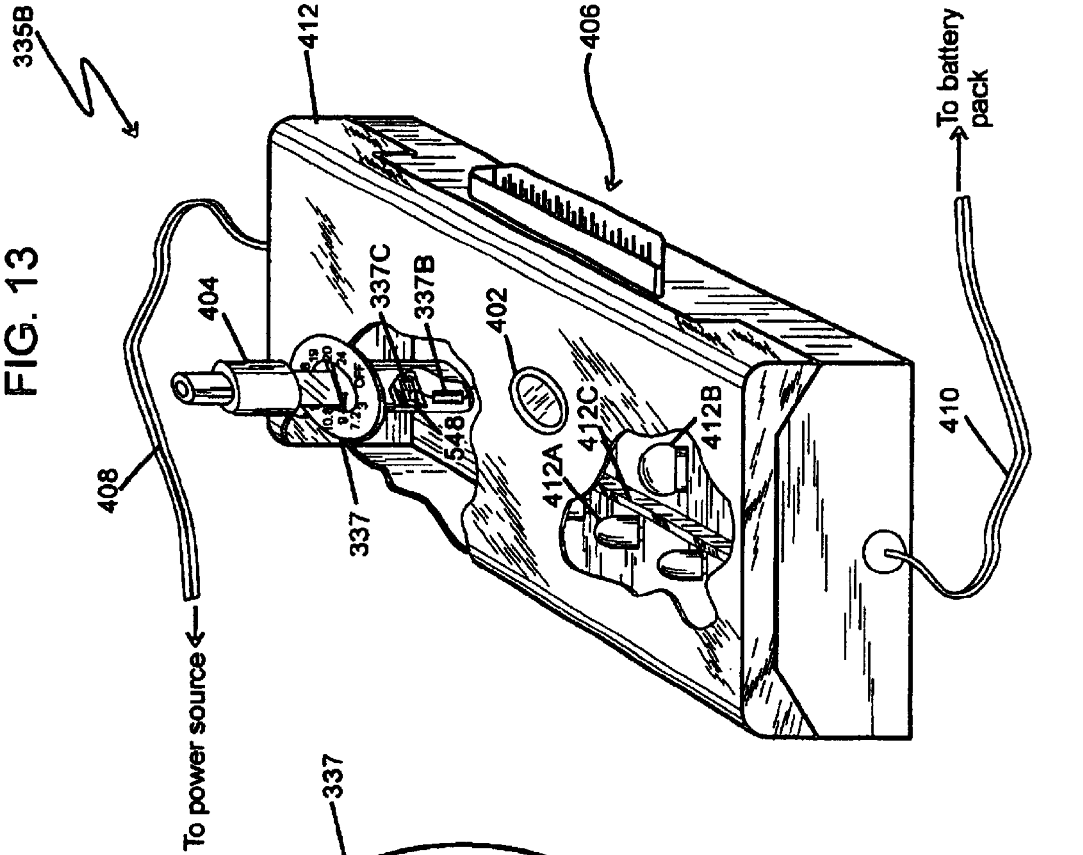
Figures 1, 13:
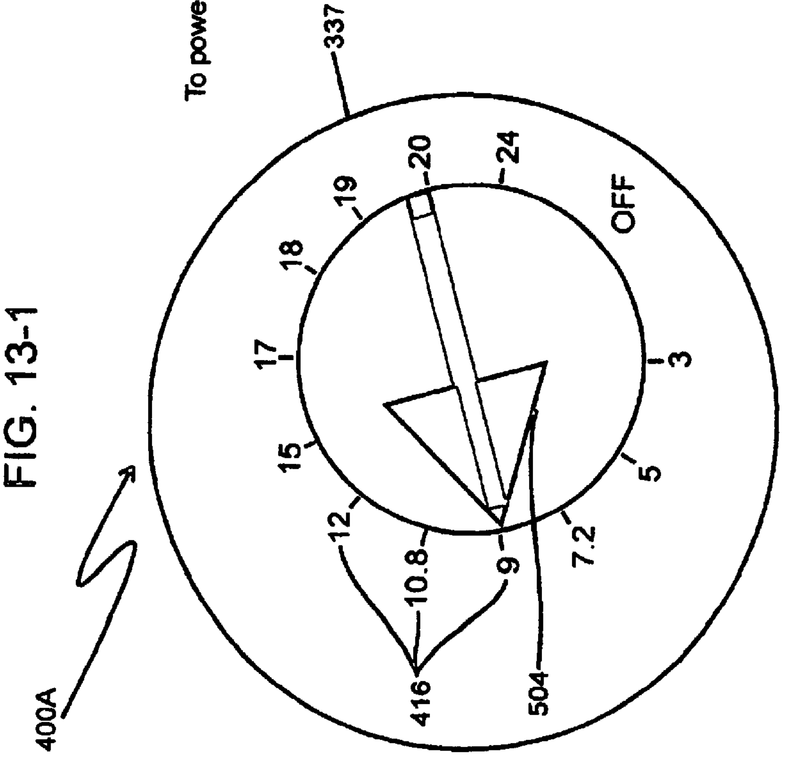
Figure 13A:
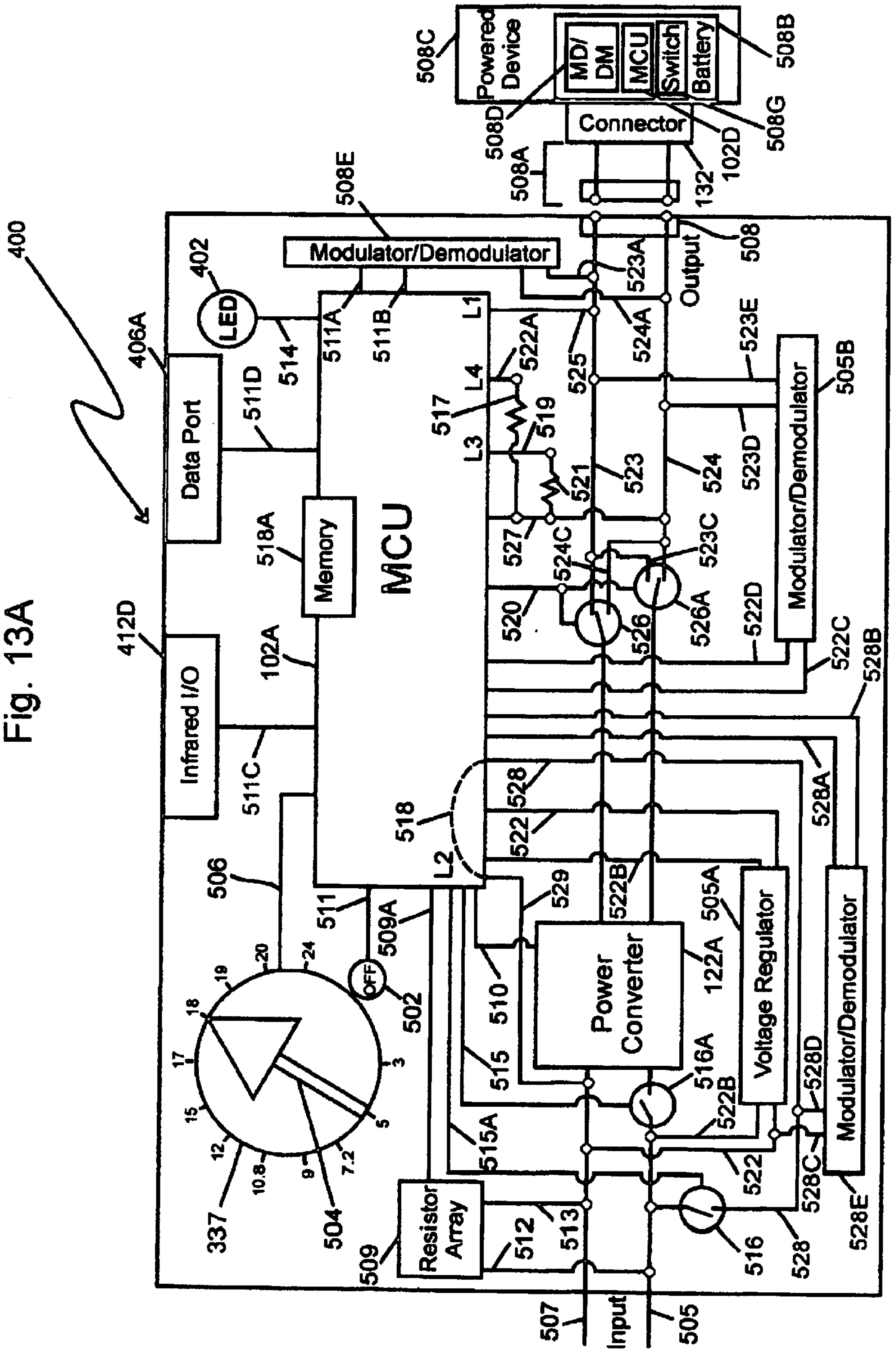
FIG. 13A shows a diagrammatic representation of the hardware elements of external power-conversion devices such as those in FIGS. 10, 11, and 13.

The following table identifies the four A/D I/O ports used in software 101 (or 800):

| Port # | Drawing I.D. | Software I.D. | Function |
|---|---|---|---|
| 1 | FIG. 2A #110 | FIG. 1A #802 | Powerline voltage acquisition at battery 134 or power supply 122's output (FIG. 2) |
| 2 | FIG. 13A #518 | FIG. 1A #809 | Powerline voltage acquisition at input to hardware assembly 100 (FIG. 2) |
| 3 | FIG. 2A #112 | FIG. 1A #814 | Powerline load (current) readings |
| 4 | FIG. 2A #106 | FIG. 1A #943 | Powerline voltage acquisition under supplemental load |

Analog signals acquired by I/O ports 106, 110, and 112 in FIG. 2A are converted to digital signals in A/D converter 140 in FIG. 3A. As indicated in software 101 and 800 (FIGS. 1-1–1-4 and FIGS. 1A-1–1A-9), some digital data values are stored in memory, either temporarily or permanently. As appropriate, data values are stored in ROM 148, or RAM 146. Processor 150 is used to calculate values, control data flow, time functions, etc. Timer construct 142, and/or clock generator 152, can be used for sequencing processes. FIG. 5 illustrates a reference-design test jig for the Mitsubishi M37515 (a non-limiting example of MCU 102 (FIG. 2), as well as MCUs 102A and 102 D (FIG. 13A).

Output I/Os

Figure 3B:
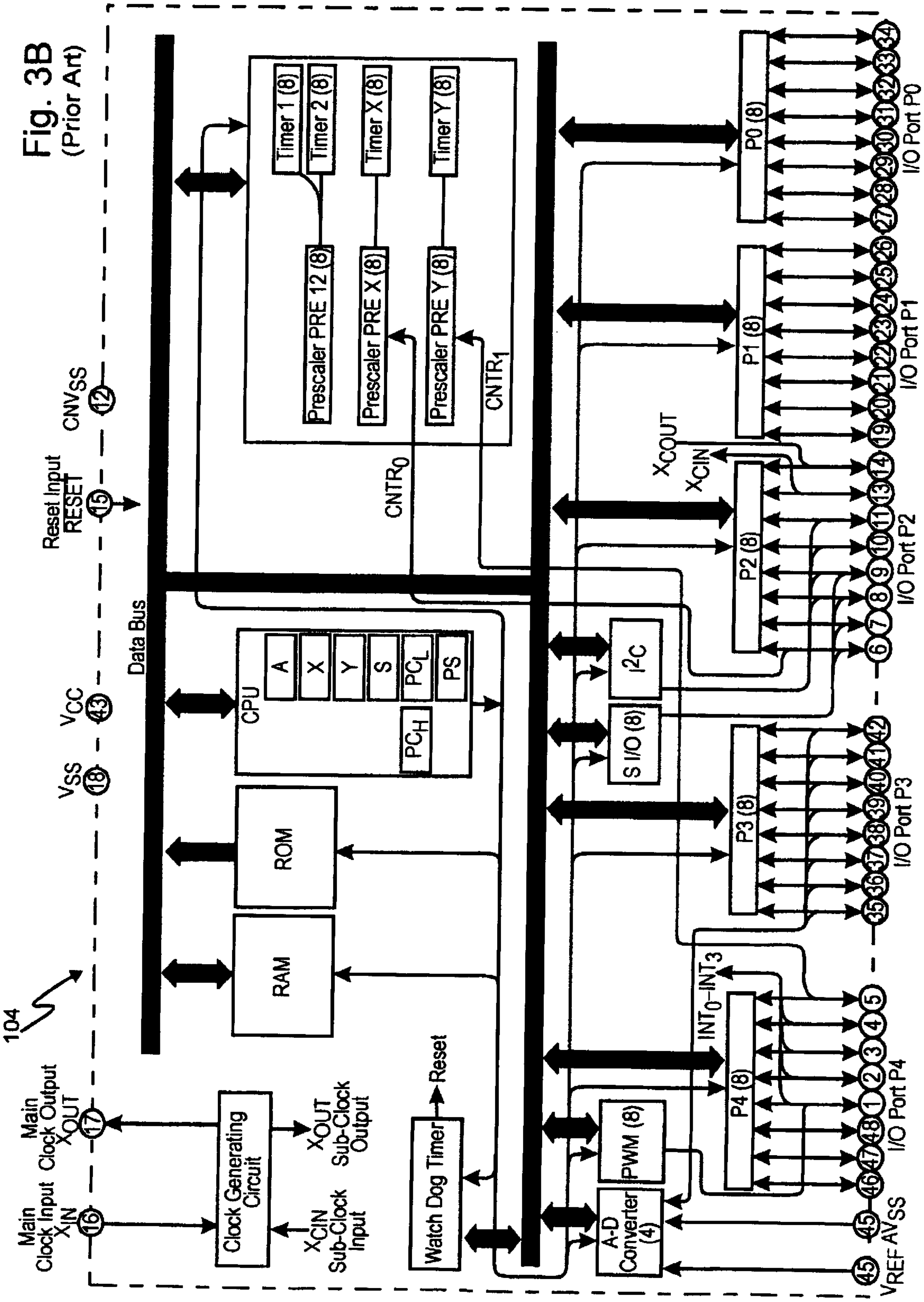
FIG. 3B (prior art) depicts the architecture and port configurations of a typical microcontroller unit (MCU).
Figures 1, 4:
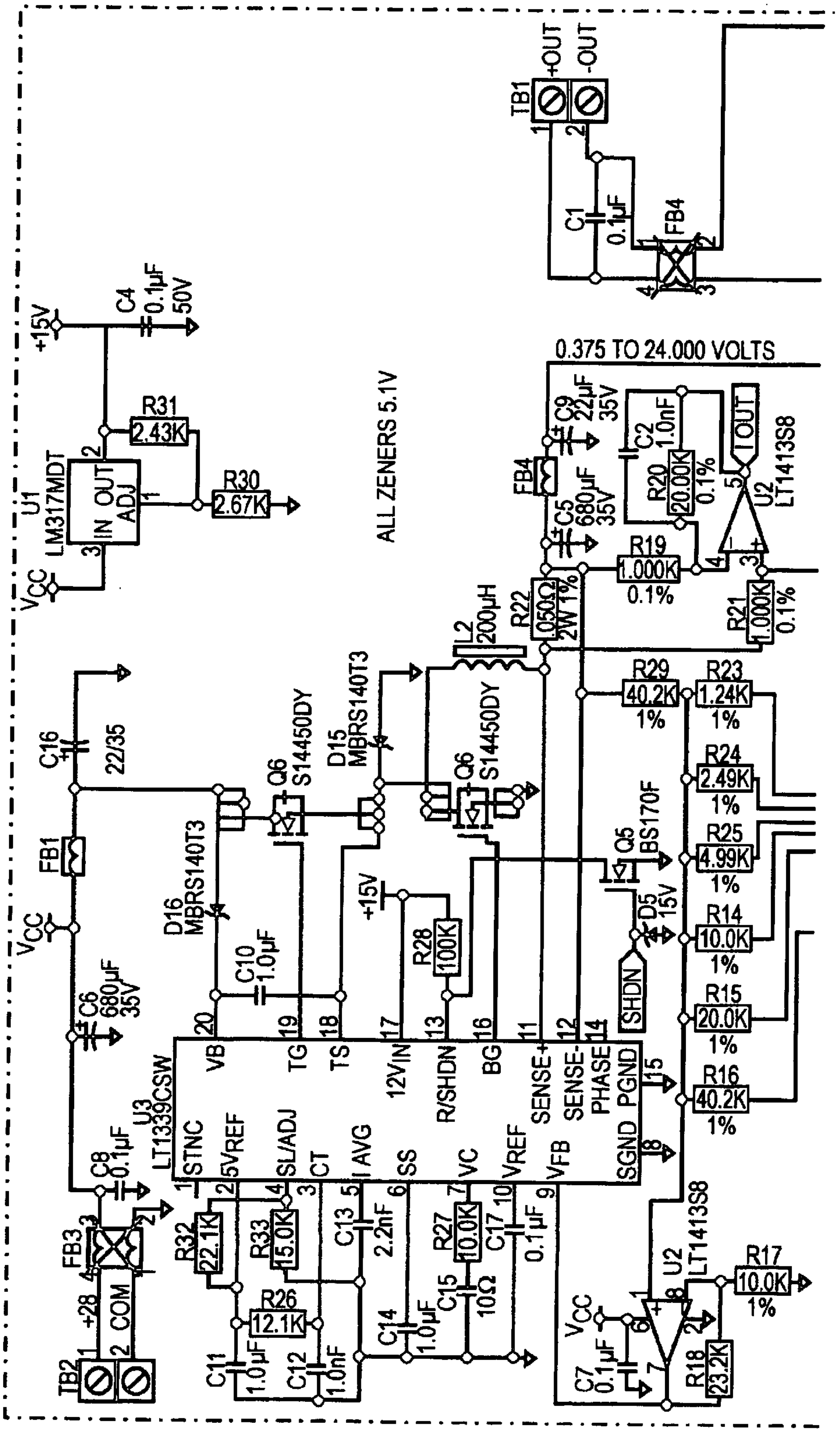
Figures 2, 4:
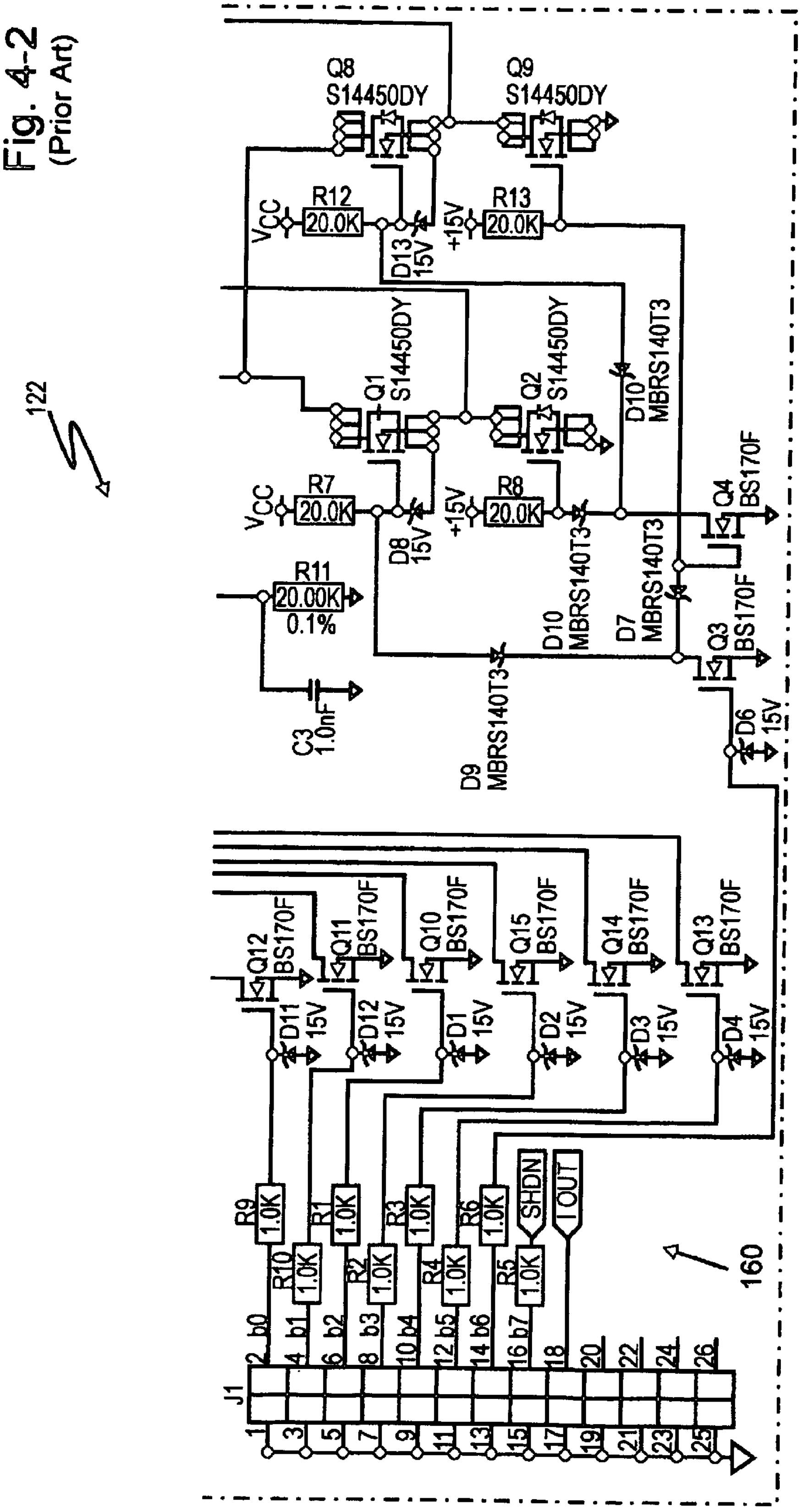

MCU 102 in FIG. 3A can output a digital signal on a reconfigured I/O port (not shown, but referenced in FIGS. 3B and 5) created from 40 programmable I/Os 138. As a parallel port, not all pins are allocated. MCU 102's programmable I/Os 138 serve to communicate data to configurable power supply 122 in FIG. 2. In the modality of configurable power supply shown in FIGS. 4-1 and 4-2, data input from MCU 102 is expressed as +0.5 VDC line voltage. Resistor ladder 160 in FIGS. 4-1 and 4-2 can be configured in a plurality of output voltage combinations, based on voltage values at pins 2, 4, 6, 8, 10, and 12, which control the final output voltage of power supply 122.

Serial I/O port 154 in FIG. 3A can be used for communication outputs, such as control and command functions to the circuitry of a power supply 122 in FIGS. 4-1 and 4-2. For example, an LTC1329A-50 from Linear Technologies (Milpitas, Calif.) can be used (via a serial port) to drive the LT1339 shown in FIGS. 4-1 and 4-2. The LTC1329A-50 is tied to the LT1339 at pin 12 (Sense) and pin 9 (Vfb). The Linear Technologies' LT1339 requires a modification to perform proper shutdown, as indicated in the chip's data sheets. Also, Vout is measured at header PIN 20, which is jumpered directly to the positive output terminal block #1 at TB1. To protect against power flowing into the power supply from the battery, a diode is included in the positive output powerline, but not ahead of the jumper that feeds Vout information to PIN 20.

GUI Considerations

FIG. 2 indicates an external processor with a screen display 126. Software 101 and 800 in FIGS. 1-1–1-4 and FIGS. 1A-1–1A-9) use various screen prompts to assist the user in manipulating connector 132. Elements of software 101 (or 800) relevant to displaying information (such as the non-limiting examples of Graphical User Interfaces (GuIs) described herein), can reside on appropriate storage media, such as CD-ROMs, DVDs, diskettes, etc., as freestanding software applications, or the software can be "burned" into hardware chips (for example, EPROMS, and EEPROMs) for use with embedded systems which provide a display interface. An appropriate display can also be integral with hardware assembly 100, or independent as shown in FIG. 2. A screen display can be, as a non-limiting example, an LCD character display (or equivalent), mounted to an enclosure within which resides hardware assembly 100.

Figure 14:
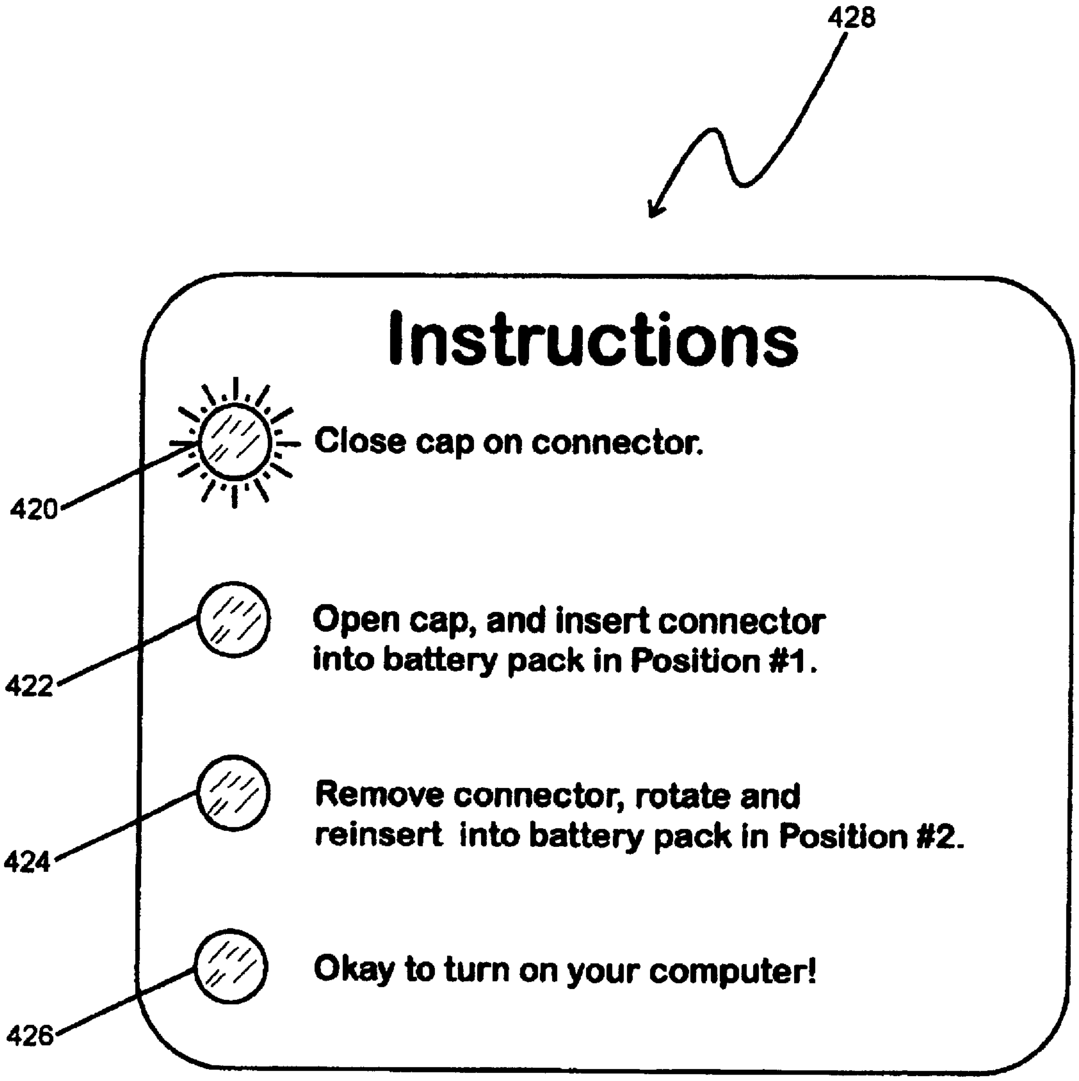
FIG. 14 depicts a representational instruction label, with LEDs to prompt a user to perform certain activities relevant to configuring hardware.

Display screen technologies are not, however, essential to the proper operation of software 101 and 800 (FIGS. 1-1–1-4 and FIGS. 1A-1–1A-9). Other methodologies to guide a user through the simple configuration steps include, but are not limited to, LEDs that are linked to a text-based information panel or card, as shown in FIG. 14. MCU 102 in FIG. 2 controls status LEDs 420, 422, 424, and 426, using available programmable I/Os 138 to actuate the appropriate LED. Error states, determined by user compliance to a requested action, can be shown by blinking the appropriate LED, for example 420, if a required user action has not been performed.

Display screens or LEDs are only two modalities of alerting a user to perform a specific action, or to confirm the appropriateness of the results of such actions, and are illustrated here as non-limiting examples only. Any method that will prompt a user is acceptable for the proper operation of software processes defined in software 101 and 800.

Power Supply Modalities

Software 101 and 800 (FIGS. 1-1–1-4 and FIGS. 1A-1–1A-9) is not specific to a particular configurable power supply. A switching power supply design 122 in FIGS. 4-1 and 4-2, that configures itself to a correct output voltage, is typical of a hardware configuration supported by software 101 and 800. Software 101 and 800 can operate with a plurality of power supply design modalities.

As a non-limiting example, a power supply which has a method of manually adjusting or configuring its output voltage can function according to the processes defined in software 101 and 800. Instead of the calculated output voltage available from MCU 102 in FIG. 2 being forwarded to a configurable power supply 122, the resultant voltage can be displayed on a screen. The user, seeing such voltage information on the screen uses this data to manually select the matching voltage. Because software 101 is capable of verifying that user-selected power supply 122's output voltage is correctly matched to the input voltage requirements of powered device 136, the user has validation and confirmation of the correctness of the selected voltage.

Software 800 in FIGS. 1A-1–1A-9 comprises a method of verifying a manually-set output voltage by using a simple reference-voltage comparator circuit, or by acquiring and calculating battery output voltage. Power supply device 400 in FIGS. 13, 13-1, and 13A includes an LED 402 that is capable of blinking, and also holding a continuous LED ON condition. When Vout and $Vout^2$ are the same, LED 402 goes from a blinking state to a continuous ON state. A continuously ON LED 402 indicates to a user that an accurate voltage match has occurred. This eliminates any mismatched voltage from a power supply 400 which could damage a powered device. With this LED confirmation, a power supply 400 need not have any voltage values demarcated on manually-adjustable voltage selector 337. It is not necessary that a user know what the actual voltage values of a selector 337 are, but user only needs to know that power supply 400 is in a voltage-matched state, irrespective of that actual voltage. Visually defining voltages does, however, offer a psychological advantage, for users who are conversant with voltage matching.

Selector 337 in FIG. 13A uses changes in impedance across its rotating manual selector switch to define incremental voltage values. Each selector setting 416 (FIG. 13-1) has a known resistance value. These individually unique Ohm values are plotted in a look-up table (not shown) that equates an Ohm value to an output voltage value. When the desired resistive value that equates to a desired output voltage is detected, LED 402 goes from a blinking state to a continuous ON state. Users cannot mistakenly select a mismatched voltage, which provides a high degree of safety to power box 400. Should a user rotate selector dial 504 at any-time after Vout has been executed, MCU 102A ignores the selector.

A Single-LED, Self-Confirming, Manually-Adjustable Power Supply

Figure 6:
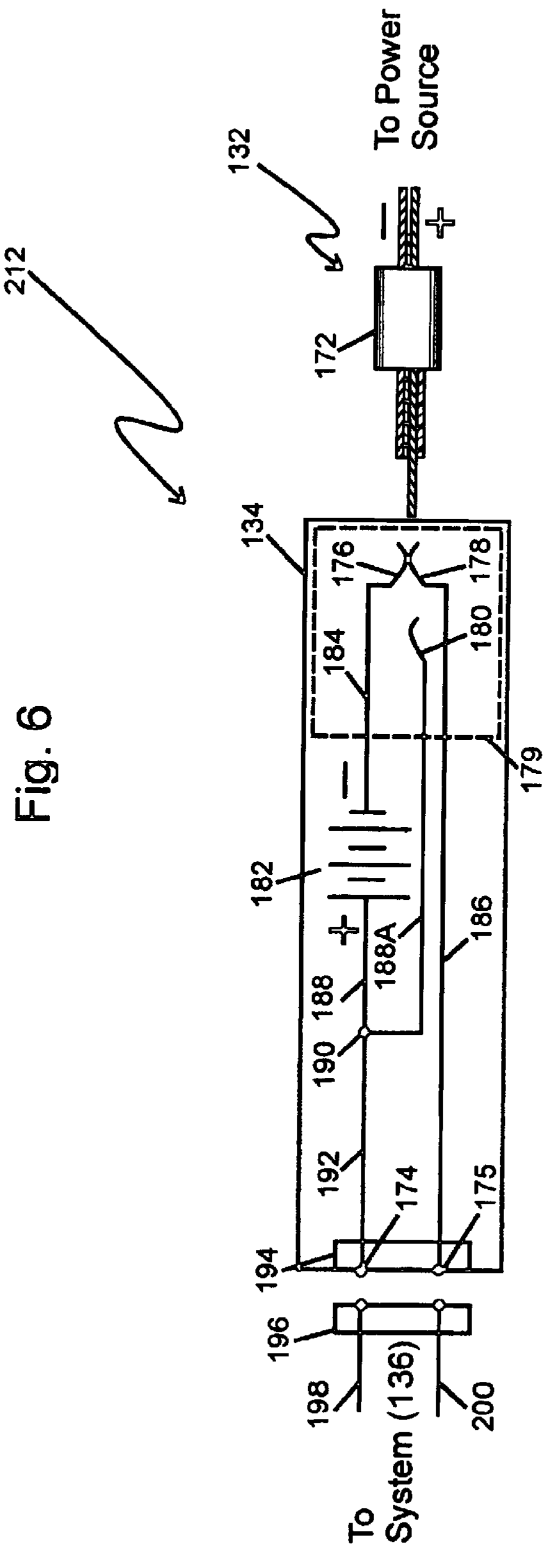
Figure 6A:
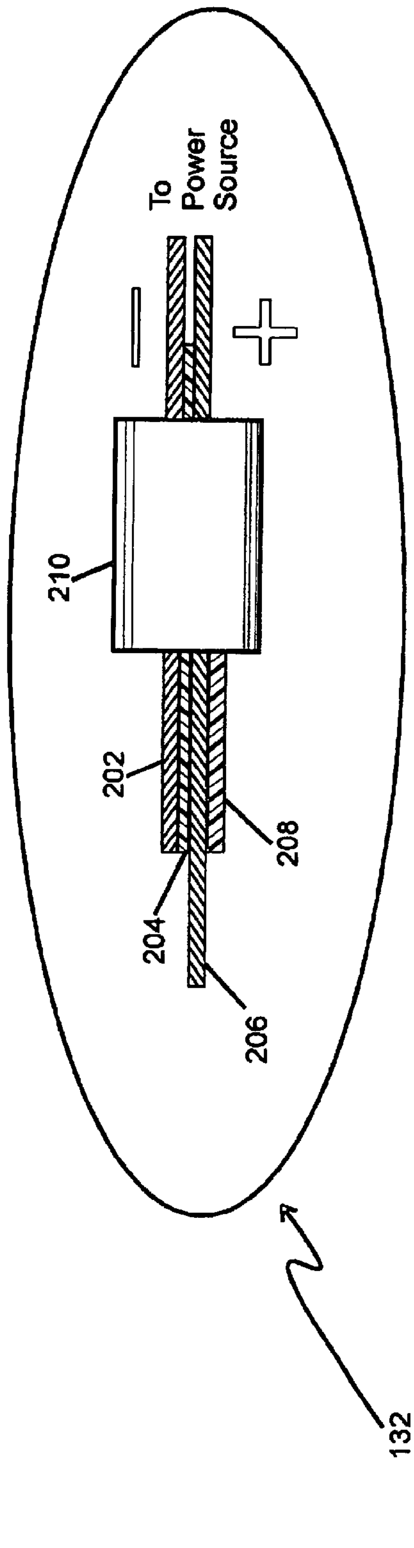
Figure 6B:
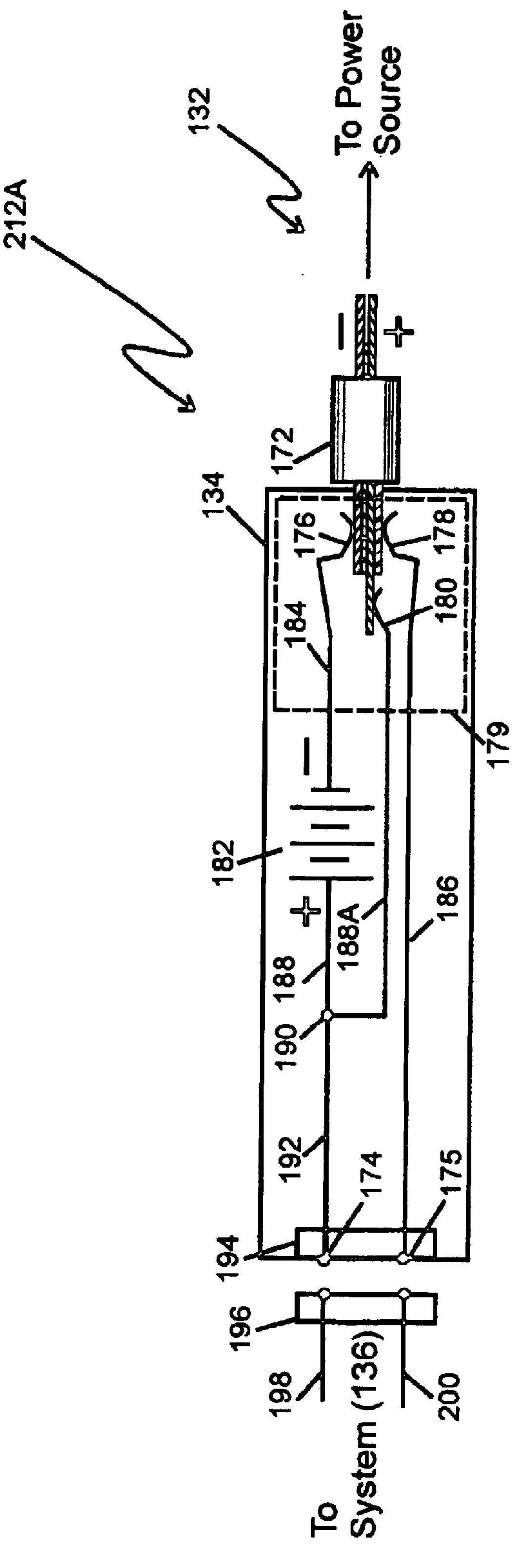
Figure 6C:
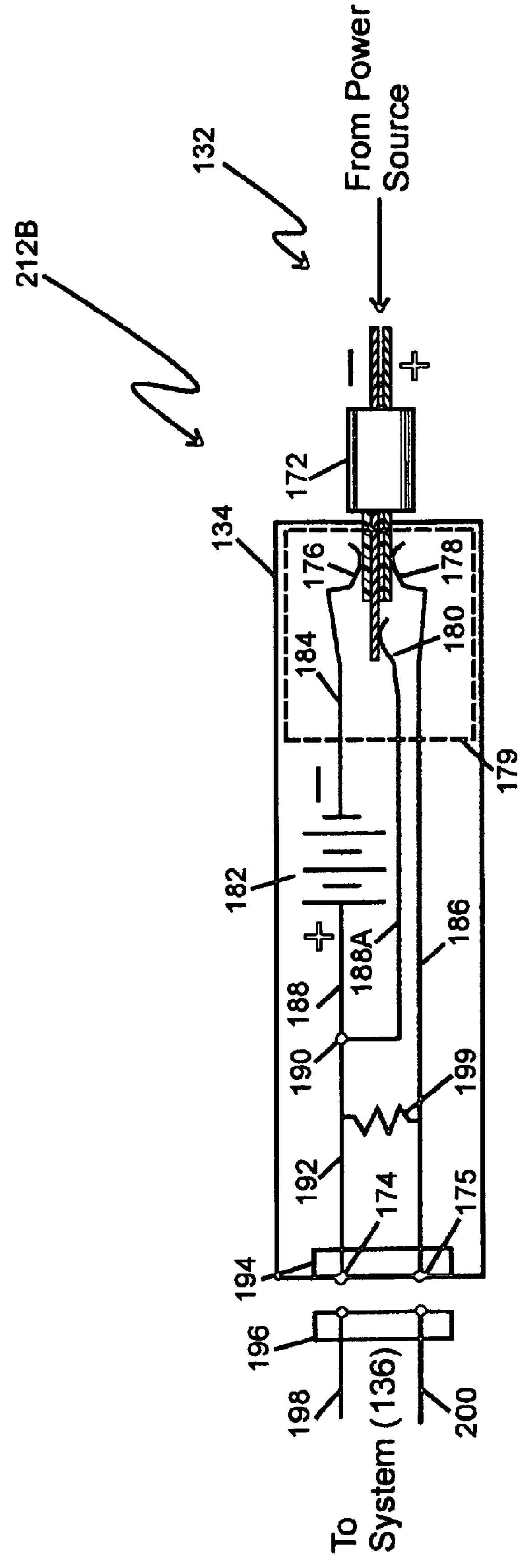
Figure 6D:
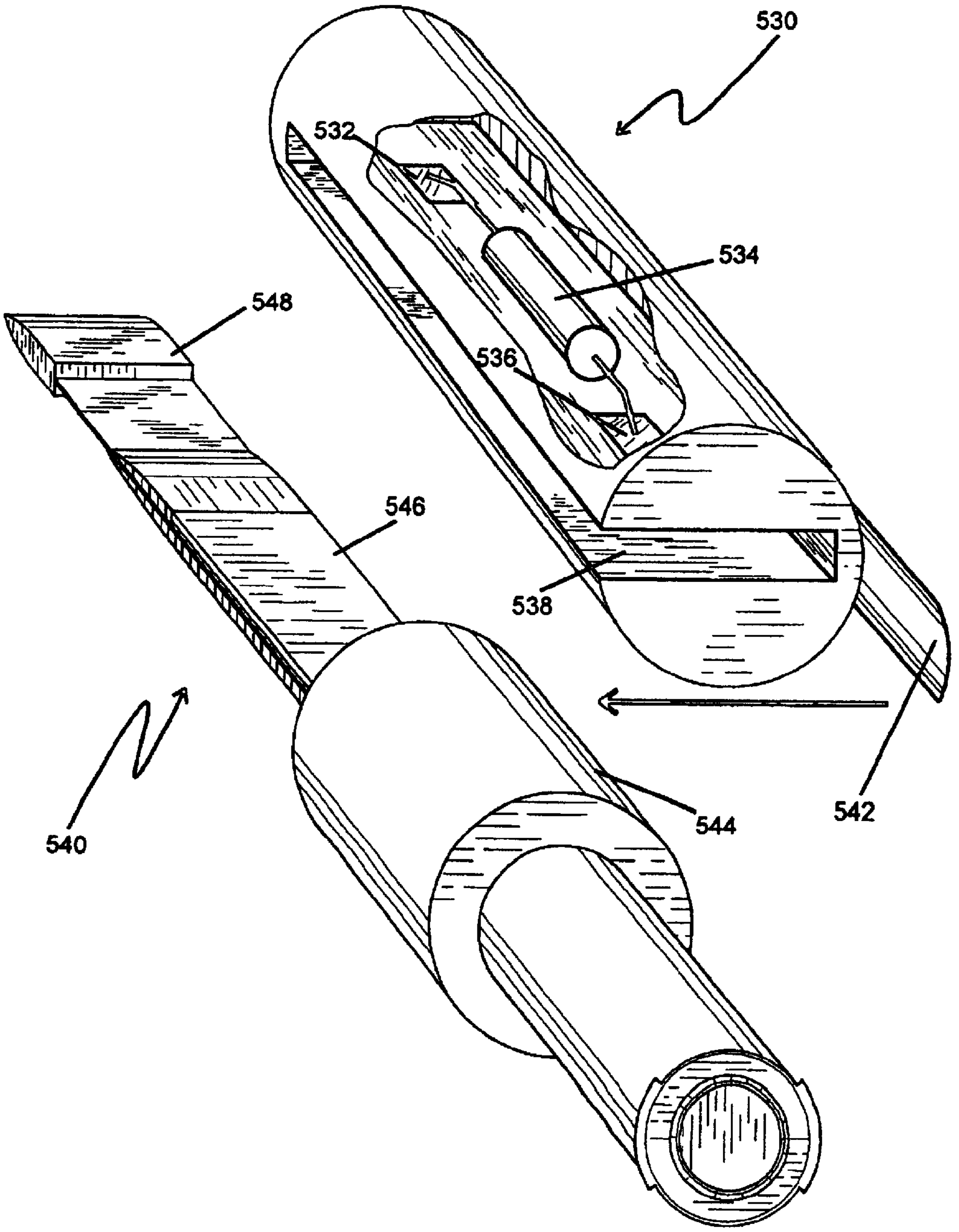
FIG. 6D shows a detailed view of the male connector in FIGS. 6–6C, with a removable cover that includes a resistive element.

FIGS. 13, 13-1, and 13A illustrate non-limiting examples of a self-confirming power adapter 335B and 400 respectively that is comprised of at least one signaling indicator that can be an LED 402. LED 402 is wired so that it blinks during voltage selection, then lights solid ON when a voltage match is achieved. This indicates to a user that a powered device's voltage, determined by software 800 in FIGS. 1A-1–1A-9 is the same as the selected output voltage of adapter 400 at voltage selector 337. As a safety measure, the tool used to rotate selector indicator 504 is a male "key" connector 404. Connector plug 404 in FIG. 13 is shown in FIG. 6D as connector plug 540.

Figure 10:
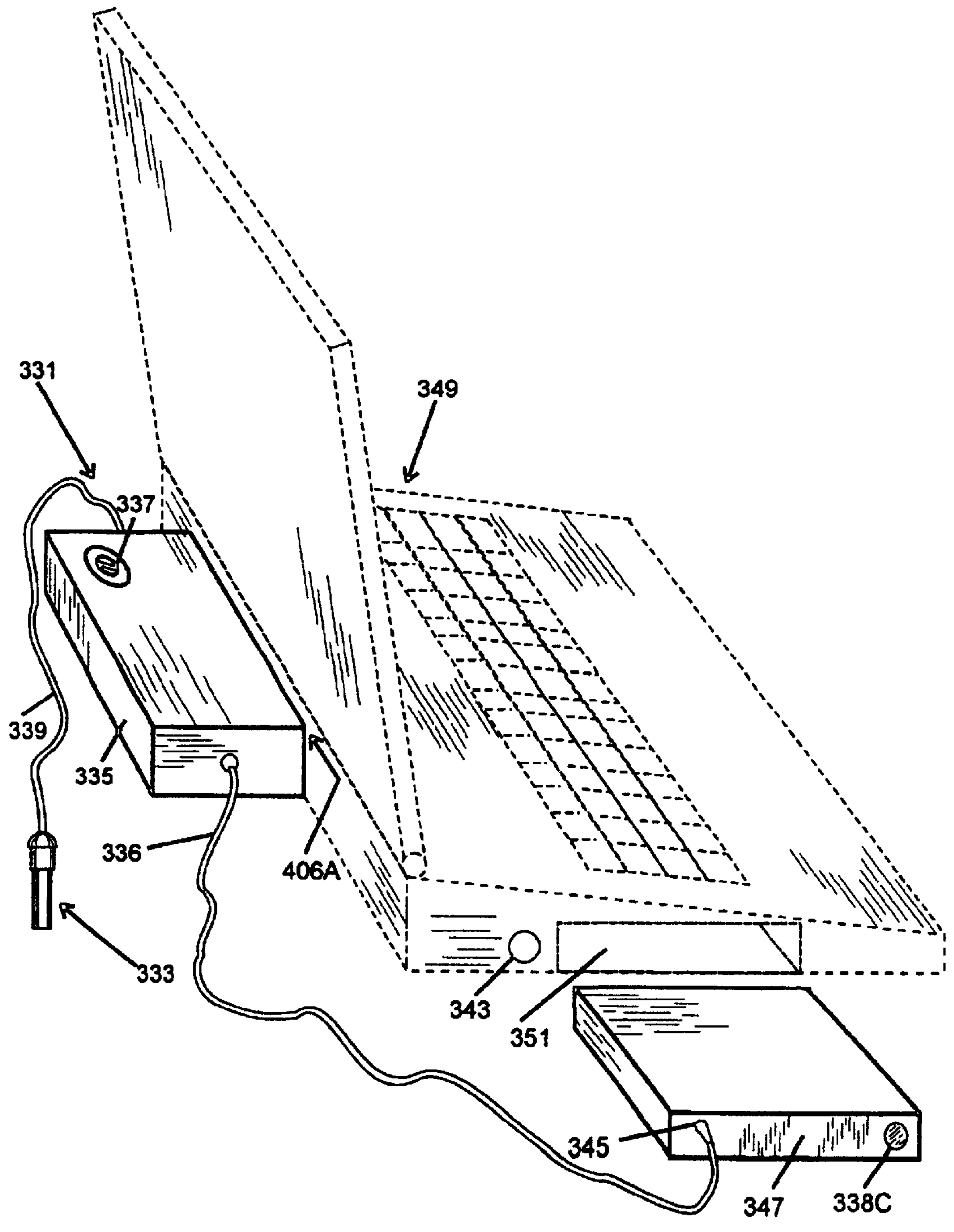
FIG. 10 illustrates two modalities of an external power-conversion adapter, one being an adapter with a selectable voltage dial, and the second being a battery, bath having integrated power hardware and software that is used to power a powered device such as a laptop computer.
Figure 11:
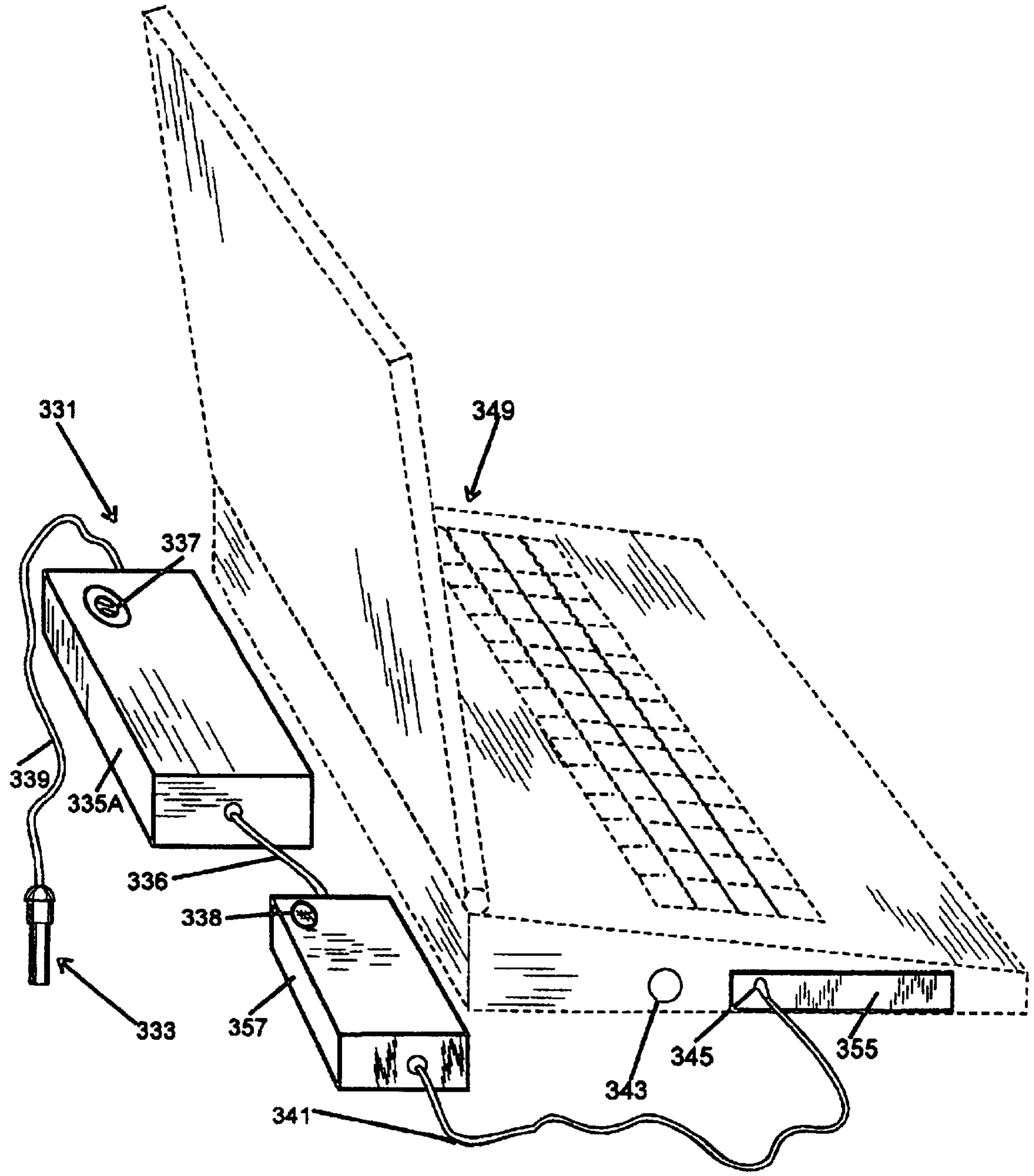
FIG. 11 shows an external module inserted in the electrical path between a power-conversion adapter and a powered device's battery pack.

Various modalities of an external power device, such as power adapter 335 in FIG. 10, power module 357 in FIG. 11, and adapter 335 B in FIGS. 13 and 13-1, are generically illustrated in a block diagram format 400 in FIG. 13A MCU 102A has an input 506 (based on 13 selectable output voltages) from selector 337. Selector 337 is a rotary switch with four lines. Each switch position represents a unique binary value that is expressed on four-conductor-line 506 to MCU 102A. MCU 102A is thus able to know, by combinations of these binary values, each specific voltage setting that is selected. MCU 102A interprets these binary values as voltage selections.

Just as hardware assembly 100 in FIG. 2, power adapter 400 in FIG. 13A is capable of reading a voltage value from an external powered device 508C (item 136 in FIG. 2). Data acquisition at signal lines 523 and 524 is configured to read voltage from an external source, such as battery 508B. MCU 102A holds power switches 526 and 526A open while reading an external voltage from battery 508B. Software 800 (FIGS. 1A-1–1A-9) stores voltage values in MCU 102A's:memory 518A. MCU 102A then looks to binary inputs from manual voltage selector 337 at data-input line 506. When a user selects a voltage by rotating selector dial 504 that matches the voltage value stored in MCU 102A's memory, MCU 102A turns on LED 402. This indicates to the user to stop rotation of selector 337 at that point (A discussion of LED variants appears in the "Hardware" section of "Software For In-Line, Corded Power-Delivery Hardware").

Thus, power adapter 400 (FIG. 13A) can determine the output voltage of its power converter 122A by acquiring voltage information from an attached battery 508B. Conductors 525, 522A, 519 and 527 provide A/D converter inputs to MCU 102A. Line voltage from main powerlines 523 and 524 is acquired using A/D lines 525 and 527. Line load values are acquired at conductors 522A (with its resistor 517), and/or conductor 519 (with its resistor 521). Further information on how software 101 and 800 use these various A/D I/Os to determine the optimum output voltage of a power converter 122A is described in the sections "Conductors and Insulators," and "Granularity of the A/D."

An adjusted voltage value, defined by software 800 (FIGS. 1A-1–1A-9) is sent form MCU 102A in FIG. 13A to power converter 122A, along multi-conductor control line 510. Power converter 122A's resistor ladder (indicated in FIGS. 4-1 and 4-2 as assembly 160) corresponds to binary values expressed by selector 337.

Once power converter 122A has configured its Vout, as commanded by MCU 102A, A/D lines 525 and 527 read power converter 122A's Vout. Software 800 (FIGS. 1A-1–1A-9) and MCU 102A then apply a resistive load 517 to power converter 122A's output, to test the integrity of the power settings. If monitored Vout shows negligible voltage sag under load, and having confirmed that power supply's Vout matches the desired voltage value stored in memory 518A, MCU 102A then closes switches 526 and 526A, allowing power to flow along powerlines 523 and 524 to connector 132, and into battery 508B. The sections "Power Connector," "Connector Operations," and "Diode UPS" explain how a connector 132 reroutes power-delivery lines within battery 508B to bypass the internal battery cell(s), and deliver power to a powered device 508C.

Power switches 526 and 526 a can be controlled by MCU 102A at control lines 520 to operate as polarity-reversing switches. MCU 102A, along with software 800, determines the polarity of the acquired power signal from battery 508B using techniques similar to that of a volt meter. Once the polarity of the battery on powerlines 523 and 524 is known, MCU 102A configures switch 526 to either close the circuit to powerline 524C, or powerline 523. Switch 526A can be directed to either powerline 523C, or 524.

Data Paths

Power box 400 (FIG. 13A) diagrammatically represents the powered devices shown as power adapter 335 in FIG. 10, power module integrated into a battery 347 in FIG. 10, power module 357 in FIG. 11, and power adapter 335B in FIGS. 13 and 13-1. As discussed elsewhere, each of these power devices can communicate with other such devices, with data-enabled "smart" batteries, and even with powered devices such as the laptop 249 in FIGS. 10 and 11. FIG. 13A depicts three forms of inter-device communications:

1) Powerline modulation is used between a battery 508B which has a Modulator/Demodulator (MD/DM) 508D and a processor such as MCU 102D. The corresponding Modulator/Demodulator 508E in power box 400 is controlled by MCU 102A to allow communications along the primary powerlines 523 and 524, which are connected to MD/DM 508E with conductors 524A and 523A. MCU 102A uses lines 511A and 511B as data lines to and from MD/DM 508E. A corresponding scheme is employed within battery 508B to configure its MCU 102D and MD/DM 508D. MCU 102 in power box 400 controls power switches 526 and 526A to be open during a powerline modulation session. The power signal on the primary powerlines is from battery 508B, although the powerlines can be configured through switches 526 and 526A to allow power converter 122A to be the source of power during a powerline session.

In such a configuration in which power is coming from power converter 122A, it is advisable to have controllable switches equivalent to 526 and 526A in battery 508B's circuitry, so as to isolate the main powerlines 524 and 523 during a powerline modulation communications session. Such switches would not be necessary if both MD/DMs 508D and 508E are capable of modulating a secondary signal across a reasonably wide range of voltages. This type of MD/DM would allow communications sessions to occur at any time during power information acquisition (a battery 508B's power signal is on the powerlines), or during power delivery (power converter 122A is providing the primary line voltage). Since power converter 122A functions within the voltage range of associated battery 508B, the two MD/DMs 508D and 508E are likely to be closely matched in their performance and compatibility within at a given voltage range.

Thus, with a smart battery 508B, MCU 102A in power box 400 (FIG. 13A) can acquire data from analog signals (voltage and current) at powerlines 523 and 524, or digital data using powerline modulation can be used by MCU 102A to acquire relevant data from battery 508B. Such digital data typically includes the battery manufacturer's pack "design" voltage, the present state of charge (fuel gauge values), and other values only available by using a true communications link between power box 400 and smart battery 508B.

2) Data port 406A in power box 400 (FIG. 13A) is used to connect a power box 400 to a powered device 508C. FIGS. 13 and 10 depict a power adapter that has a data I/O port 406, which attaches to a mating data port 406A on a powered device, shown in a non-limiting example as a laptop computer 349. This data link allows a communications-enabled external power adapter/module 335 (FIG. 10), 335B (FIGS. 13 and 13-1), or 347 (integrated into a battery as in FIG. 10) to access a powered device 508C's data storage, memory, and software applications, or even the operating system to either acquire power-related information from the powered device, or to share information acquired by the adapter/module with the various hardware/software within the powered device. As such, elements of software 101 and 800 (FIGS. 1 and 1A) relevant to inter-device or network communications can be stored on diskettes, CD-ROMs, DVDs, etc., as appropriate for use with powered devices, servers, embedded LAN nodes, and the like. A non-limiting example of a use for this external adapter/module-to-powered-device communications link can be to indicate with a screen prompt on the powered device that selector dial 504 is incorrectly positioned (this assumes that the powered device is turned ON and operating from battery power).

3) Infrared data I/O 412D (FIG. 13A) is depicted in FIG. 13, as infrared-compliant upper shell 412 of external power adapter 335B. Infrared emitters 412A and collectors 412B are positioned to allow a diffusely-radiated pattern of light over which data can be bi-directionally communicated. While infrared is shown here as a mode of wireless communications, RF and acoustic arrays are also viable, depending on the intended function of the data link, and the availability of compatible devices in the communications environment. Further information about a wireless Ir data link is available in the section "Modules That Open Closed Data Systems."

Software flowchart 800 (FIGS. 1A-1–1A-9) does not include detailed descriptions of the steps in software for a communications session. The wide variety of communications protocols, and selection of specific hardware, cannot be adequately detailed in a series of communications steps in flowchart 800. Since such communications methodologies as powerline communications, wireless (infrared, RF, etc.), and cabled links are so widely known by those skilled in these various arts, the requisite software sequences to read from and write to a communications port can be readily implemented. Information on the data protocols for "smart" batteries is available from the Smart Battery Systems (SMBus) web site (www.sbs-forum.org).

Other Data Links

Power box 400 (FIG. 13A) is representative of various hardware found in external power adapters and modules such as power adapter 335 in FIG. 10, power module integrated into a battery 347 in FIG. 10, power module 357 in FIG. 11, and power adapter 335B in FIGS. 13 and 13-1. All of these external power units requires a power input from a compatible power source. The power source can be either DC, or AC. FIG. 13A depicts hardware by which a power box 400 (and related software 800 in FIGS. 1A-1–1A-9) can communicate with a power source connected at input power lines 505 and 507. Such a communications-enabled power source can be, for example, an embedded power module 100 in FIG. 2, which will be used herein to describe the various communications capabilities.

Just as powerline modulation is used as one of the communications links between power box 400 in FIG. 13A and an attached "smart" battery 508B, so too does power box 400 provide for a powerline communications link between its MCU 102A and a power source 100 in FIG. 2. Note that power source 100 operates under software 101 (FIGS. 1-1–1-4), while power box 400 operates under software 800 (FIGS. 1A-1–1A-9). Power box 400 and its associated powerlines and connectors is illustrated as assembly 400A in FIG. 2 for purposes of illustration. Assembly 400 replaces the two-conductor cord 115 and its associated connectors 103 and 132, so that assembly 400 is interposed between a connector 103 of power source 100, and a battery pack 134. The sequence of events which occur prior to establishing a communications link between a power box 400 and power source 100 are:

1) Pin outs in connector assembly 103 are different for an assembly than for the two-conductor power cord shown in FIG. 2. Therefore, when assembly 400A is attached to power source 100's mating connector 103, power source 100 outputs a default line voltage along powerlines 505 and 507 of +5 VDC.

2) Power box 400 (FIG. 13A), as part of assembly 400A in FIG. 2, receives power source 100's 5-volt power signal along conductors 522 and 522B, which deliver the power to voltage regulator 505A. The regulator outputs a voltage compatible with the power requirements of an MCU 102A along continued lines 522 and 522B, to MCU 102A. This voltage activates and turns ON MCU 102A.

Note: If a user connected a battery 508B to power box 400 (FIG. 13A) prior to making the connection between a power box 400 and a power source 100, MCU 102 can be turned on with power flowing along lines 523D and 523E to voltage regulator 505B, with the power then flowing along conductors 522C and 522D, which are tied into the primary power input lines 522B and 522 to MCU 102A. If a voltage regulator has sufficiently broad input voltage range capabilities, a single regulator can replace the two 505A and 505B.

3) Once MCU 102A is powered by either of the two power sources in step 2 above, the MCU uses A/D lines 529 and 528 to sample the voltage on input powerlines 505 and 507. Note that MCU 102A closes switch 516, using control line 515A, to allow power to flow between input powerline 505 and line 528. Software 800's steps 801 through 806 (FIGS. 1A-1–1A-9) indicate the software branches related to determining to what type of input power source power box 400 is connected. If a 5-volt signal is acquired (software step 803) along lines 529 and 528, power box 400 is connected to a power source 100 (FIG. 2). If the line voltage is 14–16 VDC (software step 804 ), power box 400 is connected to an aircraft's In-Seat Power (ISP) outlet, which typically has a voltage of 15-volts (+/−1 volt). If the detected input voltage is in a range of 9–14 volts, MCU 102A in power box 400 assumes that it is connected to an automotive power source, such as a car cigarette lighter adapter outlet. This process of identifying a power source is important, because the connector 103 (FIG. 2) used to attach a power box 400 to a power source can, in some situations, be common to several of the types of power sources indicated.

4) If the voltage on input power lines 505 and 507 proves to be 5 VDC, which distinguishes a power source 100 in FIG. 2, MCU 102A (FIG. 13A) can initiate a powerline modulation communications session. Modulator/demodulator (MD/DM) 528E is accessed by MCU 102A along send/receive lines 528A and 528B. The modulated signal then travels along lines 528C and 528D, as MCU 102A closes switch 516 via control line 515A. The MCU can engage or disengage switch 516 to initiate (or disengage) a modulated powerline communications session. Power source 100 also has powerline switches 112A, which are equivalent to switches 526 and 526A in FIG. 13A. These switches allow for floating powerlines 505 and 507 during a communications session, as well as providing a means of reversing polarity when a cord assembly 115 is used, instead of a power box assembly 400A in FIG. 2.

Note that power switch 516A remains open, so that power converter 122A remains unaffected by a communications session. Power converter 122A is not capable of operating efficiently from a 5 VDC input, so it is not practical to keep the power converter 122A in the powerline. Later, power source 100 (FIG. 2) will reconfigure its Vout to 28 volts, at the time when power converter 122A (FIG. 13A) is about to be configured to power device 508C.

5) Powerline communications continue during the entirety of the software sequences defined in flowchart 800 (FIGS. 1A-1–1A-9). Power box 400, and power source 100 (FIGS. 13A and 2, respectively) communicate information, for example, about available alternative communications hardware in each device. Power source 100 can be a node in a network of such power sources, all linked by a wireless LAN. Power box 400 communicates to its networked power source 100 information about any wireless communications link hardware it has. Diagrammatic generic power box 400 (FIG. 13A) can, in this non-limiting example, be representative of an actually external power adapter 335B in FIGS. 13 and 13-1. Power adapter 335B includes wireless infrared capabilities, so it is important that a power source 100 know that there is a wireless link available, since power source 100 also has a compatible Ir port 134C (FIG. 2). The secondary Ir communications link enables power box 400 and power source 100 to continue to communicate via Ir, after powerlines 505 and 507 have been reconfigured to 28 VDC.

Power Delivery

Once MCU 102A in power box 400 (FIG. 13A) has completed its information gathering from associated battery 508B (which can include a communications session with a smart battery using powerline modulation, as previously discussed), power box 400 communicates to power source 100, requesting a change in powerline voltage from the present 5-volts, to 28-volts. This call can occur via powerline communications, as described.

Should power box 400 not have the requisite hardware for modulating a signal on a powerline, resistor array 509 is used as a simple means to communicate the requisite voltage change. MCU 102 (and software 101 (FIGS. 1-1–1-4) in power source 100 (FIG. 2) uses its A/D converter functions to determine whether or not a power box 400 is requesting a voltage change at its power supply 122. Software 101 describes monitoring both powerline voltage and current. In particular, software 101 is looking for changes to the line load which indicate that MCU 102A in power box 400 has activated resistor array 509 (FIG. 13A). The resistive values that resistor array 509 are capable of creating on powerlines 505 and 507 are pre-determined, and are thus known to both software 800 and 101. When software 101 detects one of the pre-determined resistive values when checking line load, this serves as a signal for power box 400 to reconfigure the Vout of power supply 122 from 5 VDC to 28 VDC.

Software 800, running in power box 400, requests a voltage change in steps 995 and 993. MCU 102A in power box 400 activates resistor array 509 along control line 509A. Software 101 in power source 100 (FIG. 2) detects the change in line load caused by resistor array 509, and directs its MCU 102 to reconfigure the Vout of power supply 122. Since "Input Power" 109 is (in some environments, such as on a commercial aircraft) 28 VDC, MCU 102 closes bypass switch 112B via control line 130B. Bypass switch 112B takes power supply 122 out of the electrical circuit, and allows the 28-volts available from "Input Power" 109 to be conducted along lines 118 and 112, and then to main powerlines 505 and 507 in assembly 400A (FIG. 2).

Control line 130C is for MCU 102 to configure the variable Vout of power supply 122, and is not associated with control line 130B, which is specific to the control of bypass switch 112B. Lines 120B and 118B are powerlines along which power supply 122 delivers a compatible power signal with which to power MCU 102A (this assumes that power supply 122 has two outputs, one of which delivers a fixed voltage for powering MCU 102, and the other is a controllable and configurable output which is controlled by MCU 102.

Software 800 in power box 400 (is steps 995 and 993) detects the input voltage change to 28 -volts along MCU 102A's A/D lines 528 and 529 (MCU 102A has closed switch 516 in line 528). MCU 102A in power box 400 then closes switch 516A, which allows the 28-volt power signal to flow into power converter 122A. Power converter 122A's output is then configured by MCU 102A to be the optimized voltage previously determined by software 800.

By employing various communications links, power devices can adapt to various compatible and non-compatible power sources. Neither software flowcharts 800 (FIGS. 1A-1–1A-9), nor 101 (FIGS. 1-1–1-4) defines specific inter-device communications sessions, because each type of data communications—whether it be wireless infrared, or powerline modulation—requires specific protocols and hardware interactions (calls, read/writes to various ports, etc.). Since the communications methodologies discussed here are widely known and so readily implemented by those skilled in the art, the description herein of hardware interaction, and the non-limiting examples of communications functions cited, are sufficient to allow one skilled in the art to implement the software coding required to create a communications session.

Software 800 (FIGS. 1A-1–1A-9) monitors output voltage and powerline load during power delivery. If the electrical connection between power box 400 and its powered device 508C is ever broken (perhaps by a user removing connector 132), software 800 shuts down power converter 122A. Further information relating to operation of hardware when configured with software 800—such as power box 400 (FIG. 13A)—can be found in the section "Software Operation."

Example of a Manually-Configurable Adapter

Because manually-selectable power adapters are so widely available, the added circuitry in power box 400 (FIG. 13A) to make them safe and reliable is warranted. By modifying a simple manually-selectable power adapter with the hardware shown in FIG. 13A, the power adapter becomes much more universal. It can be attached to any battery-powered device through a connector 132. This lowers the cost of owning multiple voltage adapters, and makes one adapter interchangeable with a number of powered devices.

Among the various manually-configurable power supplies and adapters available, a product by Nesco (Van Nuys, Calif.) called "SmartAdapter" is a type of manually-configurable power supply. A DC/DC adapter module, which can deliver a range of voltages, is the central hardware device on which the SmartAdapter is based. A user selects an appropriate "SmartCord" that matches the input voltage requirements of a powered device. Each SmartCord has a specific resistor value that is pre-matched to an associated powered device. The correct SmartCord is attached to the SmartAdapter power module to configure a correct output voltage.

But a user must have ready access to SmartCords. Selecting an appropriate SmartCord requires pre-knowledge of power details of the intended powered device, perhaps from users who do not understand the proper reading of product labels that explain input and output voltage requirements. Also, the sheer number of powered devices suggests hundreds, if not thousands of SmartCords, each dedicated to a specific power product. These 12" cords are also easily lost, or confused with each other.

Power adapter 400 in FIGS. 13 and 13-1 and 13A eliminates the need for interchangeable SmartCords. Voltage requirements are not determined by users who may make mistakes, instead a reliable computer process accurately defines voltage requirements. This adds safety, convenience and reliability to products like the Nesco SmartAdapter.

Other Power Supply Modalities

"Configurable" power supplies are not limited to auto-configurable, or selector-controlled manually-configurable modalities, as described above. User configuration can include a function as simple as choosing the appropriate power supply from a number available. A corporate Manager of Information Systems (MIS) may, for example, need to confirm that the one of a number of identical-looking power supplies available in a spares bin is the correct voltage match for a particular powered device. Software 800 in FIGS. 1A-1–1A-9 operates to confirm the proper voltage required, and can also, with a hardware module 335 (FIG. 10), or 357 in FIG. 11, interface with a pre-manufactured, fixed-output-voltage power adapter.

A separate module 357 in FIG. 11 can interface between a powered device's battery pack and an independent power supply. The function of this module is to acquire a battery 355's voltage, using software 800 in FIGS. 1A-1–1A-9, and to compare the acquired voltage information from battery 355 to configure the fixed-output voltage of a power supply 335A. Module 357 cannot use software 800, but can employ a simple hardware voltage comparator. Module 357 can also be a more versatile data acquisition device that stores at least two voltage values in memory, each from a different source, and determines if they are a match. Simple indicators, a non-limiting example of which is a bi-colored red/green LED 338 in FIG. 11, are used to indicate whether or not there is a valid voltage match between an acquired 335A's battery voltage and that of a power supply featuring a manually-adjustable selector 337. Only power supply devices that create a valid green LED indicator when attached to module 357 can be safely attached to a powered device's battery interface.

Pre-Programmed Systems

Automatically-configurable power supplies include embedded or in-line corded power modules that rely on pre-determined computer-readable values-which equate to output voltage matches. A U.S. Pat. No. 5,570,002 by Castleman describes a self-configuring power supply system that relies on computer chips or other hardware/software. This hardware essentially pre-identifies an appropriate output voltage of a powered device to an embedded, multi-point power supply system. This approach is very similar to the Nesco SmartCord defined above. But, instead Castleman relies on manufacturers of powered devices to pre-install a chip indicating each device's correct input voltage. Castleman does not address the availability of a battery pack interface, but only addresses the primary power jack or port of a powered device. This limits Castleman's self-configuring power system to only those powered devices that have an embedded chip or other voltage identifier. Furthermore that chip or voltage identifier software is readable only at a powered device's primary power port. Powered devices built before Castleman are not able to use the multi-point self-configuring power system described herein.

Figures 1, 1A, 2, 3, 4, 5, 6:
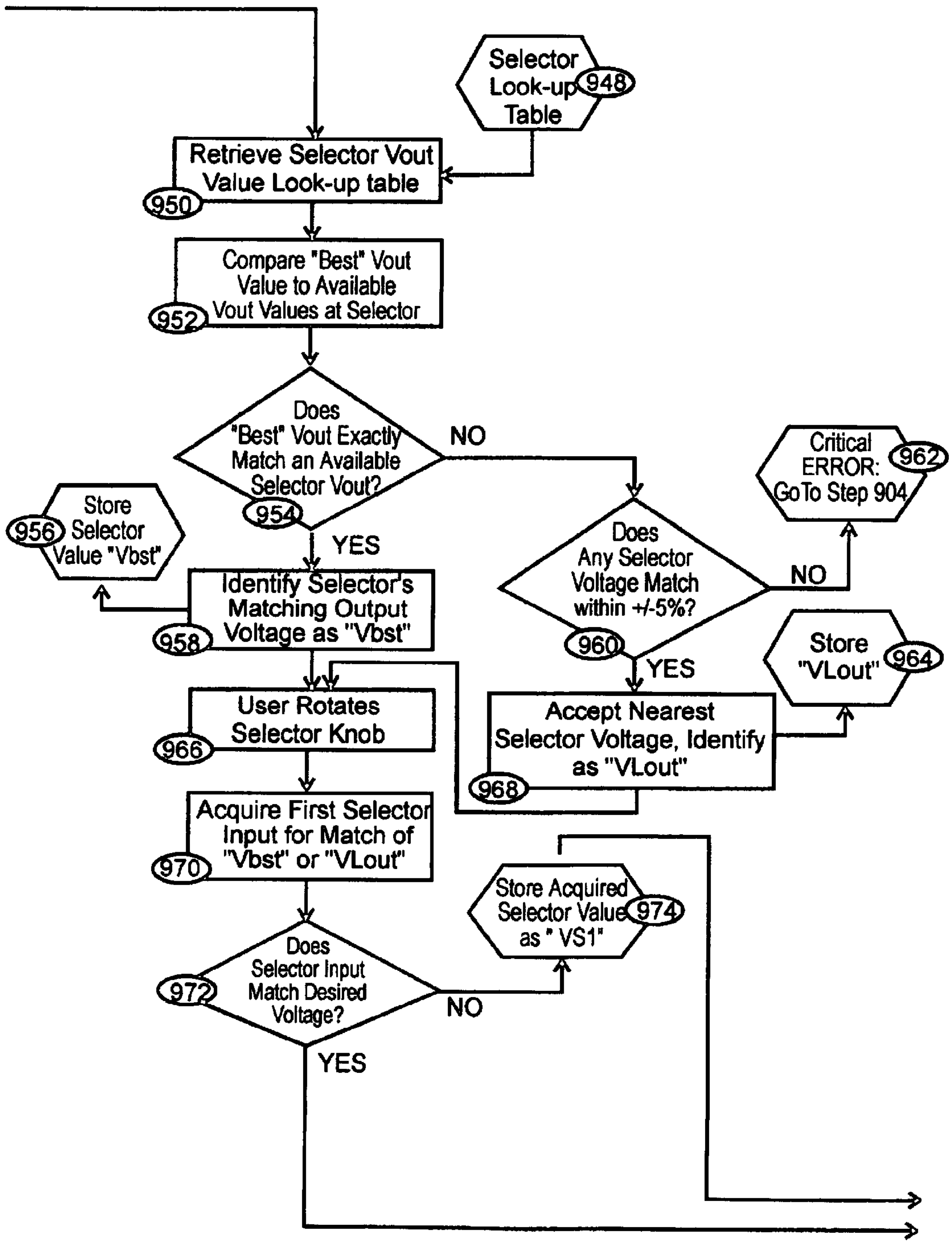
Figure 6E:
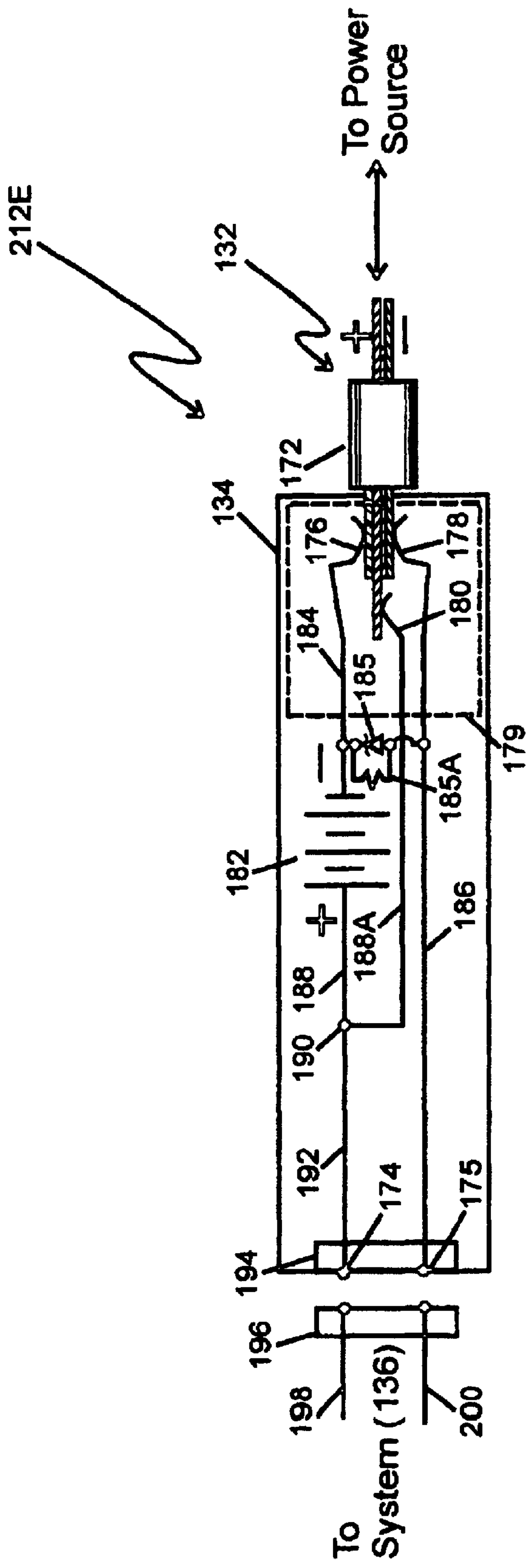

Software 101 and 800 (FIGS. 1-1–1-4 and FIGS. 1A-1–1A-9) and related hardware, provide power device users a battery pack modified as indicated schematically in FIGS. 6–6E. A battery pack modified with connector system 212 or 212A (FIGS. 6–6E), together with intermediate voltage-acquisition hardware as in FIGS. 2, 10, 11 and 13, can yield a valid voltage value which can be used by Castleman's power system. Since battery packs are usually removable and replaceable, non-Castleman-compliant devices can be upgraded to store a voltage value required by Castleman.

A "smart" battery can communicate its design voltage value as a digital value to a data-enabled intermediate module 357 in FIG. 11. Battery-housing-shaped module 347 in FIG. 10 contains electronics equivalent to that shown in FIG. 13A (no power converter 122A in FIG. 13A is present, since the power converter is in power adapter 335 of FIG. 10). Modules 357 (FIG. 11) or 347 (FIG. 10) "translate" a voltage value, using software 101 or software 800 (FIGS. 1-1–1-4 and FIGS. 1A-1–1A-9), to a data signal compliant with Castleman's voltage-identifier system. Thus, software 101 and 800 (and related hardware) enable Castleman's closed-loop system to access voltage values at the battery pack interface, instead of the limiting primary power port of a powered device. The software can also translate analog or digital voltage-specific information into readable data that is compliant with Castleman's schema.

Modules That Open Closed Data Systems

Battery-pack-shaped module 347 in FIG. 10 can be comprised of any, or all, of the various elements that comprise hardware assembly 100 in FIG. 2. As configured in FIG. 10, the presence of a power converter module 335 indicates that a power supply 122 or equivalent in FIG. 2 is not needed in module 347. However, MCU 102, memory 104B, a controller (considered here as integral to MCU 102 in FIG. 2), and perhaps one of the wired (e.g., powerline modulation as Modulator/Demodulator 134B), or wireless communications (e.g., Infrared port 134C) modalities described herein can be incorporated into a battery-pack module 347 in FIG. 10. Thus, capabilities not already built into a power module 335 can be added, without modifying the pre-manufactured power module 335. There can be, but need not be, a master/slave relationship between the two modules 347 and 335. This may be true if laptop computer 349 requires a smart battery, but such "smart" battery capabilities are not necessary to the proper operation of a module 347.

Module 347 (FIG. 10) or 357 (FIG. 11) can be a smart battery emulator, the function of which is to "trick" laptop 349's battery-related circuitry into believing that there is a smart battery present, (instead of a plastic battery housing full of electronics). Such battery emulators are available from a number of sources, including David Simm (Bethesda, Md.). Such emulators are used to test smart battery bus communications hardware and software. If battery charging is to be avoided, the emulator is configured not to request charging activities. Also, since there is no source of power at laptop 349's primary power port, powered device's internal battery charger will not turn on.

Power adapter 335 in FIG. 10 and 335A in FIG. 11 can be only a basic non-configurable AC/DC (or DC/DC) power converter. Although both figures indicate a manual voltage selector 337, in some modalities there may be no ability to communicate with, control, or otherwise configure a power adapter 335. However, module 347 can confirm the output voltage of power adapter 335, and allow power to pass through module 347 and into laptop 349, only if the input voltage at module 347. matches the power requirements of laptop 349. Thus, module 347 serves a vital safety function in protecting laptop 349 from external power adapters like 335 that can output a mis-matched voltage.

If a communications link can be established between module 347 and power adapter 335 in FIG. 10, battery voltage data for powered device 349—acquired at module 347—is transferable to laptop 349, via communications-enabled power adapter 335. As previously discussed, data communications need not be any more sophisticated than powerline modulation. A scant amount of data needs to be transferred—only a binary hex, or other equivalent of a two-digit voltage value, for example. A robust, high-speed data link is not required.

As shown in FIGS. 13 and 13-1, power adapter 335B has a data port 406. Data connector 406 is shown as a parallel port interface, but it can be a USB, serial or any other data I/O port. This port connector gives access for power-related data to software within laptop 349 in FIG. 10. Thus, voltage data acquired at a battery 355 (FIG. 11) by module 357 (or, in the alternative, at a battery-pack configured module 347 (FIG. 10)) is communicated over powerline 336 (using powerline modulation) to a data enabled power adapter 335. Power adapter 335B (FIGS. 13 and 13-1) has a data port 406 that connects to a powered device 349 (FIG. 10). Voltage data previously discussed as acquired from a battery module 347 in FIG. 10 (or external module 357 in FIG. 11) is communicated from module 335B, via data connector 406, to powered device 349. Software resident on powered device 349 captures voltage data from power adapter 335B and stores it in non-volatile memory (or writes it to a storage media such as a hard drive). An external module 357 (FIG. 11) can also have a data I/O equivalent to a port 406A shown in FIG. 10, and as 406 in FIG 13.

Now that powered device 349 has its voltage values in memory, the device can communicate that information to any compatible power adapter or other device. This movement of voltage data from a battery to its host device is via an assembly of hardware and software devices which enable not only compliant power adapters, but also provide power apparatus such as Castleman's, a way to place data in an accessible location specified in his U.S. Pat. No. 5,570,002.

The apparatus in FIGS. 13 and 13-1 is also capable of communicating data wirelessly. Top shell 412 of power adapter 335B is fabricated of translucent plastic, tinted to be compatible with infrared light. Below the tinted Ir cover is a matrix of infrared LEDs (emitters) 412A and collectors 412B, typical of "diffuse" (i.e., non-directional) infrared. The emitters and collectors are arranged so as to disseminate light along various 30×120-degree paths. Collectors are physically isolated from emitters by partitions 412C, so that the collectors are not "blinded" by the emitters. The number of emitters and collectors can vary, according to the requirements of various diffuse infrared vendors. IBM (Markham, Ontario, Canada), Siemens (Bonn, Germany), and Spectrix (Mundelein, Ill.) are companies which have developed diffuse infrared technologies which do not require a specific "point-to-point" alignment of infrared beams.

By using diffuse Ir, the entire top surface, and some portion of the sides of the top shell 412, of power adapter 335B disseminate infrared light into the local environment where, as a non-limiting example, the data within the non-collimated light beams can be captured by a host device 349 (FIG. 10). This wireless capability eliminates the need for a data I/O connector 406 on power adapter 335B in FIG. 13, allowing the device to positioned anywhere in proximity (typically diffuse infrared operates within a range of 10 meters) to its powered device.

Such diffuse infrared capabilities also enable a number of power adapters 335B (FIG. 13) to be wirelessly linked to a compatible local area network. A non-limiting example of such a LAN can be an aircraft cabin configured with diffuse Ir receptors (transceivers) that transmit and receive data over the infrared network, so that power adapters such as 335B can communicate power-related activities at each node on the LAN to a server. The server thereby can monitor overall power consumption in the environment, report on the possible misuse of any power adapter 335Bs by airline passengers, report on a failing module that requires a service call—or to monitor the amount of time an adapter is used, so that an airline can charge a passenger for power usage.

Thus, such a wirelessly networked power grid of power adapters empowers a number of practical solutions which benefit users and providers of power equipment such as power adapter 335B (or equivalents).

Software Access Adds Safety

By making powered device's voltage requirements available at the device's software layer, certain safety benefits are achieved. Smart battery topologies treat battery communications as a closed system. Not only are software applications resident on a powered device unable to access smart battery bus communications, but even the operating system has firewalls between it and the battery data bus. Until recently, this closed system approach made sense. Smart battery technology brought a reasonable level of safety to charging highly-volatile Lithium-Ion (Li-Ion) battery cells. But, commercial airlines are now adverse to even the slight risk that an onboard laptop could. cause a dangerous situation by charging its battery while in flight. The inviolate closed battery bus now needs outside intervention, so that battery charging activities within laptops can be temporarily disrupted during flight, but resumed when those laptops are on the ground.

A system that allows smart battery bus data to be transferred bi-directionally to/from a powered device's application or operating system levels can be created using elements described in the section "Modules That Open Closed Data Systems." Such a data system has a battery pack interface. Male connector 290 in FIG. 8 provides sufficient data lines 292, 294, 296, 298, and 299 to redirect all battery bus communications to an external system. These five conductors of a connector 290 can be directed to a hardware assembly 100 in FIG. 2. If MCU 102 is a Mitsubishi M37515, the $I^2C$/SMBus data port can provide a compatible I/O for the smart battery bus data. Microcontroller 102 is capable of translating the $I^2C$ data protocol to RS 232 data, which can be output at an I/O port. This data port can be the existing serial port 154 in FIG. 3A, as a non-limiting example, or a created parallel port constructed from the 40 programmable I/Os 138. The above description is not limiting to those particular elements referenced here by example, but can be any combination of elements that perform equivalent functions to create the system so described.

Software 101, and 800 (FIGS. 1-1 —1-4 and FIGS 1A-1 —1A-9 respectively) can be integrated into an MCU, or equivalent processor or controller chips. Since elements of both software 101 and 800 relate to functions or operations not necessarily specific to software embedded into a chip, or processor, some software routines or sub-routines discussed herein can be distributed on media such as diskettes, flash, ROM (CD or DVD, for example), or equivalents. This distributed software can be an application purchased by an end user, and loaded onto a powered device such as a laptop computer, for non-limiting features such as a "Power Monitor" display.

Data port 406 in FIG. 13 provides power adapter 335B a means of sending/receiving data acquired from a smart battery bus, as described above, and transferring such data to software running on a powered device, such as a laptop. Linking these various elements together provides a data loop that starts at the otherwise closed smart battery bus in a powered device, rerouted through an external device, then into an available data port on the powered device. Software on the powered device can thereby monitor battery bus activity. If charging occurs, for example, monitoring software 101 (FIGS. 1-1 —1-4) or 800 (FIGS. 1A-1 —1A-9) can send a command to the data-enabled external power adapter to shut down.

Smart Battery Bus Extensions

The closed bus topology and architecture typical of smart battery systems is evolving into a more open platform. SMBus specifications include smart battery bus "extensions" that, to a limited degree, allow other hardware sub-systems in a powered device access to a previously-closed data bus. Extensions to the PCI bus allow the CPU, BIOS and other devices to have limited input and outputs on the smart battery bus.

In the evolving specifications, external devices such as power adapters, can potentially access battery and charger data. While no provisions currently exist for an external device to manipulate a powered device 349's charger control, a power adapter 335, 335A, or 335B (FIGS. 10, 11, 13 respectively) (and schematically 400 in FIG. 13A) is capable of monitoring battery and charger activities. One means of controlling charging from an external device 335 is by disabling power to a powered device (assuming that an external adapter is delivering power to a device's primary power port 343 (FIGS. 10 and 11), instead of utilizing the battery bypass shown in FIGS. 6–6E). Although an aggressive approach, discontinuing external power delivery can be rendered a harmless event. An external device such as module 335A (FIG. 11) that can monitor a battery data bus to confirm that a battery pack 355 has sufficient remaining capacity to power its host device. This eliminates any risk of a possible hardware crash caused by lack of battery power when shutting down external power in order to prevent battery charging.

Thus the various power adapters 335 or equivalents shown in FIGS. 10, 11, 13, 13-1, and 13A are enhanced by data port 406 in FIG. 13. As specifications for smart battery bus extensions open up powered devices' parallel, serial, PC Card, USB and infrared data ports, power adapters such as the variants of 335 are capable of participating in bus communications.

Data Available to Other Systems

As a non-limiting example of the applicability of the bi-directional data system described above, it can serve as a precursor to the power apparatus described by Castleman. Castleman describes an embedded power and data bus, but does not allow for data access to a battery port. By first transferring—by powerline modulation—the power information (consisting of the voltage and current values required by Castleman) from a battery pack to an external device such as a power adapter (335B in FIG. 13); then, secondly, transmitting the power information now captive in the power adapter to its available data port (connector 406, or infrared port 412) where, finally, the power information is now stored in the powered device's ROM, RAM, or written to a storage medium. Thus, the power information which originated at a battery, has now been transferred to the battery's associated powered device. The power information is stored within the powered device until the powered device is attached to the Castleman apparatus. One of Castleman's data cables can then extract the stored power information from the powered device, and use it to configure the output of their embedded power system.

Castleman can also access the battery port via a connector 290 in FIG. 8, for example, used in conjunction with a module 347 in FIG. 10. Module 347 is needed because Castleman addresses common data ports, and not ports that support SMBus (or Dallas 1-Wire) data protocols. Therefore, module 347 is needed to translate smart battery bus data to a format readable by Castleman's apparatus. Furthermore, since software 800 in FIGS. 1A-1 —1A-9 is already resident either on a powered device (either embedded in a powered adapter 335 in FIG 10, or an in-line module 357 as in FIG. 11), a Castleman-compliant cord with an embedded Dallas chip can be connected, and the chip can be written-to from a modified version of software 800. Thereafter, the cord can be used according to Castleman's apparatus. The Dallas Semiconductor "I-Button" series of writeable data chips can be written-to using a 0.5-volt power signal at a parallel port, as a method of creating a Castleman-readable chip.

Even with this power-requirements data now available to the Castleman apparatus other required parameters that identify device classes and types cannot be properly generated. Thus, concerns raised by Castleman about powered devices that radiate EMI can only be ascertained by such devices' manufacturers. No data about such device characteristics are stored, nor can that information be generated by a device that has left the manufacturing process without having had that information embedded specifically for Castleman.

Castleman Cords

The above-described data transfer techniques, with an added means of writing to a Dallas (or equivalent) chip embedded in a cord connector, enables the assembly of hardware and software thus created to generate "Smart Cords" on the fly. Any powered device which can be accessed at its battery, whether that battery is "dumb" or "smart," can provide valid voltage information. This voltage information can be captured by software resident at various locations throughout the system, such as in a processor-enabled adapter or module, or in the powered device itself.

Information on current requirements, while not essential, can also be gathered at a battery report by placing the battery under a known load for a defined amount of time. Because battery charging has been disabled, the load caused by the battery charging process, which can typically be 20 Watts or more, is no longer an issue, so even previously marginal power adapters and embedded power systems have a power reserve.

Whether the values required in a "smart chip" or "smart cord" are specific to voltage and/or current, such data can be written to a cord with an embedded chip (ROM, EPROM, EEPROM, FLASH, etc.) by using the hardware and software described herein.

An Extra Bit of Safety

The modality of power adapter 335B with a connector port 406 as shown in FIG. 13 (or an equivalent), also gains an additional safety feature. Adapter cords, especially when used on an airplane, can become disconnected from the powered device. This can occur simply by the weight of the adapter, dangling from a passenger seat's food service tray causes a connector to become disconnected. That problem is resolved by attaching data connector 406, or an equivalent, to a powered device, as shown in FIG. 10. This arrangement makes for a clean implementation without dangling cords, and has the adapter firmly anchored to its powered device. This arrangement also minimizes cord fatigue, thus extending the life of the power adapter assembly.

Closed-Loop Data Acquisition

The processes defined in software 101 and 800, FIGS. 1-1 —1-4 and FIGS.1A-1 —1A-9 respectively, includes methods of acquiring battery pack voltage without the inclusion of a specific type of power supply. FIG. 11 shows an intermediate data acquisition module 357 to which a plurality of power supply types and battery packs can be connected. This module is not restricted to the form-factor of an in-line device. It can be expressed, as a non-limiting example, as a PC Card (previously PCMCIA card). It can be a module that communicates with a powered device by attaching to a data port, or that wirelessly sends voltage and other information from software 101 or 800 in FIGS. 1-1 —1-4 and FIGS. 1A-1 —1A-9 to a powered device. Thus, software 101 and 800 can operate without a power supply as an interposed communicatins element, per se, by using a module 357 to acquire data at a battery, then to convey it to a powered device through any available data port, so as to render such data accessible to software.

The commonality of the hardware assemblies in FIGS. 10, 11, 13, and schematically 13A is that they are all closed-loop systems. A powered device accesses its own battery via an external module in order to identify the power device's electrical characteristics, in particular voltage (and perhaps load current). Once acquired, this power-related data can be stored in a powered device's internal memory, written to a hard drive, or otherwise logged in an accessible location. By placing battery information at the application level within a powered device, for example a laptop, this data can be accessed by a plurality of power-specific devices. For example, software that relates to power management can, when assisted by a hardware assembly 400 in FIG. 13A, monitor battery capacity by updating changes in voltage (and/or) real-time current loads that are indicators of remaining capacity. Thus, by using a closed-loop hardware assembly and software 101, or 800 (in FIGS. 1-1—1-4 and FIGS. 1A-1—1A-9, respectively), powered devices that are not powered by "smart" batteries can operate more efficiently and safely. Thus, certain missing "smart" battery capabilities are created in on-board software and data connectivity from attached, communications-enabled hardware assemblies.

Adapter Voltages Don't Match Battery Pack Voltages

Users of powered devices have specific needs for battery information that are addressed by one or more of the modalities of software 101 and 800 in FIGS. 1-1—1-4 and FIGS. 1A-1—1A-9. Non-limiting examples of these needs have already been defined as not charging batteries on aircraft, or to access an embedded power system by creating a "smart cord." Users are connecting an external power system to a powered device at its battery I/O, and not to the usual power input port. A powered device's battery port typically does not accept the same voltage as would the power adapter input jack located elsewhere on the powered device. A powered device that operates on a 12 VDC battery will typically require a higher voltage at its external power port. This is usually dictated by the need to charge the battery pack from a power source that delivers a higher voltage than the battery, itself.

Assuming that the user is relying on fixed-voltage adapters, this two-voltage model creates a need to differentiate external DC adapters, since connecting a 12-volt adapter (that matches a battery pack's voltage) to the external power port on a host device may likely deliver a voltage that is insufficient to properly power a device. Voltage acquisition and verification available from software 101 and 800 in FIGS. 1-1—1-4 and FIGS. 1A-1—1A-9 allow a user to compare a voltage displayed on a screen (or otherwise readily identified) to that indicated on an adapter. This brings a layer of safety to the operation of any powered device, by eliminating guesswork that could result in connecting a voltage-mismatched adapter. Any of the hardware assemblies shown in various figures herein will correctly identify a powered device's voltage, when used with software 101 and 800 in FIGS. 1-1—1-4 and FIGS. 1A-1—1A-9. Furthermore, that same software and hardware can verify that an adapter is the correct one for that powered device.

Power Connector

A power connector 132 shown in block diagram FIG. 2, used with software 101 and 800 in FIGS. 1-1—1-4 and FIGS. 1A-1—1A-9, has specific conductive and insulator characteristics which enable the correct software processes. A connector 132 operates by isolating the cells within a battery pack 134. A detailed view of male connector is shown in FIGS. 6A and 6D. As shown in FIGS. 6–6C, battery cells 182 are electro-mechanically separated from battery housing's exposed contacts 174 and 175 at power interface 194. The internal wiring of battery pack 134 has been reconfigured to include a connector interface comprised of contacts 176, 178, and 180. Normally, conductive lead 188 from cell(s) 182 only connects to exposed contact 174. Positive lead 188 has been rewired with a "T"-connection 190, creating new conductor 188A, which terminates in spring contact 180.

Conductive lead 184 from battery cell(s) 182 in FIG. 6 originally was wired directly to exposed contact 175. As modified, power lead 184 now terminates in spring contact element 176. An opposing spring contact element 178 continues the power circuit along conductor 186 to contact 175. Even though the internal wiring of battery pack 134 has been modified, the battery pack operates normally when a male connector 132 is not present. Spring contacts 176 and 178 are normally closed, so that power from cell(s) 182 can flow directly to contacts 174 and 175 as if the internal wiring had not been modified, as shown in FIG. 6.

Connector Operations

Software 101 and 800 in FIGS. 1-1—1-4 and FIGS. 1A-1—1A-9 operates according to the various positions of connector 132 in FIGS. 6–6C. By referencing FIG. 6A to establish the conductive and insulator of male plug 132, the first position of inserted male plug 132 into the mating contacts 176, 178, and 180 within battery pack 134 is indicated in FIG. 6B. The conductive path created by the insertion of male plug 132 flows from battery cell(s) 182 along the first conductor 184, to spring contact 176, where the electrical signal is transferred to male plug 132's conductor 202 (as shown in FIG. 6A) then on to an external power source.

From battery cell(s) 182, a second electrical path is along conductor 188, then continuing along conductor 18A, where the electrical signal is transferred to male plug 132's conductor 206 (see FIG. 6A), then on to an external power source.

The direction of electrical flow along the paths described above is from the battery cell(s) 182 to the external power source. This allows software 101 and 800 (FIGS. 1-1—1-4 and FIGS.1A-1—1A-9) in the external power source (or a separate device) to acquire power-related information, such as a voltage of battery cell(s) 182. Software 101 and 800 use both a Vmin voltage (under load), and a Vmax (no load). A suitable resistive load is applied in the external power supply to allow a Vmin voltage reading. If current readings are required, this resistive load is also used. (See resistive elements 108 and 108A in FIGS. 2 and 2A, and the related text in the Description for further information on the resistive load and related wiring. In particular, FIG. 13A uses resistive elements 517 and 521, as discussed in the section "Vmin").

Software 100 and 800 (FIGS. 1-1—1-4 and FIGS. 1A-1—1A-9 respectively) use the acquired information on voltage (and current if indicated) to configure an external power supply—for example, the representational power supply 122 in block diagram FIG. 2. The software processes are defined in "Software to Configure Battery and Power Delivery Hardware."

Once power supply 122 in FIG. 2 has been configured to a voltage that correlates to that of battery cell(s) 182 in FIG. 6B, connector 132 must be repositioned. A user is instructed to remove connector 132. from battery pack 134, and to axially rotate it. This rotation switches the position of conductor 202 and insulator 208 (see FIG. 6A), so the conductor and insulator are now the obverse of their original positions.

FIG. 6C shows male connector 132 in a second position. Power signal from a power source flows along conductor 202 (FIG. 6A) in male connector 132. Conductor 202 in connector 132 (FIG. 6C) is now electrically in contact with spring contact 178, so that power from the external power source 122 now continues along powerline 186 to contact 175 on battery pack enclosure's connector 194.

A power signal from the power source in FIG. 6C flows along conductor 206 in male connector 132 (FIG. 6A) which is now electrically in contact with spring contact 180, so that power from the external power source can now flow along powerline 188A to interconnected powerline 192, then to contact 174 on battery pack enclosure's connector 194. When battery pack connector 194 is mated to connector 196 of "system" (i.e., powered device 136 ), a power signal from the power source flows into powered device 136.

Note that in this second position of a male connector 132, because insulator 208 in FIG. 6A electrically isolates battery cell(s), no power can flow from battery cell(s) 182, even though the positive (+) side of the cell(s) is still in the newly-created circuit 212B in FIG. 6C. Battery cells 182 are neutralized from being charged, by being effectively removed from the circuit between the power source and powered device 136 in FIG. 6C. Essentially, a Y-connector has been created, the base of which is comprised of spring contacts 176 and 178. The two branches of this Y-connector—one of which leads to battery cell(s) 182, and the other branch to powered device 136—are selectable by positioning the conductive side 202 of a male connector 132 to be electrically attached to one branch or the other.

Figure 9A:
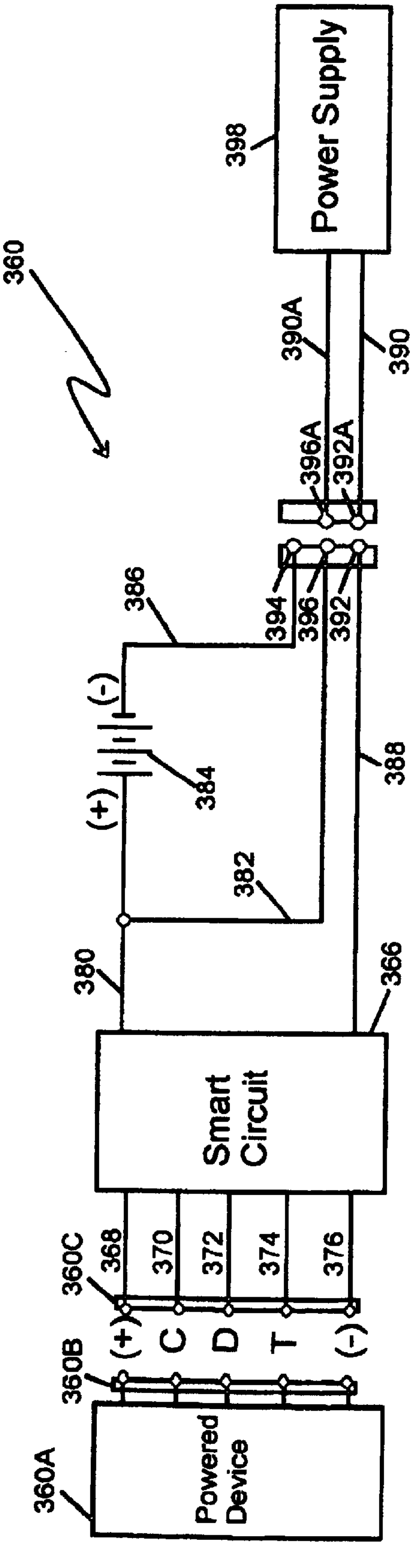
FIGS. 9A to 9D depict wiring diagrams which either include or exclude a "smart" battery's electronics circuitry in a power delivery path between a power supply and a powered device.
Figure 9B:
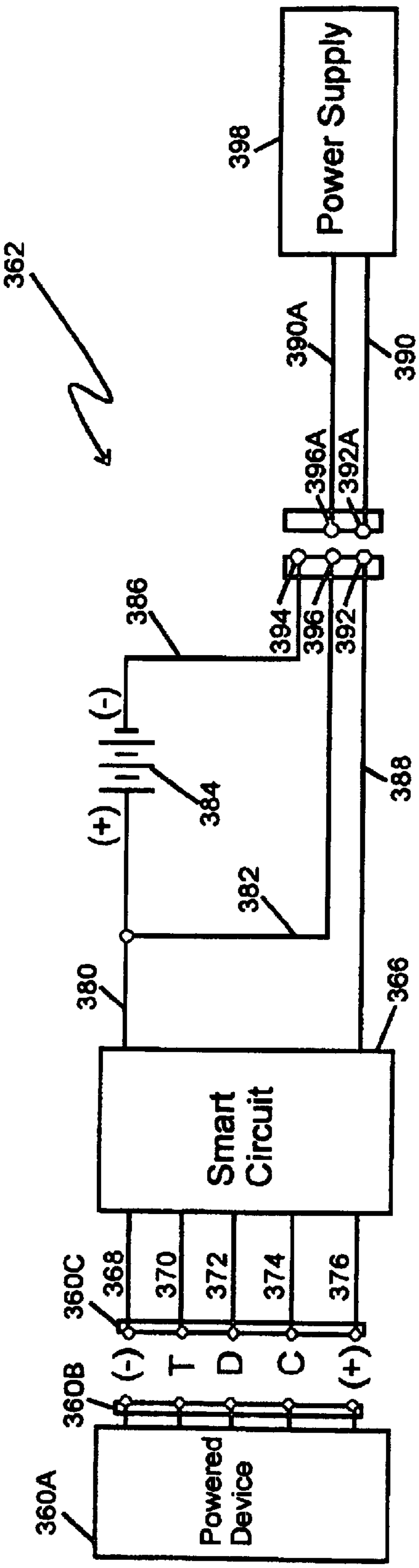
Figure 9C:
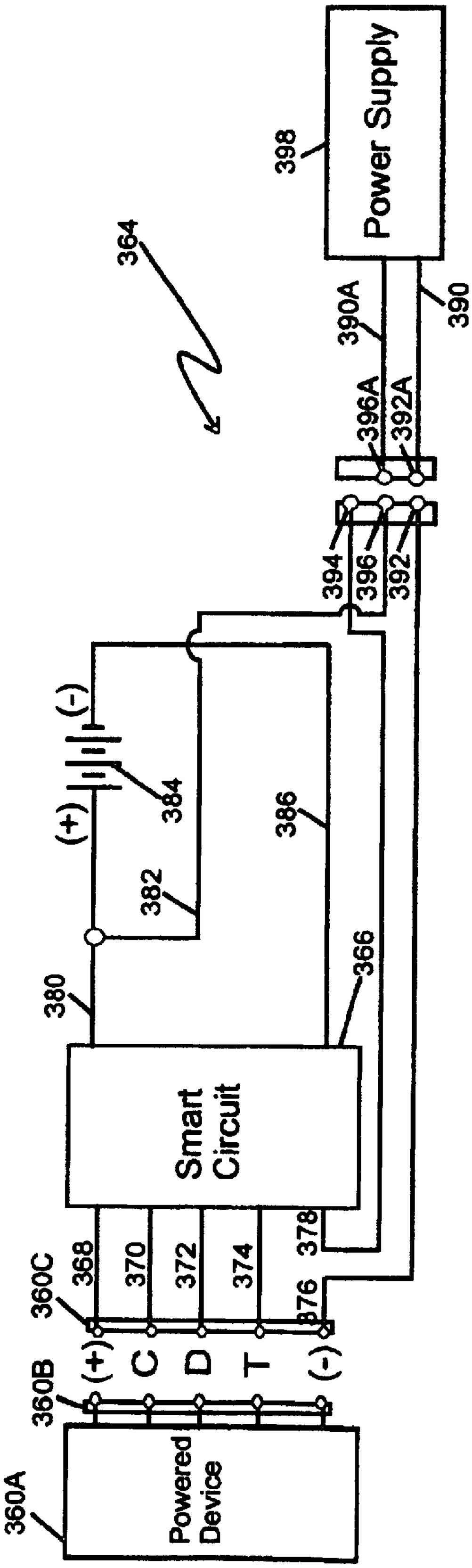

Note that the ground (−) powerline, as is shown in FIGS. 6–6C, is not always disrupted. FIGS. 9A–9C show either disrupted positive or ground lines. Each battery pack is addressed on a case by-case basis in determining which powerline to wire to spring contact clips. Software 101 and 800 (FIGS. 1-1—1-4 and FIGS. 1A-1—1A-9) include reverse polarity detection and correction. Since the first position of a male connector 132 causes power to flow from a battery 182, the determination of polarity is obvious to anyone skilled in the art.

Safely Disabling the Battery

One of the safety functions male connector 132 in FIGS. 6–6E achieves is preventing battery charging. By electro-mechanically isolating the cells within a battery pack, battery charging is efficiently prevented. It may seem that the same function could be achieved with a totally non-conductive male connector 132 inserted into a battery pack circuit such as that shown in FIGS. 6–6C. With such a filly-insulated connector inserted, power could be delivered to the primary power port of a powered device, yet the battery pack would not charge.

While this fully-insulated male connector approach would certainly electro-mechanically prevent battery cells from charging, the power signal at the primary power port of a powered device can still turn on the powered device's internal charger, and potentially damage circuits. Also, a number of powered devices, especially laptop computers, have a battery pack that is wired in series with the primary system circuits. The battery pack must not only be present, but operational (often a reference-voltage circuit is employed) for the powered device to function. Thus, it is neither desirable, nor prudent, to power a device at its primary power port, while disrupting the battery pack's internal circuit. It is much more reliable and safe to power a device through its battery pack.

Furthermore, with the widespread use of "smart" batteries, powered devices are sometimes designed to execute a data handshake with a battery pack during system boot/initialization. If no battery acknowledgment occurs on the battery-system data bus, a host system may not operate. When powered from an external wall adapter, for example, some laptop computers will not is operate because the system cannot locate a battery device.

A laptop's battery is not only a secondary power source when no external power is available, but the battery serves an important Uninterruptable Power Supply (UPS) function. Should external power be lost (e.g., the external AC/DC adapter is inadvertently unplugged from the wall), data could be lost. Therefore, it is essential that the battery always be installed and available to act as a UPS. When connector 132 in FIGS. 6–6C is removed, battery 182 immediately continues powering its host system. Spring contacts 176 and 178 instantly close, restoring a complete power circuit between cells 182 and connector 194 along conductive paths that are readily identified by those skilled in the art.

Diode UPS

FIG. 6E depicts a connector assembly and related wiring 212E, which is another modality of such a connector assembly depicted in FIGS. 6, 6A, 6B, and 6C. The addition of a diode 185 in the circuit between opposing spring-loaded contact beams 176 and 178 allows a power signal from battery cell(s) 182 to flow along conductor 184, through diode 185 to conductor 186. The power signal now available on conductor 186 is accessible at contact 175, making power available from battery 182 to a powered device's system 136. Thus, even though an inserted male connector 132 has temporarily disrupted the flow of the battery 182's power signal across contact beams 176 and 178, diode 185 provides an alternative path for power. Should power from an external power source be disrupted that was flowing through male connector 132 to contact beam 178, then along conductor 186, to contact 175, diode 185 creates a new conductive path, so that battery 182 can take over powering powered device's system 136. (See the description relevant to male connector 132 in FIG. 6A for details on how the connector assembly operates).

Thus, power from battery 182 is available to its associated powered device 136 any time that voltage along conductor 186 drops below the battery cell(s) 182's voltage. Should external power be disrupted, diode 185 provides an effective Uninterruptable Power Supply (UPS) function, even though connector 132 is still inserted in battery housing 134. This function also applies should connector 132 be partially disconnected during power-delivery operations—if male connector 132 were fully withdrawn from mating female connector assembly 179, spring-loaded conductive beams 176 and 178 would close to provide an electrical path between battery 182 and powered device 136.

Diode 185 in FIG. 6E also provides a path for a battery 182's power signal at spring-contact 178. In the description elsewhere of the operation of a male connector 132, the male connector 132 is required to operate in a two-position mode. FIG. 6B depicts a Position #1 of a male connector 132. In this position, an electrical path is created between a battery cell(s) 182 and an external power source along conductor 184, to spring-loaded conductive beam 176, then through connector 132 along its electrical contact 202 (see FIG. 6A). This electrical path created by the insertion of a male connector 132 in its Position #1 allowed an external power source (such as a power conversion adapter 400 diagrammatically shown in FIG. 13A) to acquire voltage readings from battery 182. The positioning of diode 185 does not allow a power signal to flow from conductor 186 into battery cell(s) 182.

By the addition of diode 185, and the new electrical path created from battery 182 to conductive beam contact 178, the need to insert a male connector 132 into a Position #1 is eliminated. Instead, male connector 132 as inserted in FIG. 6E, can acquire battery cell voltage at conductive beam 178, since the conductive element 202 of male connector 132 is now in contact with conductive beam contact 178, instead of conductive beam contact 176 (see FIG. 6C for male connector 132's Position #2 ). Thus, a power signal from battery cell(s) 182 flows along conductor 184, then through diode 185, to conductor 186, where the power signal is available at conductive beam contact 178. The power signal then is transferred to conductor 202 in male connector 132, which is in electrical contact with beam contact 178, and the power signal is now available to an external power source. Thus, diode 185 eliminates of the need to insert a male connector 132 in a Position #1. Instead, a single insertion into what was previously male connector 132's Position #2 is now all that is required.

It may appear as if there would be contention along power conductor 186 when an external power source is delivering power through a male connector 132 (FIG. 6C shows the Position #2 power-delivery orientation of male connector 132). Since, in FIG. 6E, battery cell(s) 182 can deliver a power signal to conductor 186 through diode 185, and an external power source is also simultaneously applying a power signal to conductor 186 through conductive beam 178, a state of contention appears to exist. This is resolved by the external power source's related software (software 101 in FIGS. 1-1—1-4, or software 800 in FIGS. 1A-1—1A-9) configuring the Vout to be of a higher value than can be delivered by battery 182 through diode 185. The voltage depression created by diode 185 works in favor of allowing an external power source's Vout to be the dominant voltage on conductor 186.

Note that a "bleed resistor" 185A is available that shunts across diode 185. This resistor is not essential to the operation of the invention. It allows a non-depressed voltage value to be available to an external power source. Without such a bleed resistor, software 101 (FIGS. 1-1—1-4), or 800 (FIGS. 1A-1—1A-9) in an external power source would compensate for the depressed voltage value caused by a diode 185 in the line. Such a resistor arrangement should be approached with caution, since it does create a potential bypass path around diode 185. Those skilled in the art will be able to properly implement such a resistor in the circuits shown, but the implementation of a diode 185 without an resistor 185A is certainly appropriate in most circumstances.

Diode 185 in FIG. 6E becomes electrically transparent to the battery circuit in battery pack 134, once male connector 132 is removed (see FIG. 6). A battery power signal flows through conductive beams 176 and 178, essentially bypassing the strapped diode 185 (diode 185 will only be fully bypassed if there is a proper implementation of a bleed resistor 185A, so that the power signal does not flow through resistive element 185A).

The location of a diode 185 is not limited to that shown in FIG. 6E. An alternative location is shown in the detail of a male connector 132A in FIG. 6F-1, which differs from the male connector 132 shown in FIG. 6E. Male 132A has conductive elements 202 and 202A above and below a central conductor 206, each separated from the other conductors by thin insulators 204 and 204A. Conductive element 202 does not pass through connector backshell 210, but instead terminates inside backshell 210. Diode 185B is strapped across conductive elements 202 and 202A, so that the direction of power signal flow is from upper conductor 202, downward to conductive element 202A.

When a male connector 132A (FIG. 6F-1) is inserted into mating connector assembly 179 (FIG. 6F) in a battery pack 134, conductive beam 176 is electrically active to male connector element 202, and opposing female conductive beam 178 is electrically attached to male connector element 202A. The battery power signal can flow from cell(s) 182 along conductor 184, to conductive beam 176, where it transfers to male connector element 202, then travels through diode 185B, and along conductive element 202A out to an external power source. This provides the voltage acquisition modes called out in software 101 (FIGS. 1-1—1-4) and 800 (FIGS. 1A-1—1A-9).

Figure 6F:
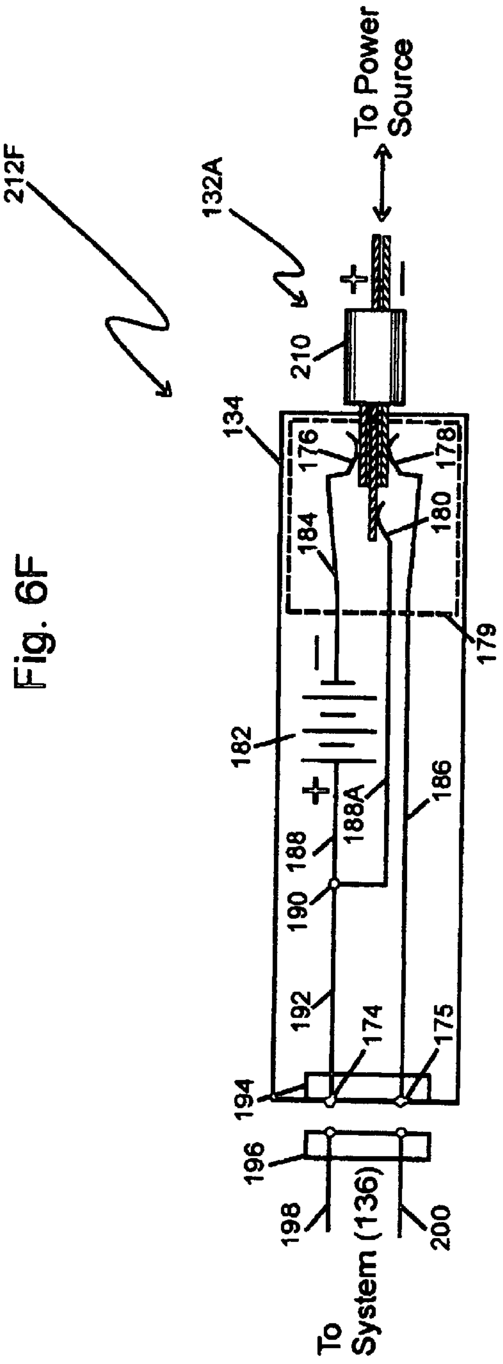
Figures 1, 6F:
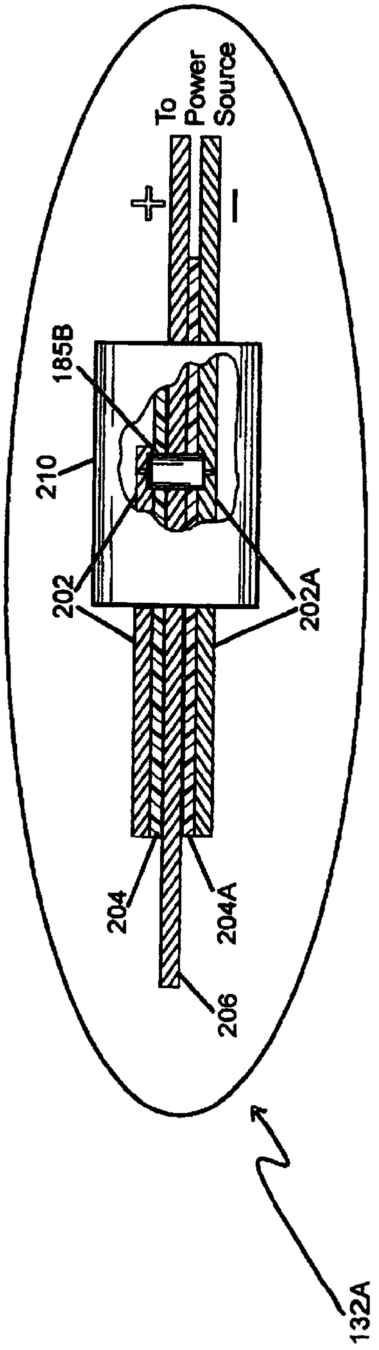
Figure 7:
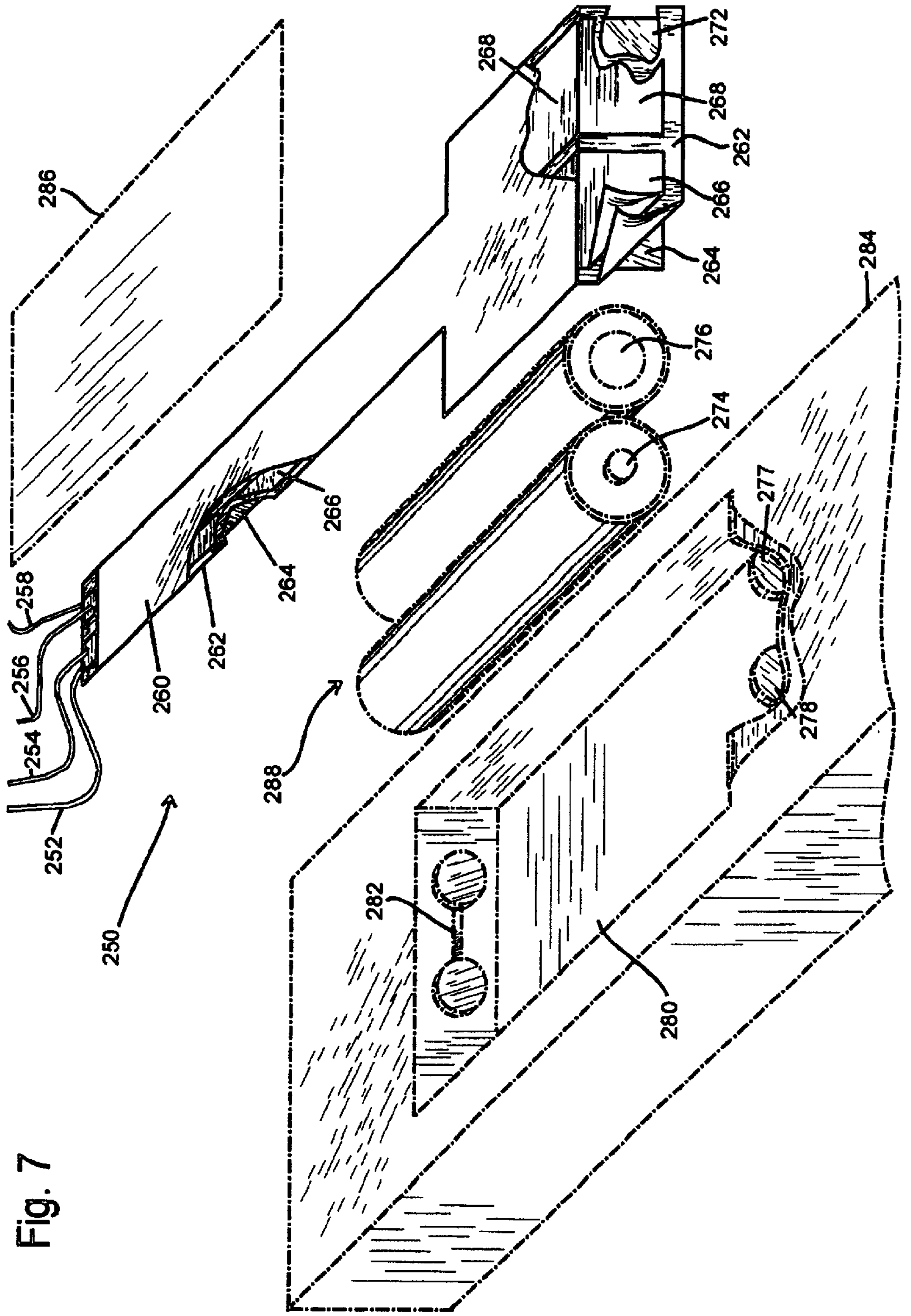
Figure 8:
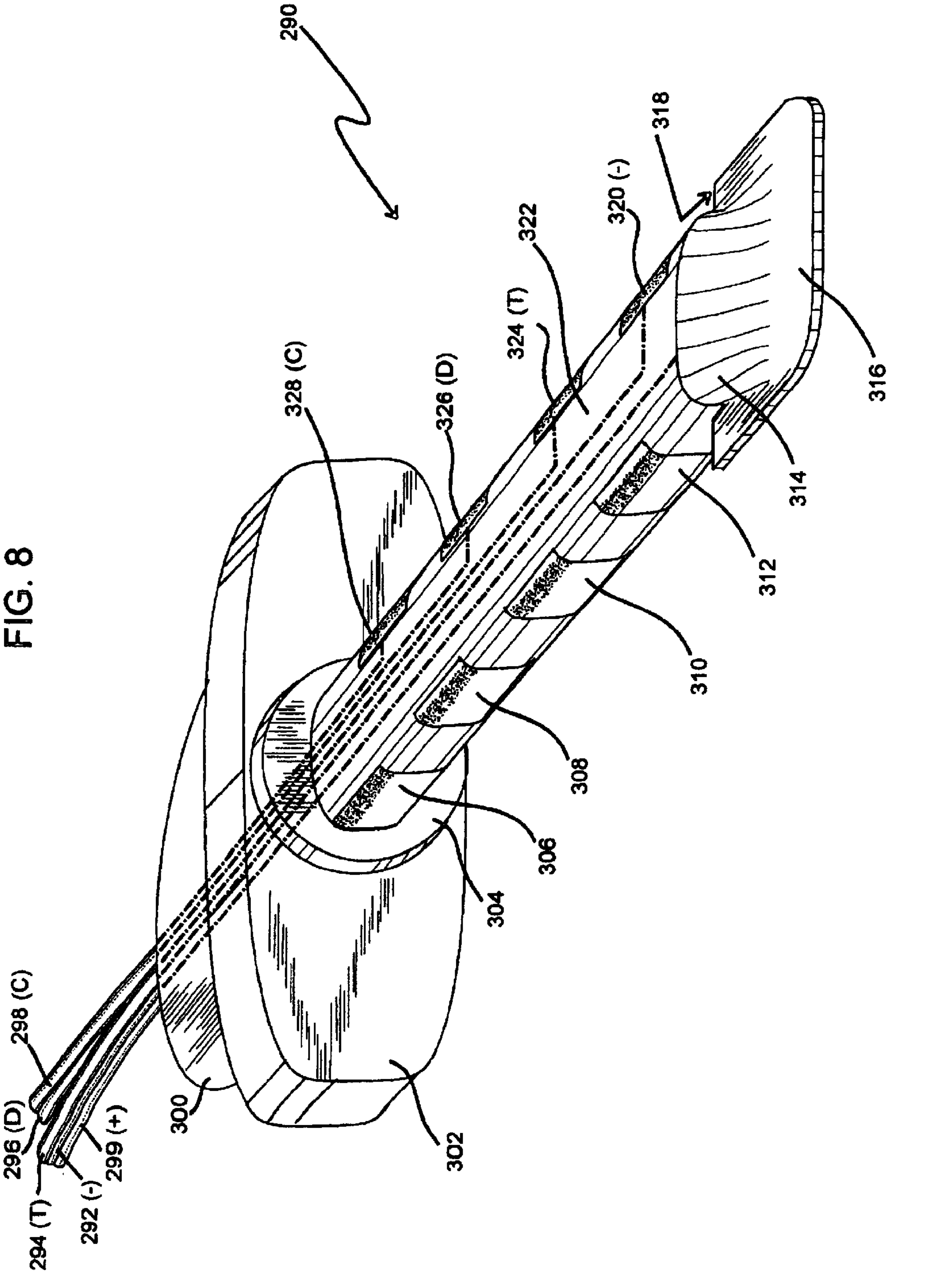

When the external power source applies a voltage signal (Vout) to male connector 132A (FIG. 6F), the power signal travels along conductive element 202A, but is prohibited from traveling into conductive element 202 by diode 185B (FIG. 6F-1). Therefore, the power signal travels to the terminus of conductive element 202A, where it is electrically attached to conductive beam 178 in female connector assembly 179. Then power signal then passes along conductor 186 in battery pack 134, reaching contact 175, where the power signal can then be transferred to the power device's system 136 at a mating contact and conductor 200 (connector 196 and its conductors 200 and 198 are internal to powered device 136, as would be the case with battery contacts in a removable battery's bay, for example). As noted previously, the Vout voltage from an external power source must be of a higher voltage than that available through diode 185B, to allow the power signal to be the dominant voltage on the shared conductors.

The software flowcharts in FIGS. 1-1—1-4 and FIGS. 1A-1—1A-9 can be modified by those skilled in the art to conform to the addition of a diode 185 in FIG. 6E (or in FIG. 6F-1). Elimination of the software steps which are used to verify a removal and reinsertion of a male connector 132 are REM'ed out. These are steps 716–758 in FIGS. 1-1—1-4, and steps 920–938, and 991–971 in FIGS. 1A-1—1A-9. Also, as previously noted, accommodation is made for the depressed voltage values acquired through diode 185. Since the depressed values are a constant, all voltages (e.g., Vmin, Vmax, etc.) are uniformly depressed, resulting in what will appear to be battery voltage values that suggest a further state of discharge than is actually present. Look-up table 799 in FIG. 15, in particular, would be skewed if acquired voltage values are not readjusted. The simplest approach is to add a voltage compensating factor or zero out the error created by diode 185 (FIG. 6E) at the time each voltage value is acquired, and prior to any voltage comparisons, or references to various look-up tables.

A power FET can be used in place of diode 185 in FIG. 6E, providing that there is an MCU (or equivalent controller) available in battery pack 134. Such an MCU 102 D is indicated in FIG. 13A, residing in battery pack 508B. The power FET would be switched in and out of the circuit, as controlled by the MCU. Those skilled in the art will be able to integrate a controllable FET switch into a battery circuit, using the information provided here regarding the placement and operation of a diode 185.

In summary, in the non-limiting examples above of the addition of a diode 185, (or equivalents such as a power FET) either in a battery circuit (FIG. 6E), or in a connector 132A (FIGS. 6F, and 6F-1), such a change in the circuitry eliminates activities associated with an end user reconfiguring the position of a male connector. As such, it is the preferred method of the connector hardware of the invention. Software 101 (FIGS. 1-1—1-4) and software 800 (FIGS. 1A-1—1A-9) employ steps which assume that a two-position male connector 132 (FIGS. 6, 6A, 6B and 6C) is being used. This assumed connector modality better illustrates the flexibility and hardware identification capabilities in both software flowcharts. Both software processes are easily modified by those skilled in the art to accommodate a single-insertion male connector.

For further information on the use of diodes, see the section "Diode Depression."

Smart Battery Circuits

Smart battery packs are addressed in FIGS. 9A–D. Four possible wiring diagrams show power conductors configured analogous to FIG. 6–6C. Two major variants are shown as FIG. 9A and FIG. 9C. These differ in where one of the power conductors ((+) or (−)) is rerouted . . . either ahead or behind smart circuit 366. If the smart circuit design requires one of the output powerlines 368 or 376 to be electrically attached to smart circuit 366, then the wiring configurations in FIGS. 9A or B is appropriate. In these two models, which only differ from each other in their polarity, disrupted powerline 388 is upstream of smart circuit 366. Essentially, external power supply 398 replaces battery cells 384. The downstream smart circuit 366 does not know that power is not coming from cells 384, so the entire system, including the corresponding "smart" circuitry in the associated powered device, operates normally.

Critical data values from smart circuit 366 in FIGS. 9A and 9B are not disabled. The battery cells 384, now replaced in the power circuit by power supply 398, deliver adequate voltage in excess of the host system's Vmin requirement. Software 101 and 800 in FIGS. 1-1—1-4 and FIGS. 1A-1—1A-9, respectively, always round to the next highest voltage after performing its various calculations, so that a generous input voltage is detected on line 388 in FIGS. 9A and B. Voltage drop toward Vmin is usually a prime indicator for a charge. In smart battery implementations, the battery is the system master, and initiates the charging process.

FIGS. 9C and D represent alternative modalities to the wiring schema in FIGS. 9A and 9B. Powerline 376 is disrupted downstream of smart circuit 366. This takes smart circuit 366 out of the host system's data loop. In certain implementations, this is desirable, especially for those smart circuits which rely on cell capacity (instead of voltage) to determine when charging is necessary. In most battery packs, the choice of which of the four modalities indicated that works best is somewhat inconsequential, as it relates to battery charging. There is no external AC/DC power at a host device's primary power port. Since the wall adapter is not connected, there is no power available to the battery charging circuit in the host device! Therefore, the choice of wiring schema is only predicated on the host system's need to acknowledge data from the modified battery system. Because there are so many variants of "smart" battery implementations, the correct choice can only be arrived at by empirical testing. The relationship of cell voltages to Vmin and charge requests in smart battery systems can be better understood by reviewing Sunny Wan's study "The Chemistry of Rechargeable Batteries." Cadex Electronics, Inc. 7400 MacPherson Avenue, Burnaby, BC, Canada V5J 5B6. That company's "Batteries in a Portable World" is also a good basic primer.

Alternative Interfaces

Male connector 132 in FIGS. 6–6D, and 8 is not the only method of isolating a battery (s) 182 from a powered device 136. As non-limiting examples, FIGS. 10, 11 (and 13 schematically) show externally attached interfaces that provide a suitable way to power a host device through a battery compartment, while maintaining analog (power) and digital (data where applicable) connectivity to a battery pack (see PCT Patent Application No. PCT/US98/12807, and U.S. patent application Ser. No. 10/105,489).

Approaches similar to the non-conductive insert discussed previously include eliminating the cells from a battery pack, and only using the empty plastic housing (with wires running through it) to deliver power to a host device. While this may seem logical, the risk of misuse of such an empty battery enclosure can include using the pack housing as a terrorist device. Filling the blank battery enclosure with explosives makes a lethal weapon of the battery pack. The application of external power would serve as the igniter of such an explosive package.

On a more pragmatic level, if the battery pack is a "smart" design, it will likely be necessary to include the smart circuitry in such an empty plastic housing, so that the powered device can communicate with its battery. The cost of this "empty" battery enclosure and its expensive smart battery circuitry make it a poor substitute for a fully operational battery pack. The addition of battery cells to such a construct would not add significantly to the already high price of such a semi-empty enclosure. Furthermore, such modified battery enclosures have no practicality in environments where battery charging is desirable. Transporting such empty battery packs is also an inconvenience, since even empty battery housings can be quite bulky. For example, a Digital HiNote Ultra 2000 laptop's battery pack measures ¾x2¼x11."

Since a powered device's battery serves a vital UPS function, should external power be unexpectedly disrupted, an empty plastic housing removes a key safety feature. Without a battery back-up, valuable data can be lost in a power-loss-precipitated system crash.

Conductors and Insulators

Male connector 132 in FIG. 6A is expressed as a flat-bladed assembly 132, comprised of two insulator layers 204 and 208, and two conductive layers 202 and 206. These layers are interleaved so that the outer layer on one side of the "blade" is an insulator 208, while the outer layer on the opposite face is a conductor 202. As configured in FIGS. 6–6D, conductor 202 always is negative (–), while conductor 206 is always positive (+).

Figure 9D:
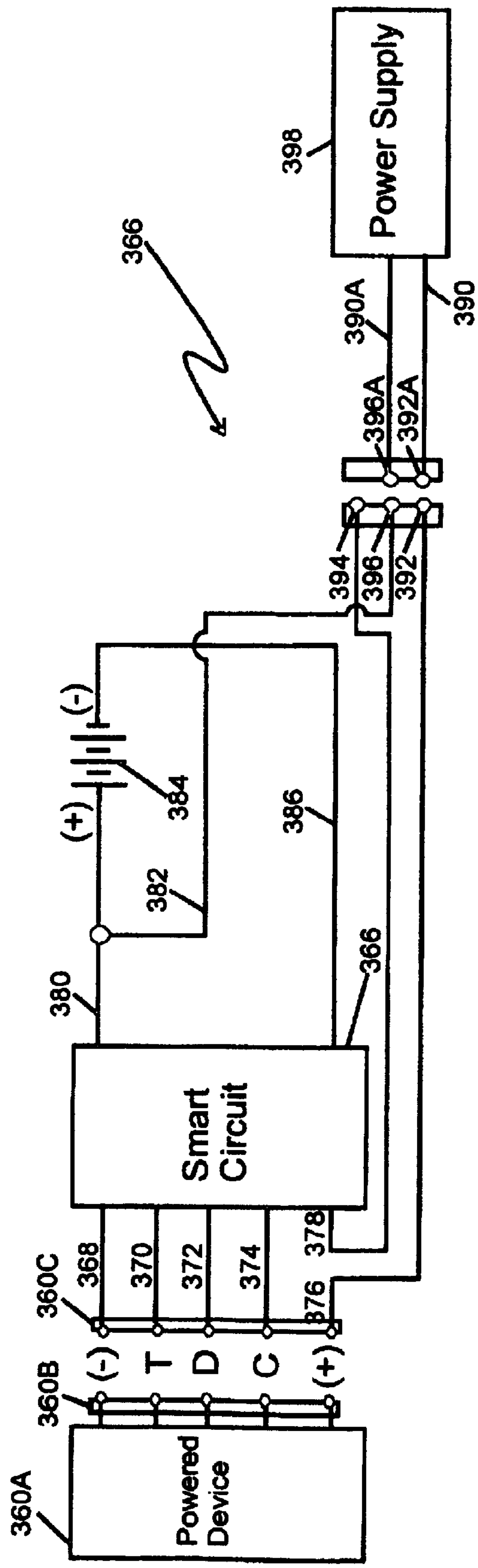

The polarity of conductors 202 and 206 is not limited to a negative (–) line being broken by the insertion of a blade assembly 132 into a mating female assembly in battery pack 134 in FIGS. 6–6C. A positive (+) conductor can be interrupted instead, to ensure that the cells within a battery pack are removed from an active circuit, as illustrated in FIG. 9D. So too, in some implementations, it could be necessary to disrupt only one data line (should there be data and power lines available), to achieve the effect of disabling the battery pack. As previously noted under "Safely Disabling the Battery," certain powered devices may require a data link between a battery pack and the host system to be preserved in order for the device to operate. In such implementations, disrupting the positive (+) power conductor can still provide data communications, if the negative (–) power line is used in conjunction with one or more of the data lines. Still other non-limiting examples of preserving a powered device's functionality include disrupting only a data line (for example, the "C" (Clock) line), so that the data communications can still occur, but without sufficient capabilities to let the battery pack charge or perform other undesirable functions.

Software 101 and 800 can be used without the full A/D functions defined in FIGS. 1-1—1-4 and FIGS. 1A-1—1A-9, respectively. As non-limiting examples, battery pack "design" voltage, and actual voltage, are readily available from a "smart" battery's internal data registers. Instead of acquiring analog data on voltage and current, as software 101 and 800 prescribe, an alternative modality is to acquire digital data. The A/D functions would still be necessary, in such examples, for sensing other power functions, such as the output voltage of a power supply 122 in FIG. 2. The hardware required to acquire digital data can include a different "key" connector interface 132 between a battery pack 134 and a module 100. FIG. 8 illustrates a multi contact male connector that is capable of being both power and data enabled.

When male connector 132 in FIG. 6B is inserted into mating connector assembly in battery pack 134—to create construct 212—conductor 202 of male connector 132 is electrically connected to battery cell(s) 182 at spring contact 176, via power conductor 184. Conductor 206 in male connector 132 is electrically connected to the positive side of battery cell(s) 182 by spring contact 180 and power lead 188A and 188. In this configuration, the voltage of battery cell(s) 182 can be read by an external power source. A non-limiting example of that external power source is represented as hardware assembly 100 in FIG. 2, specifically MCU 102's A/D ports in FIG. 2A. A/D I/O port 110 reads no-load voltage, while A/D port 106 and 112 read voltage across loads 108 and 108A respectively.

Thus, battery cell(s) 182 in FIG. 6B deliver a positive (+) power signal along power lead 188 to T-intersection 190, than along lead 188A to spring contact 180. There, the positive (+) power signal is transferred to male connector 132's conductor 206 (see FIG. 6A), then out to a power lead 114 or 116 in cable 115 (FIGS. 2 and 2A).

Battery cell(s) 182 in FIG. 6B deliver a negative (–) power signal along power lead 184 to spring contact 176. There, the negative (–) power signal is transferred to male connector 132's conductor 202 (see FIG. 6A), then out to powerline 114 or 116 (FIG. 2 and 2A).

The operation of assembly 212A (FIG. 6B) and 212B (FIG. 6C) assumes a reasonably quick removal of male connector 132 from battery pack 134. There is a transient moment when spring contacts 176 and 178 are reclosing to each other. Laptops typically have capacitor circuits which provide a few milliseconds of hold-up time. This is usually to accommodate minor irregularities in the electrical interface between the battery housing 134's contacts 174 and 175 and the mating contacts 190 and 200 in the powered device 136. Spring clips are often used as contacts 198 and 200, so minor intermittent electrical contact is expected, as the battery pack can shift as a laptop is being carried, or moved around on a desk, while operational.

Referencing male connector 132 in FIG. 6D, the end of the "blade" is tapered to a thin edge. Being conductive, the shape of this tip allows a virtually continuous power flow at spring clips 176 and 178 in FIG. 6 as the connector blade tip 548 in FIG. 6D is being inserted or withdrawn.

Should there be a need to keep power flowing more reliably between spring contacts 176 and 178 in FIG. 6, blade tip 548 in FIG. 6D (and any equivalents) can be gold plated, as well as contacts 176 and 178. Furthermore, the geometry of the curved portion of the "throat" between spring clips 176 and 178 can be contoured to allow the mating surfaces of clips 176 and 178 to make reliable contact with each other before the electro-mechanical contact with a blade tip 548 in FIG. 6D is disconnected. This may be nit-picking, especially since it is not anticipated that there will be situations in which powered device 136 in FIG. 6 is still turned on when "key" connector 132 is voluntarily withdrawn. In unanticipated events like a user tripping on a cord and disconnecting it, the contacts 176 and 178 are electrically closed in a matter of a few microseconds, typically.

Multi-Contact Connectors

FIG. 8 illustrates a multi-contact male connector 290 that is capable of conducting both digital and analog data (see U.S. Pat. Application Ser. No. 09/37/781, and International Patent Application No. PCT/US99/19181).

FIG. 8 represents a different modality of a male connector 132 in FIGS. 6–6D. The eight conductive contacts 306, 308, 310, 312, 320, 324, 326 and 328 can be assigned analog and/or digital lines. For example, contact 320 is an analog (–) power contact, while contact 324 is assigned to the ("T") Temperature digital data line. Contact 326 is ("D") data, and 328 is ("C") clock as representing the traditional five-conductor wiring schema of a smart battery (reference FIG. 9A–C and elsewhere). As shown here, male connector 290's point 316 can be rendered conductive, to accommodate a fifth (+) line to yield full smart data and power connectivity between an external power source, a battery and a powered device. If the goal is to disable battery charging, typically only one conductor of the five need be disrupted (that particular power or data line can vary from battery to battery, based on a manufacturer's implementation of smart battery communication).

In FIG. 8, contacts 306, 308, 310 and 312 are non-functional. They need not be present at all in most configurations. They are shown here because some battery or host system implementations can require them to be jumpered, have a resistive load or, in instances where a device in the system needs an identifier to operate, provide access to a readable chip (not shown).

For example, Castleman's U.S. Pat. No. 5,570,002 requires a Dallas Semiconductor chip to be read. This chip identifies the output voltage of an external power source. However, since Castleman restricted his patent to the primary power port of a host system, and did not address available data at a battery port, he overlooked the readily available smart chip in a smart battery. This smart chip has some 32 data registers, one of which is the battery manufacturer's design voltage.

By using a "dumb" connector 290 in FIG. 8, contacts 320 (–) and 326 (D) will deliver the battery's design voltage from the battery pack's smart circuit, without the need for Castleman's proprietary and dedicated chip embedded in a cord or connector. It should also be noted that, while Castleman suggests that power-related information can be elsewhere in the host system (such as in ROM and RAM), the SMBus Smart Battery specifications specifically preclude access to smart battery data at the software level, as well as to any existing analog or digital ports on a host device. Castleman allows only for data access at a host device's power or data ports, so any specific power data from a smart battery is not available to Castleman's invention, because the SMBus is a closed system, not accessible from data or power ports known to Castleman. Therefore, the only practical method of accessing voltage data from an embedded chip is to access the smart battery chip via a newly-created power and data port, as defined in this invention.

Because there are so many possible variants of smart (and dumb) battery circuits, it is impractical to document every modality here. However, the basic male connector 132 in FIGS. 6A–D accommodates the vast majority of battery packs. Male connector 290 in FIG. 8 is useful in situations where the acquisition of digital data is required, although it can be used in non-data implementations for power only.

Male connector 290 in FIG. 8 is designed to rotate like a key inside a mating female connector (not shown), instead of being removed, rotated and reinserted, as does removable connector 540 in FIG. 6D. The eight contacts 306, 308, 310, 312, 320, 324, 326, and 328 are offset and staggered along the length of insulated shaft 322. By off-setting the contacts, there can be as many as 16 mating contacts in a battery pack, so that a plurality of data paths can be created as male connector 290 is rotated between two positions.

The 16 contacts would result from a two-position rotation, whereby all 8 contacts are active in each of those two positions.

Sets of mating female contacts align with connector 290 (FIG. 8) at 180-degree opposing locations, so that there are at least two closed-circuit positions as connector 290 is rotated. Shaft 322 is wider than its height dimension to create pressure against mating contacts as the male "key" is a rotated. Spade-shaped tip 316 keeps longitudinal alignment of connector contacts to mating contacts, and also serves to stop over-rotation as the flanges 318 block against stops in a female receptacle (further details of the female receptacle are defined in U.S. patent application Ser. No. 09/378,781, and International Patent Application No. PCT/US99/19181).

FIG. 8 shows five wires 292, 294, 296, 298, and 299 attached to connector 290. As configured here, only power-lines 292 (attached to contact pad 320) and 299 (attached to conductive tip 316) are minimally required for system operation. Connector tip 316 is utilized in this non-limiting example as making electrically conductive to the (+) contact in the battery pack. If there is a shared ground, only one contact (here 316) need be electrically active. In the example of wiring in FIG. 8, wires 294, 296, and 298 are data lines, and are typically not essential to the operation of software 101 and 800 in FIGS. 1-1—1-4 and FIGS. 1A-1—1A-9 respectively. To reduce wire diameter and yet preserve the opportunity to access any of the three data contacts "T," "D," or "C," a mux or n-signal switch (not shown) can be incorporated in shift 322 or connector handle assembly 300/302 of connector 290. Such a switch allows a less-cumbersome 3-wire cord that has all of the data functions of a five-conductor cord when using a Dallas 1-Wire approach.

Two-Line Bi-directional Data

Certain "smart" data communications systems can be made to operate with two-conductor cords, by implementing a buffer or memory on a chip to temporarily hold data(see element 551 in FIG. 2), prior to muxing the lines. Thus, a chip like the Dallas Semiconductor (Dallas, Tex.) DS2437 "Smart Battery Monitor" can be embedded in a male connector 290 (FIG. 8), 540 in FIG. 6D, or equivalent. Three of the eight contacts shown in FIG. 8 are then active between connector 290 and a battery pack having a mating connector. This Dallas chip reads real-time data as A/D information, unlike Castleman's schema which has all functional data pre-programmed in a digitally-readable chip at the time of manufacture. Thus, the implementation described here of acquiring a power device's power values at the time of use, is not used by Castleman. Nor is the storing of values from a battery, either pre-stored, or created while the system is in use, then stored for later access, addressed by Castleman. Castleman deals with the voltages that power a host device at its primary power port, and not with the different voltage values used to power that same host device through its battery port.

Data is stored on the Dallas DS2437 (or equivalent) chip in its 40 bytes of EEPROM memory. This memory, 551 in FIG. 2, as designed by Dallas Semiconductor, can survive even short circuits, so its use in a line-switching circuit is beneficial.

Data now available from the Dallas DS2437 chip is available to an external device over a two-conductor cord, by including either a mux or microcontroller in a male connector 290 (or equivalent). A microcontroller, such as the Dallas Semiconductor DS87C530, or the Mitsubishi M37515 (or equivalents) can be used to create a simplex switch, via a multiplexer, that allows two lines to be shared for bi-directional data. There would be no frame ground present. Connect the Tx-to-Rx lines on an RS 232 driver receive chip. Hook the line to the input side of the driver and the output of the receive. The multiplexer asserts control over the lines. The two wires are thus signal and ground. Such muxed lines on a serial port require software protocol controls for send/receive collision avoidance.

Instead of muxing the lines, another approach is to use RS485 transceiver chips, to establish CMOS signals on one side (receive out, driver in) and a send/receive pin. The output is a 5-volt differential as simplex. In operation, a "slave" processor (as circuitry in male connector 290) is in "listen" mode, until another processor ("master" in an external power supply) sends a command to acquire and send data. Software allows for some period of latency while the slave acquires data, such as actual voltage. Once the data is sent, the slave goes back to a listen mode. One line works in both directions, as a shared data line. RS485 chips from National Semiconductor (Santa Clara, Calif.) are available that share common differential lines and have common CMOS lines with transmit and receive signals.

At the MCU, two general-purpose I/O port pins are used, one of which is the Tx/Rx pin. Software writes a 0 to put the line in a transmit mode, then changes the pin back to a listen mode. The communications protocol can be loaded to the 16 Kb of EPROM on the Dallas Semiconductor DS87C530, for example.

Power on the two-conductors is +5 VDC, which can be generated by a regulated battery voltage in the circuit. This is preferable to using the variable output voltage of an external power supply. Power supply should be shut down when the system is in a communications mode, to free the two power conductors for data. However a power supply can deliver +5 VDC to its microcontroller, but not apply such a voltage directly on the power/data conductors directly. Those skilled in the art can execute such two-wired communications schema as defined above.

Flex-Connector Interface

Figures 1, 1A, 2, 3, 4, 5, 6, 7:
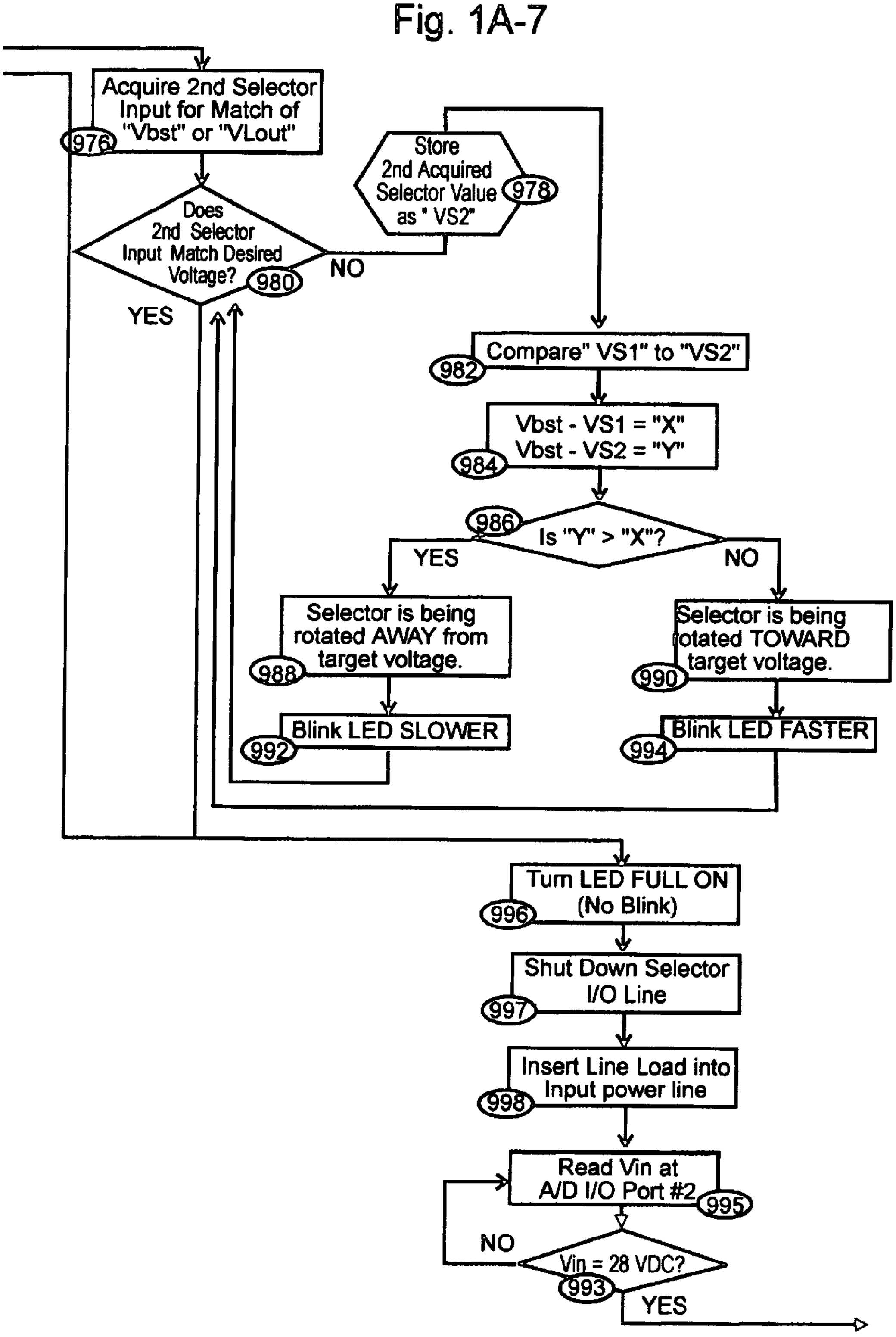
Figures 1, 1A, 2, 3, 4, 5, 6, 7, 8:
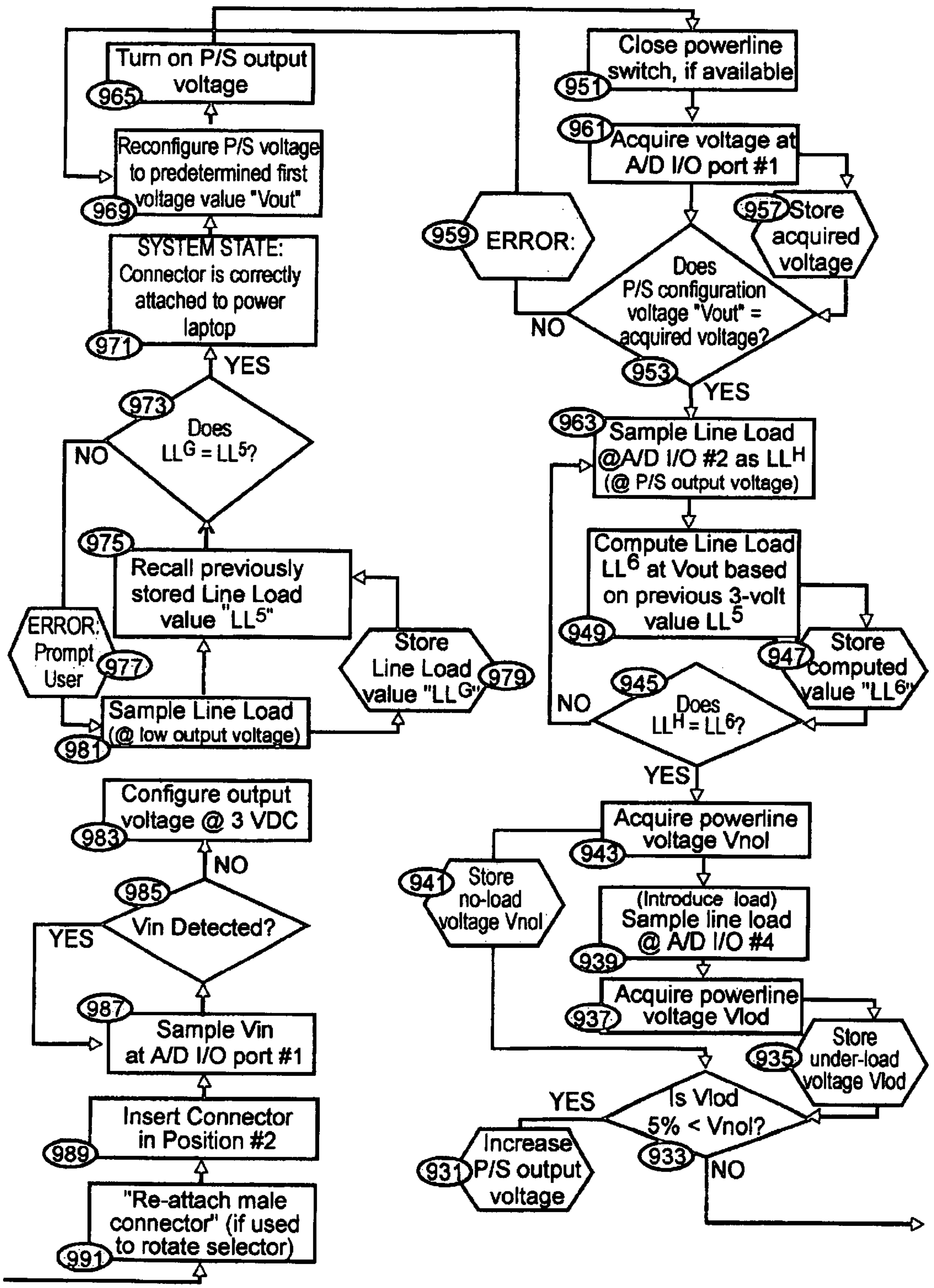

FIG. 7 shows a simplified power interface 250 with a battery bay 280. A thin flexible insulator 262 uses conductive traces 264, 266, 268, and 272 to interact with a rechargeable-battery-powered device 284. Two conductors 264 and 266, are separated by insulator layer 262. Conductive traces 272 and 268 are similarly insulated by non-conductive layer 262. Contact areas of traces 264 and 272 connect to battery 288 at cell contacts 274 and 276. Opposing contact areas of traces 266 and 268 interface with powered device 284's electrical contacts 278 and 276A.

When inserted between contacts 274 and 276 of battery cells 288 in FIG. 7, and electrical contacts 276A and 278 in battery cavity 280, flex assembly 250 creates two discrete circuits. One circuit is to the batteries comprised of traces 264 and 272, while the opposing contacts 266 and 268 electrically create a circuit to host device 284, so that traces 266 and 268 create a circuit that effectively bypasses cells 288. This allows external power sources, such as a power supply and/or battery charger, to operate either simultaneously or independently, to power a powered device 284, and to charge a battery, both functions being performed on the discrete electrical paths created by a flex-connector 250.

Like FIG. 8's multi-conductor connector, a flex-connector 250 in FIG. 7 has four discrete wires 252, 254, 256, 258. Unlike connector 290 in FIG. 8, where low-power data lines can be switched in and out of a cable by a mux or n-signal switch, the flex-connector assembly in FIG. 7 has only power conductors.

Switching power conductors in order to minimize cable size could require a substantial circuit of power FETS. However, because assembly 250 is designed to be compatible with software 101 and 800 in FIGS. 1-1—1-4 and FIGS. 1A-1—1A-9, continuous power along any conductor pair is not required so the use of switching FETS is acceptable. With a four-conductor cable as shown in FIG. 7, battery 288 can be hardwired for continuous monitoring. Software 101 and 800 FIGS. 1-1—1-4 and FIGS. 1A-1—1A-9, respectively) can be modified to allow for four-conductor use, and references to insertion/retraction (or, in the alternative, rotation) of a male connector in the software Specification would not be required. Either the use of power switches, or simply relying on the continuous monitoring available from a four-conductor system, will work with the flowchart of software 101 and 800.

If a four-line cable is acceptable, the low power requirements of the two-cell (1.5–3 volts depending on cell chemistry) circuit allows for small wire gauges on lines 252 and 258. Conductors 254 and 256 can be more substantial, since the current load of device 284 is unknown.

Assembly 250 in FIG. 7 has the advantage of being left permanently, or semi-permanently in place. A simple 4-pin connector can be fitted to the flex assembly 250 where wires 252, 254, 256 and 258 interface. This connector is designed to accommodate the previously-mentioned switching circuit. At such low power as indicated here, an attenuator n-signal switch, such as those available from Maxim Integrated Products (Sunnyvale, Calif.) can be used. It can be wired so that voltages from either cells 288 or from a power supply (not shown, but referenced as an embedded power supply 122 in FIGS. 1-1—1-4, or an external power converter 122A in FIG. 13A) activate the switch positions.

Data Acquisition

An external power source (such as hardware assembly 100 in FIG. 2, or power box 400 in FIG. 13A) can read the actual voltage (both load and no-load) of battery cell(s) 182 (as in FIG. 6 andidentified as battery pack 134 in FIG. 2). This information is acquired through the various I/O pins of an A/D converter 104A (see FIGS. 2 and 2A), and either stored in memory 104B, or immediately used to compute a valid voltage value to which a configurable power supply 122's output can be set.

Once the correct voltage value of battery cell(s) in pack 134 in FIG. 2 has been determined—which is one of the processes software 101 and 800 in FIGS. 1-1—1-4 and FIGS. 1A-1—1A-9 performs—that voltage value is used to modify the Vout of a power supply 122. How that Vout value is arrived at is discussed in the "Software Operation" section.

Power Delivery

Connector 132 in FIGS. 6–6C is first addressed in software 101 and 800 (FIGS. 1-1—1-4 and FIGS. 1A-1—1A-9) as being disconnected. Software 101 knows each position of connector 132 as it is repositioned through the various machine states in the software flowchart. The most important connector state is when a male connector is disconnected from its associated battery pack 134. The disconnected state indicates to software 101 (and 800) that a process is expected to start, or has just been completed. The state of male connector 132 provides a confirmation that the software logic-flow and state changes have been observed by the user.

A male connector 540 and its associated power cord, as an assembly, has a known resistive value. That value is fixed at the time of manufacture; pre-calibrated to be all of the same matched impedance. A connector cover 530 in FIG. 6D, or equivalent, can be employed. Cover 530 has embedded resistor 534 (or some other resistively-stable component) that expresses a repeated and readily-identified Ohm value. When cover 530 is in place, software 101 (FIGS. 1-1—1-4) acknowledges the identification of resistive element 534 as a "pre-operational" state, i.e., a user is present and has attached connector 540 to its power cord.

This state when the resistive element in connector cover 530 (FIG. 6D) is detected is important, because software 101 (and 800) shut down power supply 122 (FIG. 2). There is no power output—except for a nominal voltage in order to monitor changes in line resistance. This is a safety feature. One of the intended uses of the system shown in FIG. 2 is on an airplane. The original specification for power systems at a passenger seat (ARINC Specification 628, Part 2) provided for an intentional short in the Remote Power Outlet (RPO) to indicate that a power cable has been attached by a passenger. Should the invention here use such a shorted connector, software 101 and 800 can identify a pre-operational state when a passenger attaches a power cord to the RPO. Information on ARINC specifications is available from Aeronautical Radio, Inc., (Annapolis, Md.). Note that ARINC Specification 628, Part 2, was not approved as of the time of this writing.

Figure 2B:
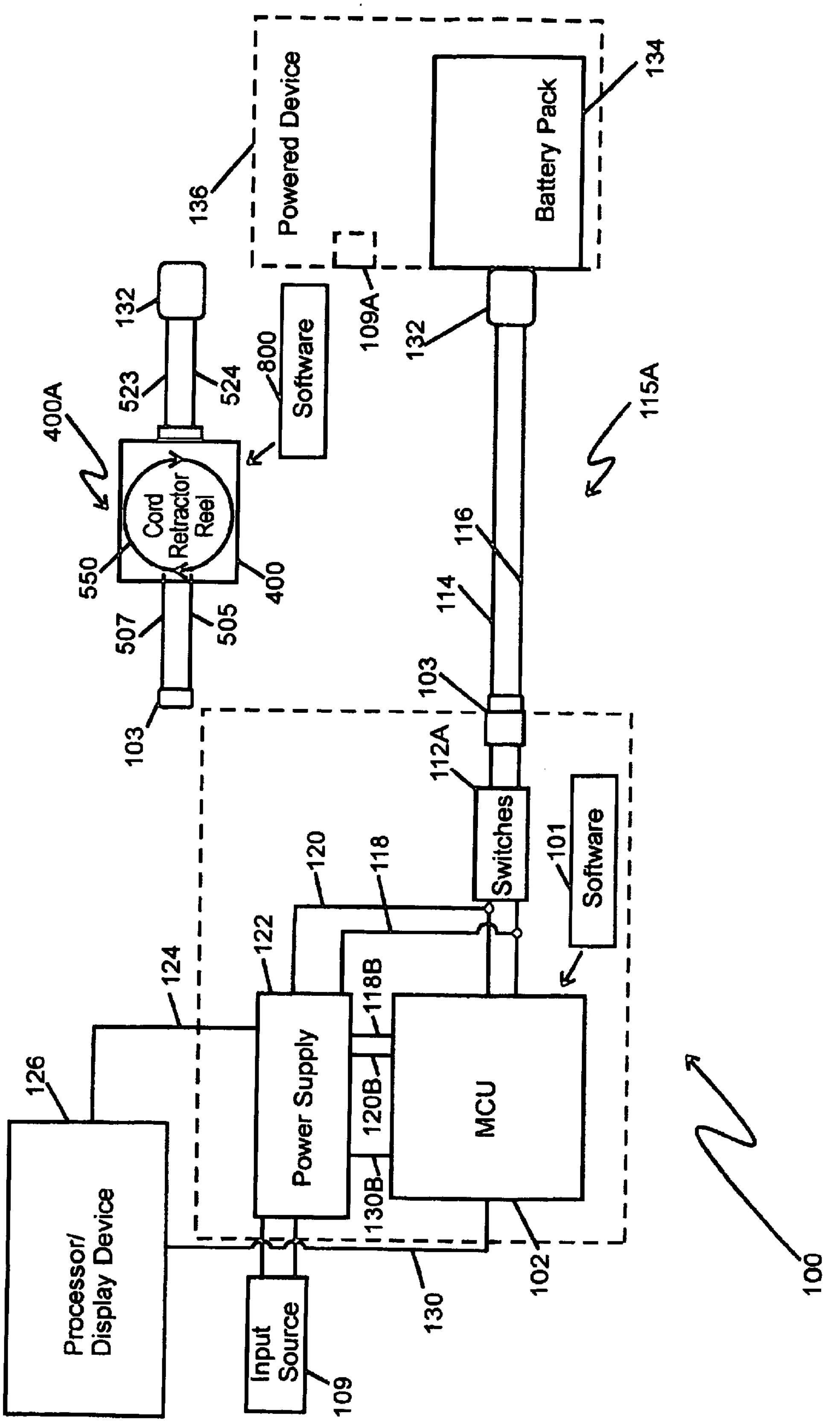
FIG. 2B is a simplified overview drawing of the major elements which comprise both an embedded power supply, and an external power adapter.

The hardware device states can apply to the operation of a power cord on an embedded retractor reel 550 in FIG. 2B. In that mode, either the motion of the cable extension incorporates a sensor that "awakens" power module 100 (FIG. 2), or MCU 102 (FIG. 2A) samples powerline impedance as an indicator of impending passenger activity.

Power supply 122 in FIG. 2 turns on periodically at a low output voltage, e.g., 3 VDC or less, to perform line load impedance readings. If the load value at A/D I/O port 110 (FIG. 2A) is the same as a stored value that equates (in look-up table 990 in FIG. 20) to a blank cable (no removable connector such as 540 in FIG. 6D present), then power supply 122 shuts down until the next polling test. If connector 540 is removable, instead of permanently affixed to the end of a power cable, as shown in FIG. 6D, then sensing the presence of removable connector 540 is an important indicator of a state change that will result in further software and hardware activity.

Once connector 540 in FIG. 6D is sensed by an MCU 102 (FIG. 2), either with or without its connector cover 530, hardware assembly 100 in FIG. 2 goes to a full ON state. Software 101 or 800 puts. MCU 102 into an accelerated powerline sampling process. That process is to detect the removal of cover 530, in anticipation of the insertion of connector 540 into a battery pack (see FIGS. 6–6C). If connector 540, or an equivalent, is manufactured without a cover 530, then a resistive element 534 (or equivalent) is embedded in the connector's shell 544. That resistive element 534 is strapped across electrically conductive connector elements 546 and 548 but is located within connector shell 544. Note that resistive element 534 in cover 530 has conductive pads 532 and 536. When cover 530 is in place, pads 532 and 536 make electrical contact with conductive surfaces 548 and 546 respectively on connector 540.

Thus, cover 530 in FIG. 6D (with an internal resistive element 534, or an equivalent) is a beneficial aid to the operation of power system 100 in FIG. 2. However, it is not indispensable, since other indicators of the state of a connector 540 in FIG. 6D can be reliably determined by other means, such as the extension of a cable on a retractor reel, as in element 550 in FIG. 2B.

Resistive Identifiers in Cords

Nesco Battery Company (Van Nuys, Calf.) manufactures a "Smart Cord" which uses a variety of resistors in its powerline connector to identify or distinguish the output voltage of a "Smart Adapter." Unlike the use of a resistive element 534 in a removable connector cover 530 (FIG. 6D), the Nesco patent uses the resistive load to decrease a power supply's output voltage. The resistor element is used as a resistor, and not as an identifier. There is no feedback to an A/D converter or processor, so the resistor element used by Nesco is a passive electrical element, for purposes of its load changing (voltage reduction) ability. Also, the Nesco patent does not allow for removal of the resistive element, while connector cover 530 is removable, thus taking the resistive element out of the active circuit.

Although the description above contains many specifications, these should not be construed as limiting the scope of the invention, but as merely providing illustrations of some of the presently-preferred embodiments of this invention.

Software to Configure Battery and Power Delivery Hardware

Note: Matter presented in this section is often also discussed in other software sections, as well as throughout the preceding hardware sections. Any relevant matter is assumed to be included here by reference, as if it were presented here in full.

The software herein interacts with a multiplicity of hardware devices, defined above as "Hardware to Configure Battery and Power Delivery Software," to configure a power supply output, and/or, in certain modalities, to detect and respond to battery-related activities, such as battery charging.

Software 101 (FIGS. 1-1—1-4) and software 800 (FIGS. 1A-1—1A-9) have significant commonalities. Voltage and current sensing processes are common to both, as well as power supply output-voltage determination. While not limiting, software 101 is usually specific to an embedded hardware platform, while software 800 usually runs on an in-line, corded power conversion adapter. One non-limiting assumed modality is that an in-line, corded adapter (running software 800) is attached to an upstream embedded power supply assembly (running software 101). Software 101 is also an abbreviated version of software 800 in certain areas, primarily in not showing every one of a number of nearly-identical powerline-load monitoring sequences.

Software Principals Of Operation

Software flowchart 101 in FIGS. 1-1—1-4 operates with a plurality of hardware devices, non-limiting examples of which are described in the "Hardware" section. The general software principles of operation are shown diagrammatically in FIG. 12. Three overall types of software operations are performed: data acquisition 330, processing 332, and command/control 334.

Data acquisition 330 operations include identifying the position of a connector such as 132 in FIGS. 6–6C. There are three possible connector positions 340, as identified in chart 1001 (FIG. 17). FIG. 6 shows connector 132 removed (not connected). FIG. 6B depicts connector 132 inserted to create an electrical path that includes only battery 182 (i.e., Position #1 in FIG. 17). FIG. 6C shows connector 132 inserted to create an electrical path bypassing battery 182, and only including power lines to system 136 (Position #2 in FIG. 17). Later discussion deals with software 101's ability to correctly identify each of these three connector positions.

Figure 12:
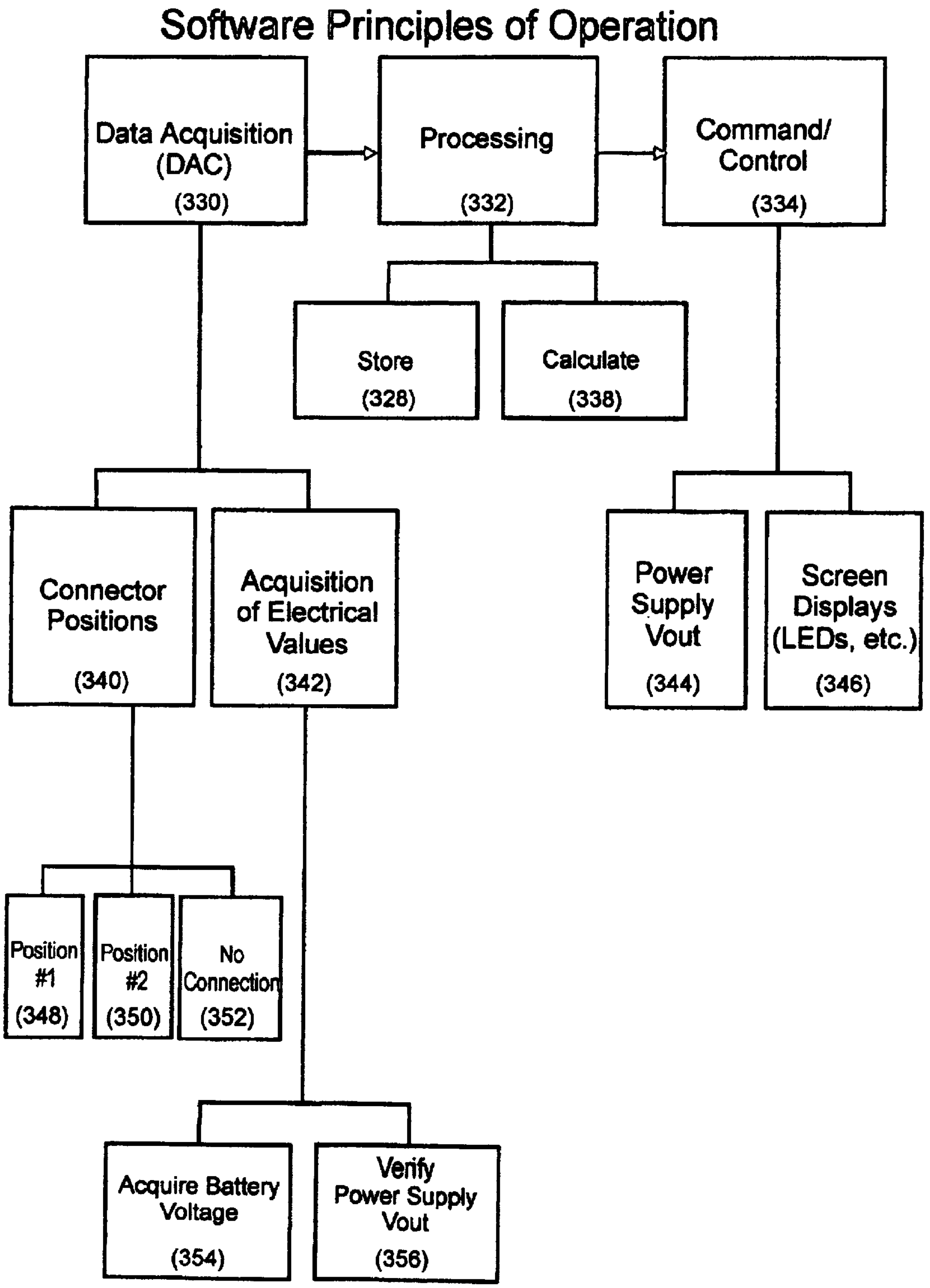
FIG. 12 depicts a simplified function chart of the principles of operation of software.

Data acquisition operation 330 in FIG. 12 includes the acquisition of electrical (power, or data) values 342. Only two modes exist. The acquisition of battery voltage 354, or the verification of power supply Vout 356. These are detailed later.

Processing operation 332 in FIG. 12 includes, but is not limited to, performing various calculations 338, and/or storing various acquired values 328.

Command and control operations 334 (FIG. 12) of software 101 in FIGS. 1-1—-14 require only one command operation—to configure the appropriate Vout 344 of a power supply. The screen display 346 capability of software 101 is optional, but should be considered in implementation because it assists a user in properly using connector 132 in FIGS. 6–6C.

The overall functions and operations of software 101 are comprised of but not limited to:

1). Acquire one or more parameters of a power signal, then by processing one or more of the power signal parameters, to achieve a useable power output from a power source or supply device that delivers power to a powered device.

2). Calculate at least one parameter of an acquired power signal in order to identify a source of power within a powered device, such as a battery, so that at least one parameter of that source of power matches a known set of power values. For example, software 101 can often identify—from a multiplicity of battery packs having different voltage ratings—a reasonably accurate estimate of the manufactured voltage of each battery pack.

3). Monitor the operation and sequence of user activities in a meaningful way, which allows the user to have confirmation or feedback about the sequence of user actions required. The confirmation is also known to either (or both) a power source and/or a powered device. For example, software 101 has knowledge of a user's actions in configuring a connector, and the software prompts the user to proceed to a next step, or issue error warnings should user's actions not be as required.

4). Confirm a power output signal from a power source. As a non-limiting example, software 101 can compare a manufacturers' output voltage of a battery to the output voltage of a controllable/configurable power supply, to verify that both are either matched, or within pre-defined nominal parameters.

5). Acquire power-related data by a plurality of means and store such data in memory so that the stored data, over time, is used as a reference source for future power activities. As a non-limiting example, look-up tables are created from a database of prior operations that become part of a decision-making process in software 101. The look-up tables, once created from an experiential database, contributing further levels of power output signal verification.

6). Monitor operational parameters of power sources to determine if the power sources are operating within manufacturers' defined specifications. If a power source's performance drops below defined minimal values, software 101 alerts a user (by a number of indicators) that the power source is deficient. As a non-limiting example, software 101 tracks usage as a function of possible. MTBF maturation, so that a user can replace an aged power source with a new one.

7). Control hardware, including but not limited to sequencing switches, controlling I/O ports, data lines, power-signal lines, and configuring a power supply's output.

Functions of software 101 in FIG. 1 are not limited to those described above, but the above non-limiting examples illustrate software processes which add operational value to a plurality of hardware devices.

User Operations

The user operation of various power-related hardware, as it relates to software 101 in, FIGS. 1-1—1-4, is expected to be sequential. The sequence of inserting, removing, rotating, and then reinserting a connector 132 in FIGS. 6–6C is controlled by a user. FIG. 14 is an example of an instruction sheet or label that prompts a user to move sequentially through the required steps with connector 132 in FIGS. 6, 6B and 6C. An optional step is shown in the first instruction in FIG. 14: "Close cap on 'key' connector." Cap 530 is shown in FIG. 6D, and it need not be used to achieve the functionality of software 101. An explanation of the use of optional cap 534 is discussed in the hardware section. Connector 132 can also be detachable from its power cord, so part of the first instruction in FIG. 14 would prompt a user to attach connector 132 to its cord. User instructions are only suggested here, and there are a number of ways such instructions—if necessary at all—can be conveyed to a user.

Modular Software

Software 101 in FIGS. 1-1—1-4 defines a process achieved by a sequence of steps or machine states, each of which, in and of itself, or in a multiplicity of non-limiting combinations with other discrete steps, adequately perform a desired function. Particular steps required are primarily determined by the function to be performed, as well as available hardware and the hardware assembly's capabilities and configuration. To perform a function, software 101 must execute at least one step defined in flowchart 101 in FIGS. 1-1—1-4.

To achieve a desired function, the sequence of steps is not limited to that shown in FIGS. 1-1—1-4. Machine states or steps are structured to operate in different sequences. Also, not all of the steps or machine states need be operational for a specific hardware device or assembly of devices. Code for software and sequence(s) can reside on storage media in a powered device, while other core elements can reside on a chip in an external power supply (or even its associated battery), as non-limiting examples. Such division or duplication of software code can, for example, be required because one device of at least the two required to achieve software functionality, can act as a master, while another device in the assembly can require equivalent software to function properly as a slave. It is not essential that there be more than one hardware device in which software code is resident.

Hardware Considerations

Software 101 in FIGS. 1-1—1-4 is not limited to configuring the power requirements for hardware devices that have pre-stored information, or even by a device's ability to store information. Nor is software 101 limited in any way to delivering power to hardware devices which are comprised of memory, computer chips or DSPs, pre-determined resistor values, cords with pre-configured components (resistive or otherwise), or data storage. In actuality, software 101 is capable of power configuration and delivery functions with such diverse battery-powered devices as an ordinary flashlight, or a laptop computer.

As a non-limiting example, software 101 can reside in a configurable power supply embedded behind the dashboard of an automobile, with an available electrical outlet comprised of at least two power contacts (e.g., a cigarette lighter outlet). A controllable power supply can be configured, by the use of software 101, to automatically power a 24-volt lantern, then a 9-volt portable radio, as well as a 5.5-volt cellular phone. Each of these devices can be connected to this "universal" power port without any intermediate power-conversion adapters. Thus, for example, software 101 provides functionality to an automotive distress situation, where a plurality of diverse input-voltage devices are required to operate properly without intermediate power conversion adapters.

Minimal Software States

Software 101 in FIGS. 1-1—1-4 need only perform minimal processes to achieve the automotive functions as exemplified above. The hardware configuration in FIG. 7 represents a non-limiting example of a simple battery-powered device 284, like a flashlight, TV remote control, or portable radio. Software 101, to deliver a compatible power signal from an embedded power supply behind a car's dashboard, need only read battery 288's voltage, and configure an external power supply (not shown, but the equivalent of a power box 400 in FIG. 13A) to match that voltage. Thus, if the two cells which comprise battery 288 in FIG. 7 are Ni-Cads, the battery's voltage would be 2.50 VDC. Software 101 configures the voltage output of a controllable power supply to 2.60 VDC.

Software 101, if necessary, confirms and continuously monitors an external power supply's output voltage, but such confirmation is not essential to the proper functioning of device 284.

Software 101 in FIGS. 1-1—1-4 acquires a battery's voltage in several modes. "Vmax" 658 is the no-load voltage of a battery, while "Vmin" 680 is the under-load voltage of a battery. Software 101 can be programmed to look at either or both Vmax or Vmin values, but it must acquire at least one. The selection of Vmax or Vmin is typically not essential. A powered device with a battery source is designed to accept a Vmax voltage, since all batteries have an initial "pulse" voltage which can be a substantially higher voltage spike than a continuous Vmax. Therefore, matching Vmax is typically acceptable, if only one voltage parameter is to be acquired.

Vmin, the under-load voltage value of a battery, is acquired in certain applications. The significance of Vmin is that it may, under certain conditions, also be a viable voltage parameter for an external power supply to match or to use as a basis of a calculation. The conditions which determine the validity of Vmin are:

1). The type of device being powered. For example, complex powered devices such as laptop computers have a pre-determined shut-down or. "not-to-exceed" minimum battery output voltage. This shutdown voltage is pre-set by the manufacturer of the powered device to prevent total discharge of a battery. In such complex devices as a laptop computer, the user usually receives audible and visual prompts that the remaining capacity of its battery source is approaching a critical state. While a "fuel gauge" which reads and monitors battery capacity can be used to trigger such alerts, a voltage parameter is often used to trigger alerts, as well as an eventual shutdown. The voltage parameter for powered device's pre-determined shut-down is always set enough above the battery cell's minimal safe discharge voltage so that cell reversal does not occur.

2). In simple powered devices, such as a flashlight, there may be no pre-determined minimum battery voltage values. A flashlight, because of cost considerations, is typically designed so that the consumer is responsible for keeping the battery charged. The only indicator that the battery is at Vmin may be that the light bulb no longer glows.

3). Battery care and charge/discharge life expectancy are determinants of a valid Vmin. Batteries self-discharge over time. If a battery has not been charge in 30 days, it's under-load output voltage could have gone below its powered device's minimum voltage shut-down value, especially is the battery capacity was nearly depleted when stored. Should the time between recharges become excessive, the battery may be approaching (or have exceeded) its non-recoverable voltage value.

4). Cell chemistry determines the non-recoverable voltage of a battery. FIG. 15 is a look-up table of common cell chemistries showing recognized manufacturer's design cell voltage, and a not-to-exceed minimum cell voltage. Below the minimum cell voltages indicated, damage to the cell can occur, primarily from cell polarity reversal. Once cells are reversed in polarity, it is usually impossible to recover the battery, even with charging.

5). Memory is a charge/discharge characteristic of some cell chemistries. Primarily Ni-Cad (and some NiMH) cells can exhibit an induced voltage threshold below which the cell will no longer discharge. Repeated operations of a powered device which don't filly discharge cells usually causes memory. The impact of memory on software 101 in FIGS. 1-1—1-4 is not significant, because a memory-induced Vmin value will always be above the cell-chemistry-determined manufacturers' design voltage, as indicated in item #4 above.

6). Cell "recovery" is a characteristic of many battery chemistries which causes a drained battery to have transient recovery of voltage after a period of rest. This is often observed when a flashlight that would not operate is turned on hours later, and the bulb burns for a brief moment. This characteristic of battery cells is a positive characteristic that makes it possible to acquire a valid Vmax from a battery that is, for all intents and purposes, fully discharged. That's why software 101 in FIGS. 1-1—1-4 performs a Vmin under-load tests at the early part of the software processes, thus anticipating some minimal amount of cell recovery. Further under-load tests can produce sporadic voltage-acquisition values. If so, software 101 relies on the first Vmin test as the most valid and references that as a benchmark.

The above-defined characteristics of batteries and powered devices do not always have to be accounted for in software. Depending on intended software and hardware function(s), types of batteries expected to interface with software 101, and voltage-design parameters of different types of intended powered devices, software 101 may not need to consider any of these issues. However, an awareness of the implications of using a Vmin approach to software should be evaluated when writing code for real-world applications.

Real-World Battery Considerations

In the real world, powered device usage minimizes many of the above-mentioned issues with acquiring useful Vmin voltage values from a battery. Laptop computers, for example, are treated more scrupulously than a rechargeable flashlight. Users tend to keep laptop batteries charged, because these devices are usually plugged into a wall outlet for much of their useful lives. Also, today's laptop batteries use "memory-less" cell chemistries such as Li-Ion and NiMH. On the other hand, some laptop purchasers buy a spare battery, which sometimes can go unattended in a desk drawer for many months.

While not included in hardware, a battery tester/reconditioner can be included in an assembly 100 in FIG. 2. This is indicated in situations where a large number of mixed-type powered devices are attaching to a hardware assembly 100 (FIG. 2). As a non-limiting example, on a commercial aircraft, passengers may be connecting everything from cellular phones, laptops, rechargeable electric shavers, etc., to an embedded power assembly 100. Should battery charging be one of the functions prescribed for software 101 in FIGS. 1-1—1-4 and related hardware, a battery tester and reconditioner screens many of the issues relating to Vmin and Vmax.

Such testers/reconditioners as manufactured by Cadex Electronics (Burnaby, BC, Canada), enhance software 101 by evaluating battery aging, cell chemistry, and even voltage parameters. In such a modality, software 101 operates in a data acquisition mode and captures battery values and functional parameters. Much of this data can be acquired as pre-processed digital or analog values, so that software 101 operates to evaluate known data values, and configures appropriate hardware. While not shown, such a software program that operates with a battery tester/conditioner can be written by those skilled in the art, based on information herein.

Voltage and Current Define Operations

Software 101 acquires voltage and current readings and correlates them to user actions. Actions such as connecting a power cord to a male connector, and detecting the position of a male connector 132 in FIG. 6–6C are determined by states which software 101 defines in terms of voltage, or line current.

Software 101 operates with only two basic acquisition modes, reading voltage and sensing current.

In reference to FIG. 17, reading voltage is used to acquire power-signal values of a battery, as previously discussed. Detecting voltage is also used to determine states of a male connector 132 in FIGS. 6–6C. If voltage flow is detected along power lines 115 in FIG. 2, the power can only be from battery 134, or from external power supply 122. When software 101 commands the operations of power supply 122, and voltage detected on power lines 115 when power supply 122 is shut down must come from battery 134. Since connector 132 in FIGS. 6–6C (and elsewhere) can only be in the Position #1 shown in FIG. 6B, software 101 identifies the position of connector 132 as being in the position shown in FIG. 6B by sensing battery voltage.

Connector 132's Position #2 from FIG. 17, shown in FIG. 6C, is only subtly different from connector 132's "Not Connected" position shown in FIG. 6. Both positions have connector 132 in a non-voltage carrying modality, so detecting voltage with software 101 is not appropriate. Sensing current as a software acquisition value resolves the issue. Connector 132 in a "Not Connected" position shown in FIG. 6 is only different from that same connector 132 as shown inserted in FIG. 6C (Position #2).

When connector 132 is in its Position #2 from FIG. 17, as shown in FIG. 6C, an electrical load is available that is not present when connector 132 is in the "Not Connected" position shown in FIG. 6. This load is created by the internal circuitry of a powered device's 136 system wiring. Such circuitry would include loads imposed by capacitors commonly used to allow a small hold-up time related to contacts at system-to-battery connector 196. Also present can be circuits which include battery selectors, various power switches, voltage regulators, an internal charger etc. Any or all of these can be present, which provides sufficiently identifiable resistive load to differentiate a current reading from one taken on a no-load powerline (See discussion and Chart of FIG. 2A's A/D ports in the "Hardware" section).

Table 1001 in FIG. 17 is a description of connector positions, with corresponding software sensing functions. Software 101 in FIGS. 1-1=13 1-4 monitors load on powerlines 115 in FIG. 2. Conductors 114 and 116, along with unattached connector 132 constitute a very minimal resistance, which software 101 logs as the "Not Connected" device state of FIG. 17. FIG. 6D illustrates a removable connector cover 530, which has an embedded resistive element 534. Resistive element 534 has a known resistive value, which software 101 uses as a current-sensing load comparator. If that known resistive value is detected by software 101 as a match, the state of connector 132 is considered to be unattached. Furthermore, the sensing and matching of element 534's resistive value in connector cover 530 is used to indicate that a removable male connector 540 has been attached to the end of a powerline 115 in FIG. 2. When cover 530 is removed, software 101 senses that activity as a change in load. Software 101 then configures MCU 102, and power supply 122 (FIG. 2) to commence sensing a voltage in powerlines 115.

Connector 540 in FIG. 6D (and other connector modalities shown in FIGS. 7 and 8) can also have a first (or even a second) resistive element, so that software 101 can sense that a connector 540 (or equivalent) is attached to a power cord (assuming that connector 540 is made removable, a feature which is not necessary for the proper operation of software 101).

Supplemental resistive elements can consist of part of the internal wiring of a battery housing, as shown in FIG. 6C. FIG. 6E shows a diode that will indicate some load. This will assist software 101 in situations when there is no available resistive load from a powered device's internal system circuitry. It can also be practical to build a resistive element into the circuitry in a battery pack as positive indication that connector 132 is in the position shown in FIG. 6C. Resistive element 199 in FIG. 6C is optional. If used, it has a resistive value distinctively different from resistive element 534 in FIG. 6D. This allows software 101 to identify each of connector 132's two positions in FIGS. 6 and 6C as uniquely different and readily distinguishable. A resistive element 199 does cause a load to battery 182, so the use of such a resistive element must be viewed in light of faster battery drain.

One of the system states identified in look-up table 990 (FIG. 20) is $LL^4$, a battery pack that is removed from its associated powered device. The known value of resistive element 199 in FIG. 6C is a valid indicator of this state.

Thus, a plurality of methods of differentiating a connector 132's positions in FIG. 6 versus FIG. 6C are all based on sensing changes in resistive loads. Power supply 122 in FIG. 2 is turned on and configured by software 101, to output a low voltage, e.g., 3 VDC. At this low voltage resistive loads can be sensed on power lines 115.

Basic Software Functions for Connector Activities

Figure 16:
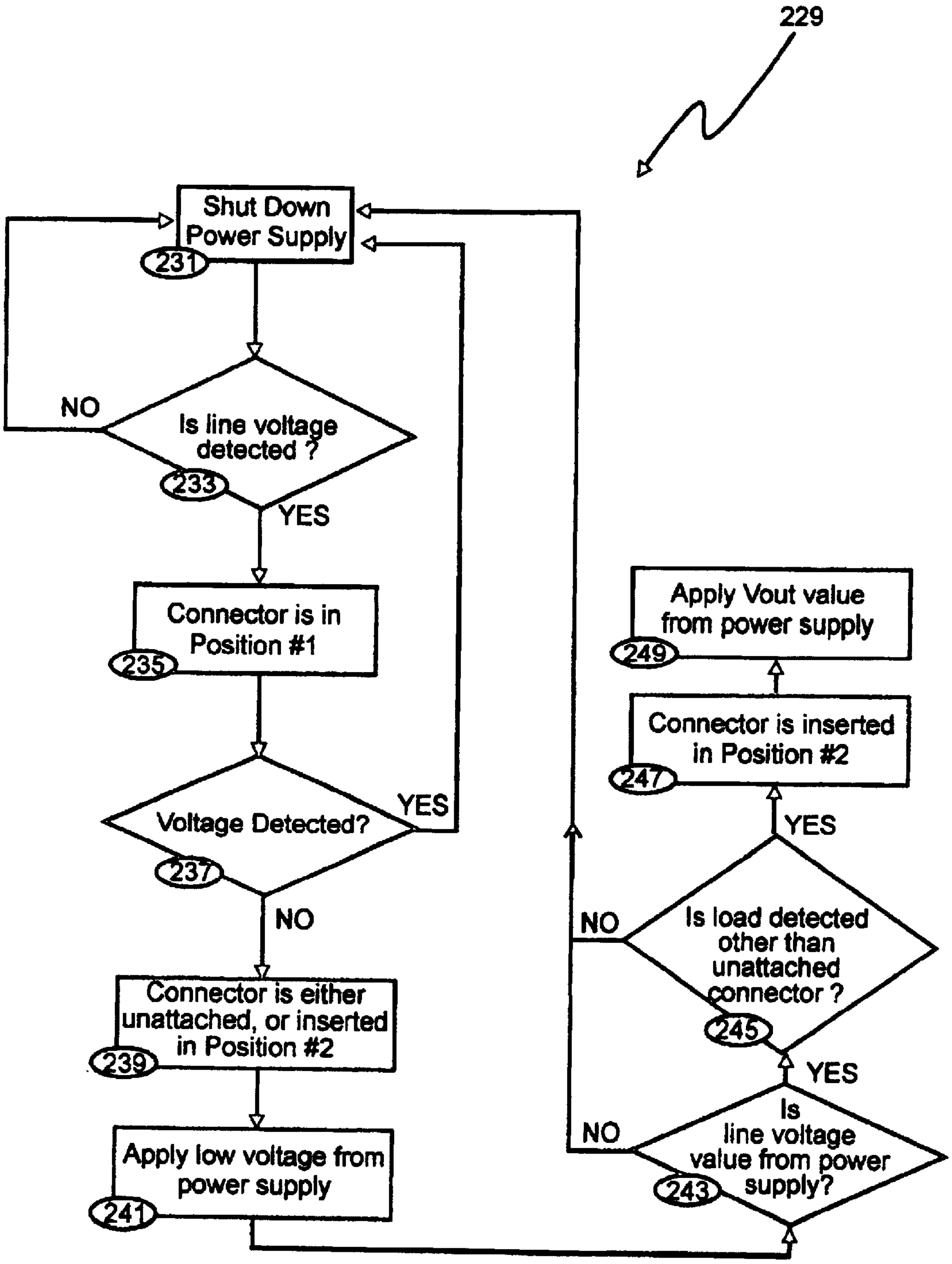
FIG. 16 shows a sub-routine of the software in FIGS. 1, and 1A, which is used extensively in various software processes and operations.

A suitable software logic to determine in which position connector 132 is in (FIGS. 6, 6B or 6C) is defined in FIG. 16. Software 229 in FIG. 16 is a highly-simplified flowchart that isolates only connector-position-determination functions. After the power supply is shut down in step 231, step 233 is a powerline voltage check. If there is voltage detected on the powerlines, connector 132 is in its Position #1 (FIG. 6B). Since software 229 has shut down its associated power supply in previous step 231, the only source of power in the circuit can be the battery pack. Therefore connector 132 is in its first position in the battery pack where it is electrically active with battery cell(s) 182. If connector 132 were in the battery pack, but in its Position #2, no battery voltage would be detected on the powerlines in software step 233.

A second powerline voltage check is performed in step 237. The state of connector 132 is unknown, because there is no battery voltage detected on the powerlines. Connector 132 in a removed position, or in its Position #2 (see FIG. 17), exhibits identical voltage-detection characteristics, i.e., no powerline voltage is detected.

Having detected no powerline voltage, software 229 activates its associated power supply. A low voltage is put on the powerlines in step 241. Step 243 confirms that the voltage detected on the powerlines is from the power supply.

A powerline load is detected in step 245. By consulting a look-up table such as in FIG. 20, the powerline load value acquired in step 245 is determined to match the load expected when connector 132 is inserted into a battery pack in its Position #2 (see Identifier states $LL^4$ and $LL^5$ in FIG. 20). Thus, step 247 confirms that connector 132 is in its Position #2. Since this is the correct position for delivering power to the battery's associated powered device, step 249 applies the correct output voltage at the powerlines.

Note that all error states, indicated by what are FALSE answers to any query statement, loop back to a power supply shutdown in step 231.

Timing Issues

Software 101 in FIGS. 1-1—1-4 monitors user actions in operating connector 132 in FIGS. 6–6C. While software 101 can identify each of the three required connector positions ("Not Connected" as FIG. 6); inserted to create a circuit with battery cells (Position #1 as FIG. 6B); and inserted to create a circuit to a powered device (Position #2 as FIG. 6C), the software must wait for each of the two last actions to be performed before continuing. This creates a timing issue. A user may, for unknown reasons, take an indeterminate amount of time to move connector 132 from Position #1 to its next position as Position #2.

A user's actions are detectable by software 101 when inserting and removing connector 132, as represented by "Not Connected" in FIG. 6, and Position #1 in FIG. 6B. Software 101 sees a voltage from battery 182 upon the insertion of connector 132, as represented as Position #1 in FIG. 6B. Software 101 can also, by applying a low voltage to powerlines 115 (FIG. 2), monitor current load to verify that connector 132 is removed as "Not Connected" in FIG. 6. However, a user could, while connector 132 is delivering the low voltage required to sample current, reinsert connector 132 in the same configuration as shown in FIG. 6B instead of going to Position #2 in FIG. 6C. Thus reconnected as in FIG. 6B a second time, battery voltage would flow along the powerlines, and into a power supply that is outputting a low voltage. Damage to a power supply can occur. A diode in the positive (+) output line of a power supply (such as the representational schematic in FIGS. 4-1 and 4-2) will eliminate this. The voltage sense line at header J1, pin 20 in FIGS. 4-1 and 4-2 should be tied to the positive power output line so as not to be impacted by the diode. Those skilled in the art will understand how to properly implement such a protective diode.

Figure 5:
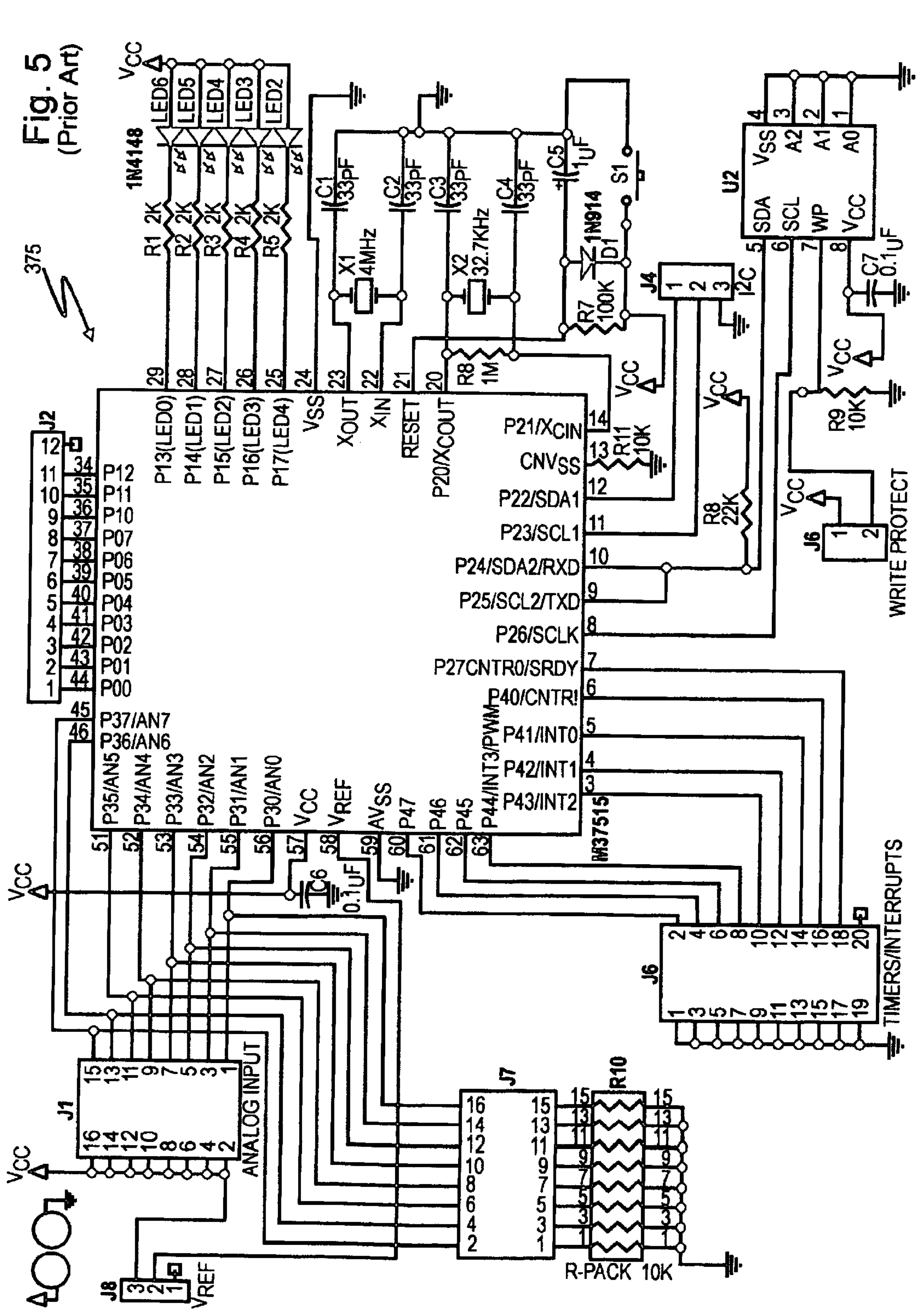
Figure 5A:
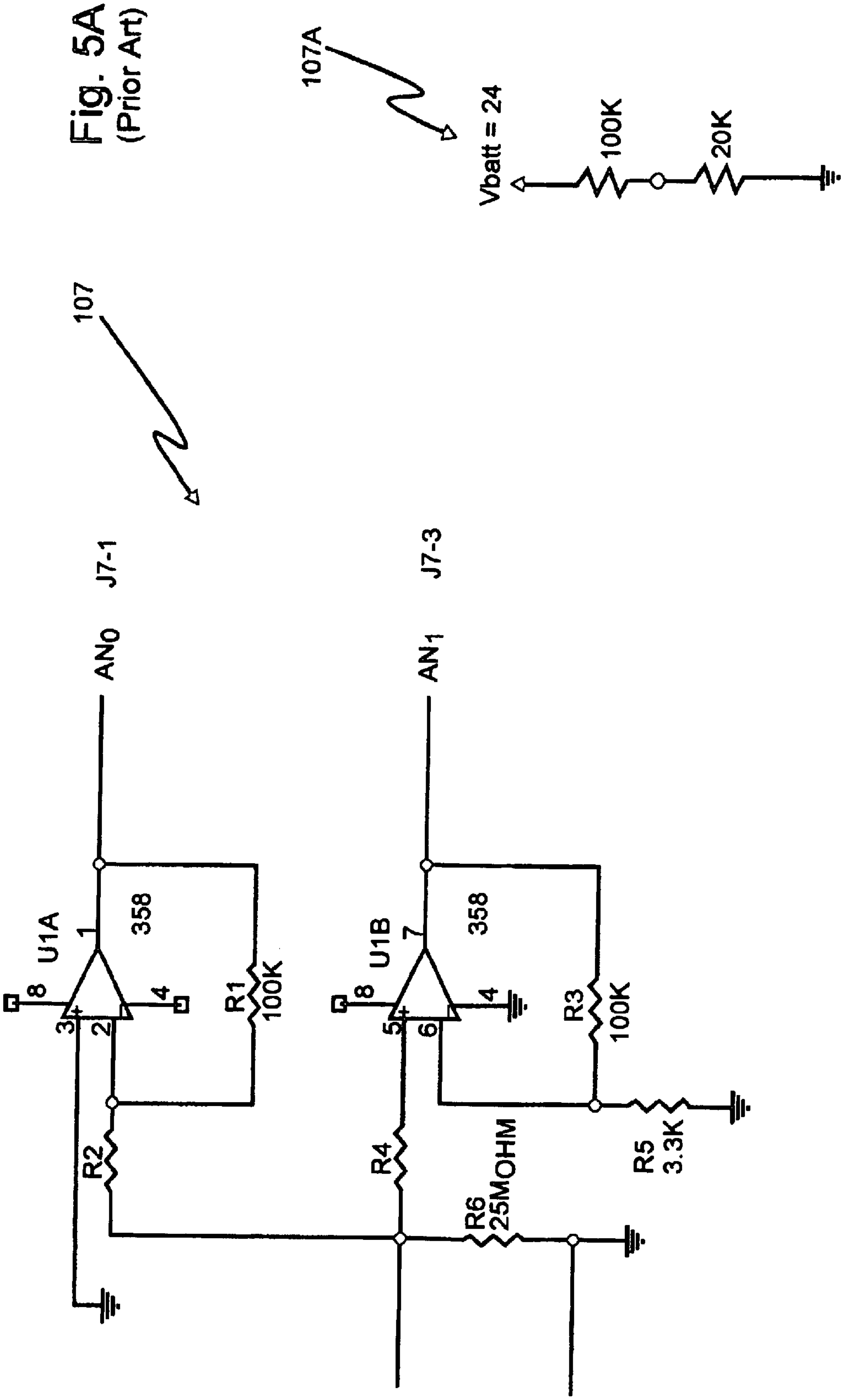
FIG. 5A (prior art) depicts a circuit which can be added to the schematic in FIG. 5 to provide a means of inducing a load on the input powerline of an A/D converter.

The addition of a diode that will protect power supply 122 in FIGS. 4-1 and 4-2 also allows software 101 to turn on power supply 122 to a low voltage (e.g., 1.5–3.0 VDC), in anticipation of the insertion of connector 132 in its correct Position #2 configuration, as shown in FIG. 6C. While waiting for connector 132 to be reinserted software 101 continuously switches from voltage sampling to current sampling. This switching assumes three dedicated A/D circuits, with a circuit 110 in FIG. 2A which samples powerline voltage, while two dedicated current-sensing circuits 106 and 112 monitor current by means of a resistive element 108 and 108A. Each resistive element has a different resistive value, with one being approximately 50% of the anticipated maximum load of a powered device. FIG. 5A shows a circuit for applying a load at an A/D port, which is compatible with the circuit of a typical MCU in FIG. 5.

Note that, as long as power supply 122's Vout is less than the battery's Vmin, there will be no contention, since the dominant higher voltage will always control the power lines. No power will flow into a battery at such extremely low voltages.

Should connector 132 be reinserted incorrectly, so that it is in the Position #1 configuration shown in FIG. 6B, instead of in the anticipated Position #2 in FIG. 6C, software 101 will detect battery 182's voltage values on the powerlines. An error state then occurs. Software 101 responds by shutting down power supply 122, and issues a prompt to the user (non-limiting examples of user prompts are a screen display (see "Power Monitor" in FIG. 18), a blinking LED, or a label with LED prompts in FIG. 14).

If connector 132 is correctly inserted, as illustrated in FIG. 6C, software 101 senses the load of a powered device 136 using the current-sensing circuit 106 (in FIG. 2A). Vout at power supply 122 in FIGS. 4-1 and 4-2 is then changed from the low-voltage (1.5–3.0 VDC), to the calculated voltage value from step 714 in flowchart 101 in FIGS. 1-1—1-4.

Point-Count vs. Actual-Value Software Schemas

Software 101 in FIGS. 1-1—1-4 can be configured to operate in a number of data acquisition modes. Of these, the most popular is probably a "point count" based schema, instead of an actual-acquired value model. The use of point-counts and Boolean variables is well understood by those skilled in the art, so specifics of such software processes is not detailed here.

Point-count based software algorithms and logic statements are preferred in the implementation of software 101. Acquisition of voltage and current should be addressed as relative values, not absolutes. Battery discharge states are relative, so that Vmax and Vmin can differ for the same battery when sampled at different times. Ranges of battery voltage values are more important than absolute values. Software 101 relies on the spread between a Vmax and Vmin to achieve a proper output voltage from a power supply. In one modality of software 101, acquired battery voltage values are arranged, from lowest to highest (see steps 913–915 in FIGS. 1-1—1-4), to determine whether the original Vmax and Vmin are potential errors.

Actual values become more accurate than a point-count software schema when dealing with batteries that are in a state of deep discharge. Vmax voltages drop off precipitously as a battery approaches complete discharge. Point counts can sometimes not be granular enough to differentiate the two values. Software 101 in FIGS. 1-1—1-4 is not restricted in any way to the use of only one software schema. Hybrid modalities, that use both a point count and real-values are practical, and serve well in environments where a multiplicity of battery charge states are expected to be encountered.

Granularity of the A/D

Point-count software schemas are dependent on the bits available from an A/D converter: An 8-bit converter will offer only a 190–250 maximum point count across the range of values being acquired and compared. A 10-bit or 12-bit A/D converter will allow significantly enhanced point-count scales. Software 101 in FIGS. 1-1—1-4 works reasonably well with 8-bit A/D converters, but a 10-bit A/D, available from MCU's like the Mitsubishi M37515 in FIGS. 3A and B, considerably enhances the reliability and accuracy of software 101. The granularity available from the A/D hardware should be considered, as 10–12 bit A/Ds will enhance the points available. Note, for example, that the resistive values that distinguish Identifiers $LL^0$, $Ll^1$, $LL^2$, and $LL^3$ in FIG. 20 are quite small. It is advisable to opt for the maximum number of bits available from an A/D converter.

Rounding Up

The accuracy of the final power supply Vout value calculated by software 101 in FIGS. 1-1—1-4 is only as valid as a configurable power supply's ability to deliver precise voltages. The representative configurable power supply 122 in FIGS. 4-1 and 4-2 provides a resistor ladder 160 which is only capable of voltage adjustments in 0.375 VDC increments. This restriction is accounted for by always "rounding up" software 101's final voltage value to the next higher available voltage from a configurable power supply 122. A power supply that offers more granular voltages can be built, so that software 101 can be more accurate, if the application requires.

Power supply 122 in FIGS. 4-1 and 4-2 has a minor anomaly in its SHUT DOWN mode. The LT1339 requires a minor modification to its shut down circuit. Consult the data sheets on this IC available from Linear Technologies (Sunnyvale, Calif.). Power supply 122 in FIGS. 4-1 and 4-2 should also have a small load (100Ω) strapped across the output lines, since the power supply works best when under a minor load.

In principal, software processes defined in software 101 in FIGS. 1-1—1-4 should always opt for higher, rather than lower, Vout values when configuring a power supply. Battery voltage ranges between Vmax and Vmin are typically substantial. As long as the calculated value of Vout that is used to configure a power supply is not in excess of a powered device's voltage tolerances, there is little concern about delivering an over-voltage power signal to a powered device.

Look-up Tables

Look-up tables can be used to assist in verifying software 101's calculation results. FIG. 15, as previously noted, illustrates a look-up table of battery pack voltages. This table can be used to compare Vmax and Vmin values, to see if a specific battery pack's cell configuration exhibits comparable minimum and maximum voltages. A nearly depleted battery pack can, indeed, cause false errors. Further look-up tables that define the same voltage matrix as FIG. 15, but which show battery packs in various states of discharge, would clarify Vmin mismatches.

Another look-up table (not shown) can be created to provide a voltage template which indicates typical battery voltage and current parameters for specific classes of powered devices. As a non-limiting example, a look-up table that delineates the power signal parameters of cellular phones, and differentiates them from parameters for laptop computers, can prove helpful. This could be beneficial, in an example of an airline that may allow the owners of laptop computers to use the aircraft's power-delivery system at each seat, but prohibit power use for cellular phone operations. A simple look-up table can be created that templates the two types of devices, as defined by each one's unique power parameters (Vmax, Vmin, and current-load). Should a passenger connect a cellular phone to the power system, software 101, by referencing such a look-up table, would not activate its associated power supply.

"Power Signatures"

Look-up tables (not shown) can contain templated information that link voltage and load, as a function of time and "events." Such a look-up table provides a "power signature" template for a defined and documented class of powered devices. A non-limiting example of a "power signature" can be a voltage and current profile of laptop computers. This power-signature table plots anticipated load values as a template. Such a template resembles FIG. 19, where the BIOS POST of a generic laptop tracks changes in load over time (as the basis of identifying a laptop as distinct from other powered devices that can attach to an embedded power system).

The boot sequence of a laptop computer is unique to that type of powered device. Because the BIOS boot sequence has been historically a regimented process, the BIOS POST lends itself to a template. A BIOS POST template (FIG. 19) can serve as an effective means of distinguishing a laptop connected to a power assembly 100 like that in FIG. 2. Software 100 written to capture real-time power-load data can access a "power signature" template in a look-up table, and match a sequence of changes in current (load) to a generic (or specific) power signature template.

The BIOS POST

Battery-powered devices turn on in ways that are usually very specific to the type of device. Obviously, a camcorder turns off differently than does a portable radio. Laptop computers are no exception. If a high-sample-rate capture-scope is attached to the input power lines of a laptop, a distinct current-based power signature can be acquired as each of the sub-systems within the laptop turns on in sequence. This sequence is referred to as the BIOS POST. It is a complex sequence of hardware checks, done at three levels: Early, Late and System Initialization. For purposes of the look-up table being discussed here, the only events that occur during the BIOS POST are the ones which generate large and readily-discernible changes in the total load of the laptop. These events typically include the CPU turning on, the display screen (including backlighting), the floppy drive test, and the hard drive test. The BIOS (and CMOS) initialize each of these hardware sub-systems every time a laptop boots. Note: Many of the traditional hardware BIOS functions have moved to the operating system, but the net effect when monitoring load will still resemble the boot sequence depicted in FIG. 19.

Detailed descriptions of various implementations of the BIOS POST are available from *The BIOS Companion,* by Phil Croucher. Electrocution, P.O. Box 52083, Winnipeg, MB, Canada R2M 5P9.

It is not necessary to treat each of these hardware devices as an identifiable power event related to a specific hardware sub-system. More important is the sequencing of a series of devices. Knowing which specific device turns on or off is relatively unimportant in constructing a power signature look-up table or template. It is the pattern that is essential, and not specifically which hardware devices in the laptop are causing the noticeable changes in load being detected on the powerlines.

Figure 19:
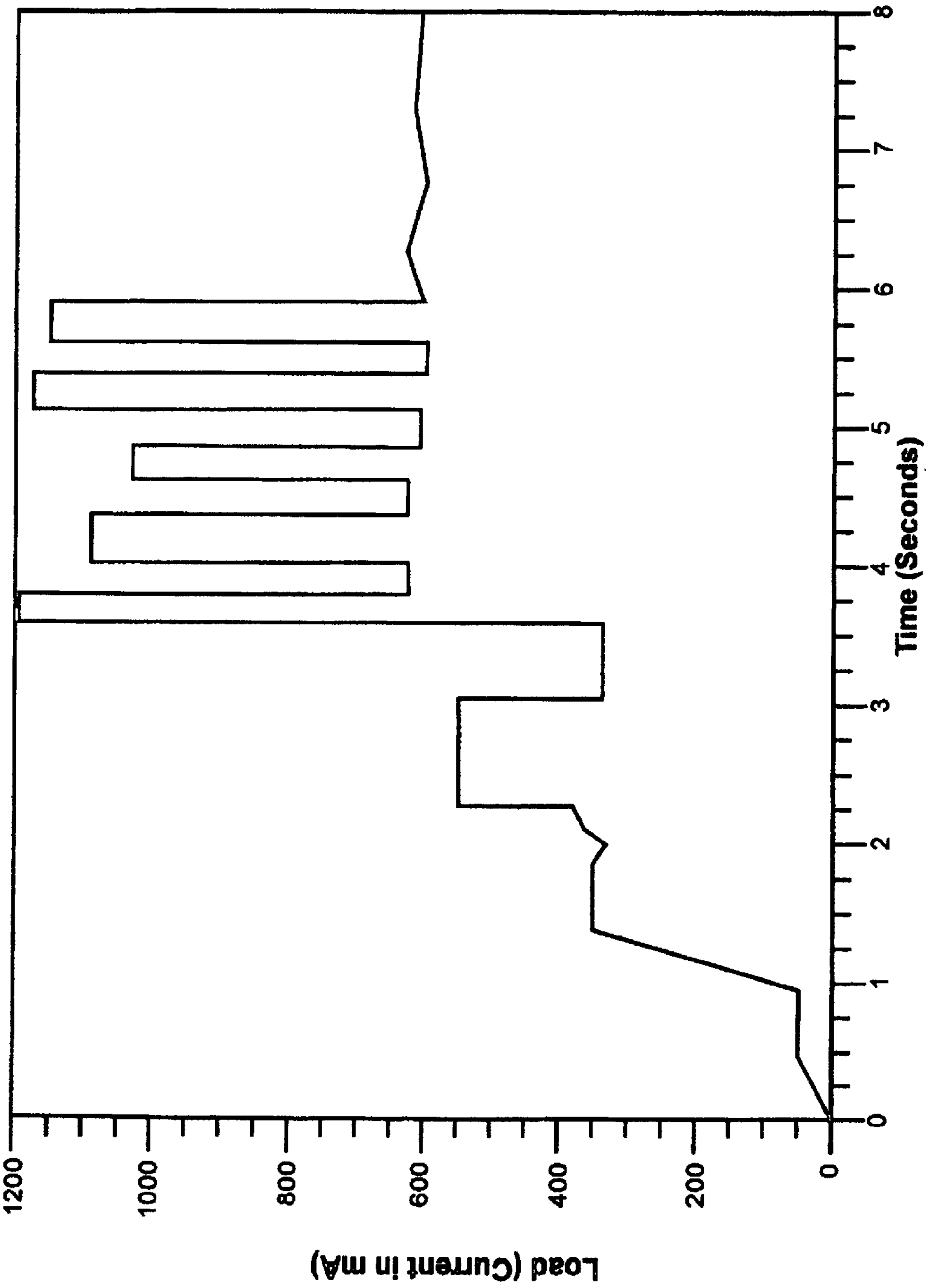
FIG. 19 shows a template created from changes in load during a typical BIOS POST sequence of a laptop computer.

FIG. 19 is a graphical representation of a hypothetical BIOS POST. Each spike in electrical current, logged over time, represents an event within the BIOS POST sequence.

Note that the events are not linked specifically to an actual sub-system operation. Which device turned on and off is irrelevant. The fact that a defined sequence of on/off events (in a context of other measurable power events) can be identified, leads to a reliable power signature template. As technology changes occur in such powered devices as laptop computers, the representative generic template FIG. 19 represents will change. The important issue is that all laptops will change accordingly, so the purpose of a table such as that shown in FIG. 19 will still be served—to differentiate a certain class of powered devices, (e.g., laptop computers) from other classes of electronic goods (e.g., cellular phones).

As with any other power monitoring function, a high-bit-rate A/D converter will yield more granular power-signature templates.

Databases

Database creation can be part of the processes of software 101 in FIGS. 1-1—1-4. Flowchart 101 indicates a number of instances where acquired or calculated values are stored (e.g., step 624). Some of the stored values are transient (e.g., step 658), and only relevant to software processes specific to a particular powered device and its battery pack. Other stored values have long-term (or historical) relevance. For example, while not shown here, software 101 can be configured to permanently log the final Vout value in step 795. This is relevant, should a user allege that hardware assembly 100 in FIG. 2 (and its related software) delivered an incorrect voltage to the user's powered device, which consequently caused damage.

Software 101 can be modified to run sub-routines which log user information, such as number of users who have accessed the software, number of users who did not complete the sequence of required connector 132 attachments (see FIGS. 6–6C), the number of errors generated, the number of Vmin (or Vmax) readings that fell outside existing look-up tables, etc.

Figure 18:
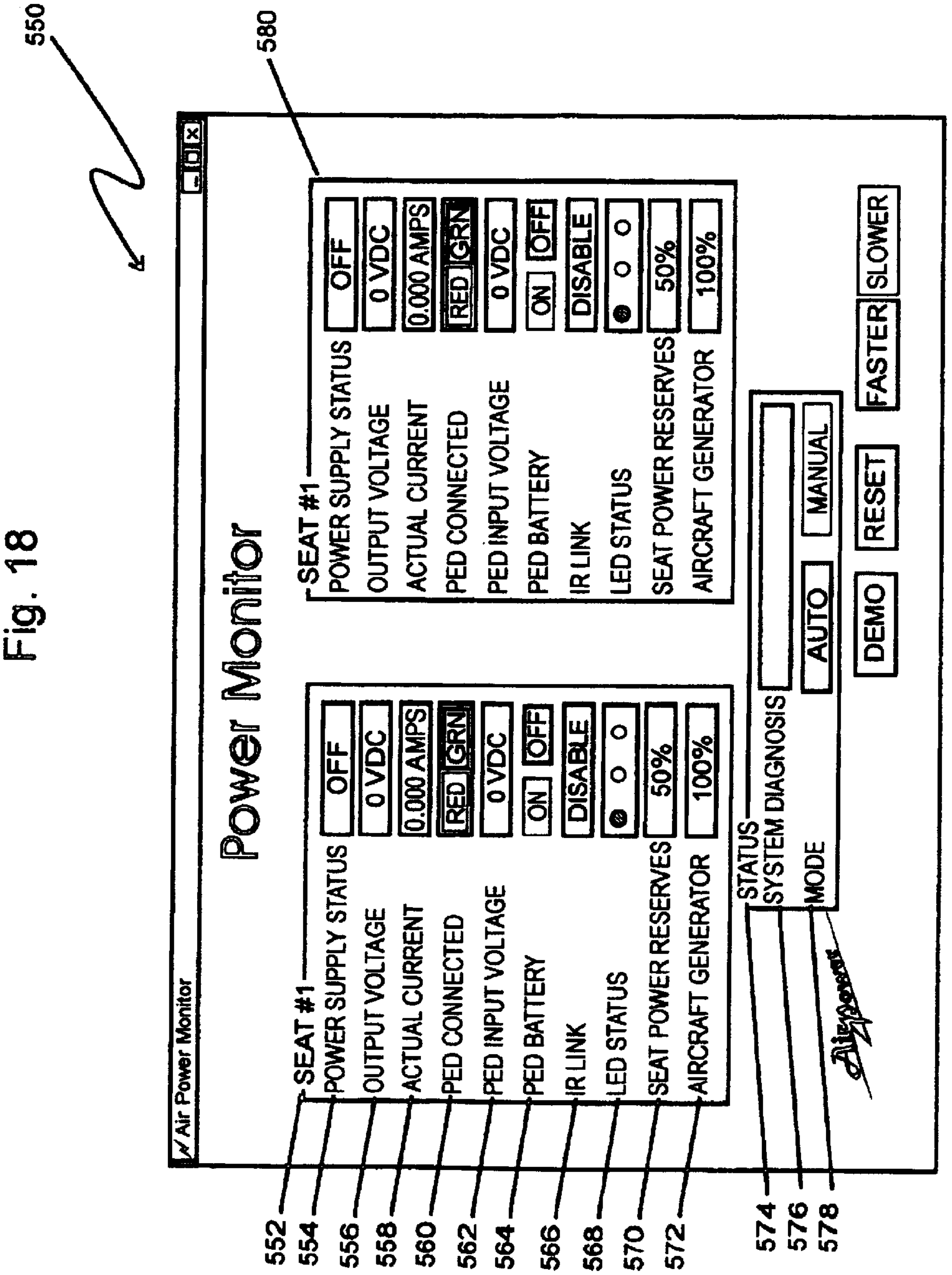
FIG. 18 depicts a screen display showing power-related information, such as voltage values, line-load values, connector insertion states, and other data relevant to the operations of hardware and software.

Data which has value to owners of software 101 (and its related hardware) can include the parameters expressed in the "Power Monitor" screen display in FIG. 18. Displayed information includes a power supply's Vout (556), a match of a known battery pack manufacturer's design voltage (562), position of connector 132 (560), LED warning lights or active indicators (568), whether a powered device's battery is being charged (564), power consumption expressed as Amps (558), and other data relating to the activities at a particular power outlet.

The "Power Monitor" GUI displays relevant data to either owners/providers of hardware/software for power delivery. Such an owner/provider may be, for example, and airline which offers power at each passenger seat. Logging such information from "Power Monitor" software can prove beneficial in analyzing the amount of fuel burned to deliver electrical power to passengers. Detection of battery charging is also relevant, when an airline elects not to allow battery charging on its flights. Power Monitor then becomes a "policing" agent which can, in software 101, be configured to automatically shut down its power supply if battery charging is detected. The proper use of connector 132 disables battery charging when connector 132 is in the position shown in FIG. 6C, so knowing that connector 132 is being used properly can be vital information that gets logged in a database.

A Simple Version of Software 101

Software flowchart 101 in FIGS. 1-1—1-4 offers a sophisticated method of not only calculating a valid Vout value for a configurable power supply, but of recognizing various positions of a connector, and determining the manufacturer's design voltage of a battery pack, among other functions. In many applications, software 101 can be reduced to a very simple, yet effective algorithm that delivers a useable Vout value.

The following steps are all that are required:

1). Sample battery Vmax

2). Sample battery Vmin

3). Vmax+Vmin÷2=Vout

This will work in most applications, but at the sacrifice of some precision, and the loss of viable values that can be used for databases. The hardware required for this minimal software does not require any reconfigurable connectors. Instead, a controllable powerline switch such as that shown in FIG. 13A as 526 is required. Such simple software is also suitable for basic devices like that shown in FIG. 7.

FIGS. 13 (and 13A schematically) show a manually-selectable power converter. Connector 508 in FIG. 13A is representative of a type illustrated in FIGS. 6–6C, 6 D, and 8. The three-step algorithm above operates with a control of a switch 526. Additionally, LED 402 is software controlled so that it illuminates only when calculated Vout in step 3 above is matched at the manual voltage selector 504. If the calculated Vout from step 3 above is between selector voltage tick marks (e.g., 16 volts is the calculated Vout, but selector dial 337 offers only 15 or 17 volts), the higher voltage should prevail.

As described in the "Hardware" section, a basic voltage-comparator can also be used in assembly 400.

Software

Hardware

Software flowchart 101 in FIGS. 1-1—1-4 operates with embedded power-delivery hardware. FIG. 2 illustrates a representational diagram of an embedded controllable-output-voltage power supply 122 and related hardware that is enabled by software 101, as a means of determining Vout of a powered device 136. Power module 100 executes software 101 using an interface provided by a connector 132 (see FIGS. 6–6E, and FIG. 8) attached to a powered device 136's battery pack 134. A user manipulates connector 132 so that software 101 (and MCU 102 ) can acquire voltage values from a battery 134. Software 101 then uses those voltage values, in conjunction with look-up tables (see FIGS. 15, 17 and 20 ), to configure a power supply 122. Software 101 is also capable of monitoring all user activities by using various data-acquisition processes. A full discussion of related hardware appears in the "Hardware" section.

The following description of software 101 (FIGS. 1-1—1-4) details step-by-step processes. These should be read in conjunction with the information presented in companion-section "Software For In-Line, Corded Power-Delivery Hardware." The flowchart for in-line hardware power devices appears in FIGS. 1A-1—1A-9 as software 800. That section discusses general operational concepts, specifics of connectors and related hardware. Note that In-Line hardware does differ from embedded power-delivery hardware. As a non-limiting example, a corded power-conversion module can use a manually-configurable voltage selector, while its embedded counterpart would not have any manual controls. Therefore, differences between embedded and in-line power hardware should be taken into account when reading these companion software descriptions. Neither software 101, nor software 800, is limited to use only with the hardware devices referenced herein. In many applications, software 101 and 800 are totally interchangeable.

Two Software Versions

Software flowchart 101 in FIGS. 1-1—1-4 is a slightly abbreviated version of flowchart 800 in FIGS. 1A-1—1A-9. Repetitive sequences in software 800 often are minimized in software flowchart 101, for example. Such sequences are fully described in software flowchart 800. Flowchart 101 and 800 are meant to be examined together.

Also, while both flowcharts describe the same basic processes and achieve the same functions, each presents a slightly different approach. The order of some processes are re-arranged, for example. This does not detract from functionality or performance, because the processes are not regimented, and can be restructured (to some degree) without jeopardizing the integrity of the software. For example, output-voltage can be calculated prior to, or after, a user's reinsertion of a connector 132 (FIGS. 6–6E). Specific sequences of user's manipulation of a connector 132 can be missed, perhaps because a user jumped ahead and inserted a connector 132 into its battery pack. Neither software 101 (FIGS. 1-1—1-4), nor software 800 (FIGS. 1A-1—1A-9) require all steps to run.

Software Operation

One set of connector 103's pins (FIG. 2) provides a discrete short-to-ground used only by an in-line power adapter. A second set of pins at connector 103 is reserved for an adapter-less power-cord 115. Software flowchart 101 describes this second sequence, with two-conductor cord 115 connecting power supply 122 (in power module 100) to battery 134 (and its associated powered device 136).

The primary difference between software 101 (FIGS. 1-1—1-4), and software 800 (FIGS. 1A-1—1A-9) is that software 101 is designed to run on embedded hardware, while software 800 is tailored to operate with external power hardware, such as an in-line corded DC/DC (or AC/DC) power conversion adapter.

Embedded power hardware for software 101, as depicted in a block diagram as FIG. 2, is typically connected to a powered device 136 via a simple two-conductor power cord 115. A previously referenced example of an embedded hardware application is to embed a power module 100 behind the dashboard of a car, so that it can deliver power through the cigarette-lighter outlet (element 103 in FIG. 2). With a module 100 behind the dashboard, the configurable power supply 122 can change its Vout to match the Vin of a powered device 136. This ability for a module 100 to auto-configure its power output eliminates the need to use the in-line DC/DC converter typically associated with powering a device 136 from a car's cigarette-lighter power port.

The hardware of the invention is also available as an external, in-line DC/DC (or AC/DC) converter adapter, as in FIGS. 10, 11, and 13. This type of hardware operates with software 800 (FIGS. 1A-1—1A-9), which principally differentiates itself from software 101 (FIGS. 1-1—1-4) by its ability to operate with a variety of input power sources. Another differentiator is that the external power-conversion adapters allow for both a user-adjustable, or an auto-configuring, output voltage.

As shown in FIG. 2, power module 100 is compatible with a variety of external power-conversion adapters (FIGS. 10, 11, 13, and diagrammatically depicted in FIG. 13A). Assembly 400A typifies an interchangeable alternative to the simple two-conductor cord 115 (and associated connector 132). A user can select either of these two means of delivering power from a module 100 to a powered device 136. Power module 100, and power-conversion adapter 400A, are compatible, and operate together to optimize the final output power to a powered device 136 (See discussion of power box 400 in FIG. 13A).

Connector 103 in FIG. 2 is a nine-conductor (two power, and seven data lines) interface. This style of connector is identified as an "ARINC 628" style connector available from Hypertronics (Hudson, Mass.). It uses two discrete non-power pins to create a short-to-ground when the two mating elements of the connector are attached. This is a commonly used method of determining when a connection is made, and is readily known to those skilled in the art. Software flowchart 101, in step 602, identifies the short-to-ground, indicating a cord-only connection. If the query in step 602 were FALSE, and input powerline #2 is active, software step 604 executes, since the FALSE report indicates that an external power conversion adapter 400 A (FIG. 2) is connected to power module 100. This FALSE value results in a 5 VDC output from power supply 122. This 5-volt power signal provides power to an attached in-line power adapter. The description of software flowchart 800 (FIGS. 1A-1—1A-9) addresses how an in-line power adapter utilizes this 5-volt power delivery from embedded power module 100.

This is the only reference to a second series of software processes that are specific to an in-line power adapter. Further information about the participation of software 101, and its embedded hardware, in the in-line adapter functions is detailed in the description of software 800 (FIGS. 1A-1—1A-9).

An Oft-Repeated Sequence

One of the basic building blocks of software 101 in FIGS. 1-1—1-4 is a simple powerline voltage acquisition, followed by sampling load on the powerlines. This two-sequence process is so central to the operation of software 101 that it is highlighted in box 606.

Step 608 samples powerlines 114 and 116 in FIG. 2 identified in software as port #1 (there are multiple A/D ports at MCU 102 in FIG. 2A). There are specific hardware states that can be identified by a voltage check of powerlines 114 and 116. One hardware state is whether a connector 132 (see FIG. 6B) is inserted in its Position #1. If connector 132 is inserted as shown in FIG. 6B (but not 6C), battery 182 will deliver power along powerlines 114 and 116. Software 101 uses this voltage indicator at A/D port 110 (FIG. 2A) to verify the position of a connector 132, as well as to acquire battery-voltage information necessary to configure power supply 122's output voltage.

Voltage Query

Software 101 uses a voltage detection query in step 610. If this statement is TRUE, step 612 executes a GOTO command which puts software 101 at step 648—connector 132 is in the configuration shown in FIG. 6B. This event could happen because a user attached connector 132 to battery pack 134 before attaching power cord 115's connector 103 to embedded power module 100 (FIG. 2).

If the statement in step 610 of software 101 is FALSE, i.e., there is no voltage detected on powerlines 115 in FIG. 2, then software 101 configures power supply 122 to a low output voltage, here 3 VDC. This low voltage is applied to power cord 115, in preparation for acquiring a current sample (load activity). Load parameters are detailed in the "Identifiers" column of look-up table 990 (FIG. 20). The resistive values associated with the "Identifiers" enables software 101 (and software 800 (FIGS. 1A-1–1A-9) to determine specific user activities relating to connector 132, power cord 115, battery 134, and powered device 136. At the time of manufacture, all associated hardware devices (e.g., power cords, connectors, etc.) are pre-configured to operate at specific resistive values. Software 101 compares each line-load value acquired in the steps of the flowchart in FIGS. 1-1–1-4 to look-up table 990. These comparisons of line load to pre-determined hardware resistive values determines the particular combination of hardware elements attached to the power delivery hardware. Also, matching load values to look-up 990 determines which of three possible positions a connector 132 is in at any given time.

Load Sampling

Once a low-voltage is applied to the powerlines in step 614 of software 101 (FIGS. 1-1–1-4), a quick line-voltage check (step 620) is performed to make sure that power supply 122 (FIG. 2) is properly configured. This power supply output-voltage sequence (steps 614–620) is performed only once, prior to the first time that a powerline load sampling is done. If the answer to query 620 is FALSE, step 618 executes a fill shut down (618) of power supply 122 in FIG. 2. Failure of power supply 122 to properly execute a voltage command is considered a critical error.

In step 622, software 101 makes a call to MCU 102 (FIG. 2) to sample line load at A/D I/O port #3 (lines 106 in FIG. 2A). This port is configured to read electrical current directly using a resistive element 108. The acquired load value is stored in memory (step 624) as an Ohm-value labeled as "$LL^A$", then this value is compared in a look-up table (steps 626 and 628 ). Look-up Table 990 (FIG. 20) serves as the list of valid comparators to which is compared the resistive-load value acquired in steps 622–626. The results of the look-up table comparison is presented in step 630. Step 632 reduces the look-up comparison to a simple query: "Does $LL^A$= $LL^3$?" In the look-up table, $LL^3$ defines an Ohm-value that equates to a power cord 115 and connector 132 in a final configuration that is ready to be attached to a battery pack. Note that the resistive Ohm values in look-up table 990 can be converted to actual current values @ 3 VDC.

Look-up table 990 (FIG. 20) is expressed as resistive values, in Ohms. This is because Ohm values are more suitable to the hardware descriptions in look-up table 990. Since the line voltage is known for most of these expressions, these Ohm values can be converted to milliamps or other suitable electrical current expressions to minimize computational activity during line-load samplings As powerline voltage can vary after step 760, where power supply 122 (FIG. 2) is turned on, all values expressed as direct current readings should be recalculated, and look-up table 990 updated accordingly If the comparator test in step 632 is FALSE, step 634 initiates a user prompt that is intended to promote compliance with the expected hardware state. The expected hardware state here is that power cord 115, and connector 132 are attached. If connector 132 features a protective cap 530 (FIG. 6D), it is supposed to be removed. Note that the error-loop goes back to step 608, where a line-voltage check is again performed. No low-voltage power is ever applied to powerlines 115 (see step 614), without a check to see if the powerlines are available, or if there is already a voltage present from a battery pack 134. If there is a voltage present on the powerlines, the hardware is in a state of having a power cord 115 and a connector 132 already properly inserted in a battery 134. There is only one hardware combination that will allow battery voltage to flow on he powerlines . . . it is $LL^5$ (see Look-up Table 990 in FIG. 20).

Assuming that test 632 returns a value of TRUE, the final step in sequence 606 of software 101 (FIGS. 1-1–1-4) is to reconfigure the output of controllable power supply 122 (FIG. 2) to 0 VDC, i.e., shut down. This frees the powerlines for further line-voltage samplings.

Multiple Queries

The abbreviated format of software flowchart 101 in FIGS. 1-1–1-4 condenses a series of line load data acquisition and comparison processes. The notation in step 636 indicates other "LL?" (Line Load) queries. These are defined in detail in the description of software flowchart 800 (FIGS. 1-1–1-4A).

Objective

While oversimplified, software 101 uses hardware that functions as the equivalent of a multi-meter to discern what is happening in its environment. By reading voltage and current, software 101 is able to respond to events in a meaningful way. Monitoring hardware by reading line voltage and current (line load) enables software 101 to prompt a user to configure various hardware elements in a specific sequence. By performing these functions in software, the need for a user to know anything about the power requirements of a host device is eliminated. Thus, software 101 and related hardware provide a system for determining the power requirements of a previously unknown battery-powered device.

Repetitive Loops

Software flowchart 101 in FIGS. 1-1–1-4 only shows a single execution of each process sequence, such as one voltage and load sampling in box 606. In reality, software 101 is constantly looping through repetitive voltage and current samplings. No functions, such as turning on power supply 122 (FIG. 2), are executed without first checking line voltage and current to make sure that all hardware elements are properly configured. More importantly, since a user is involved in all processes, software 101 repeats voltage and load samplings to make sure that a user hasn't performed some action while repositioning a connector 132 that creates an error state. Therefore software 101 performs continuous samplings to assure that all machine states are as they should be. Data acquisition sampling rates, while not specified here, should be timed based on the critical nature of a user's actions at any given stage in software 101's progression.

Once Connected

Step 640 in software flowchart 101 (FIGS. 1-1–1-4) assumes that a power cord 115 and connector 132 (FIG. 2) have been configured to be compliant with "Identifier" $LL^3$ in look-up table 990 (FIG. 20).

Again, a line-voltage check in steps 642–644 detects a voltage on powerlines 115, confirming that connector 132 has been properly inserted into battery 134. A TRUE answer to the query in step 644 confirms the "Battery Connected" state in step 648. Note: References to "Red" and "Green" in flowchart 101 (FIGS. 1-1–1-4) correspond to "Position #1" "Red," and "Position #2" ="Green" of a connector 132 (see FIGS. 6–6C).

MCU 102 in FIG. 2 is configured to be able to acquire both positive and negative voltage values. This is likely not necessary, since all elements of the power system, including the power cord, and all connectors are manufactured to be mating components. However, MCU 102 does have the ability, if necessary, to reverse the polarity of the powerlines. A power switch 112A in module 100 is needed to perform polarity reversal. Software 800 (FIGS. 1A-1–1A-9) does not detail polarity reversing, but, this function is also included in the incline adapter version, and can easily be integrated into software 101 by one skilled in the art.

Voltage Acquisition and Calculation

Software 101 acquires voltage values from battery pack 134 (FIG. 2) in steps 656–678. These processes are also detailed in the discussion of "Software For In-Line, Corded Power Delivery Hardware."

Of note is A/D I/O Port #4, which is. polled in step 670. This port includes a large resistive load such as a power resistor. The resistive value of this load is substantial enough to simulate an operational level of a powered device 136 (FIG. 2). The Ohm-value of this load is roughly computed by referencing the "Load Current" expressions in FIGS. 15. As can be seen, this supplemental load is based on the charge rate "C" of each type of battery cell chemistry.

There is no need to perform complex computations if a type of powered device is known. As a non-limiting example, if the type of anticipated powered device is a laptop computer, it can be reasonably assumed that the average load drawn by this class of powered devices is 1.0–2.5 Amps (given the state of the art for such devices). The high-end load of 2.5 A includes the power required to charge the laptop's battery. Since software 101 (and 800 ), with associated hardware, are designed to disable battery charging functions, the current-drain is more typically a *maximum* of 1.0–1.5 Amps. For purposes of a load figure for A/D I/O port #4, 750–900 ma is adequate. The purpose of this additional load is to pull down the battery voltage, in order to acquire a minimum voltage (Vmin) value.

All computations and calculations of voltages performed in software steps 678–714 can be executed at any time prior to software step 760 which is the software step that performs a first Vout command to power supply 122. As with many of the software sequences, this sub-routine does not have to be executed in the exact order of state changes listed in software flowchart 101 in FIGS. 1-1–1-4 (or in software 800 in FIGS. 1A-1–1A-9).

Diode Depression

FIG. 6E shows a modified female connector in a battery pack 134. A diode 185 is introduced into the wiring circuit in battery pack 134. This diode will depress any acquired voltage values. Software 101 in FIGS. 1-1–1-4 (and 800 in FIGS. 1A-1–1A-9) should be recalibrated to reflect the voltage loss (approx. 0.3-volts for a typical diode). The diode only impacts voltage values acquired from battery cell(s) 182. Output voltages from power supply 122 (FIG. 2) are not impacted by diode 185, because the electrical signal to a powered device does not flow through diode 185.

Software 101 (FIGS. 1-1–1-4) and 800 (FIGS. 1A-1–1A-9) are modified slightly when diode 185 is involved in battery voltage acquisition. Software already distinguishes two voltage acquisition modes. After a voltage-configuration command is sent to a controllable power supply 122 (FIG. 2), software 101 verifies power supply 122's output by sampling line voltage (see steps 614–620 in FIGS. 1-1–1-4, for example). Since power supply Vout readings are. not effected by diode 185 in FIG. 6E, software 101 (and 800) these voltage acquisitions as non-compensated values. The differentiator software 101 uses is whether power supply 122 is in an ON or OFF state. Therefore, any voltage values that are acquired while power supply 122 is in an OFF state must be voltages coming from battery 134. Thus, any voltage value acquired during an OFF state of power supply 122 are mathematically voltage compensated.

The effect of the diode on voltage readings is most pronounced on battery packs that have been deeply discharged. The spread between the no-load voltage (Vmax) and the load voltage (Vmin) can be quite small in this scenario. Since the diode is a constant in both the no-load and under-load samplings, the 0.3-volt loss extends to both values. However, FIGS. 1-1–1-45's pack voltages need to be adjusted, since the diode loss can make it appear that a almost-fully-discharged battery pack is below it's minimum design voltage.

The voltage configuration commands sent to a configurable power supply such as 122 in FIG. 2 (or 122A in FIGS. 1-1–1-43A) must output a value higher than the Vmin (under-load) voltage value acquired from battery cell(s) 182. If the power supply voltage is lower than the sustainable voltage of battery 182, battery 182 will dominate the powerlines and be delivering power to a powered device 136 (in FIG. 6E). The final monitoring loop for line voltage (and current) performed by software 101 (repetitive steps 788–798 ) allows the software to readjust and optimize a power supply's Vout (step 797). This process can be modified to use stored values of battery Vmin and Vmax, in order to determine if the Vout voltage value of a power supply is sufficiently above the Vmin of the battery. This will ensure that the battery isn't intermittently coming on line during periods when the output voltage of an external power supply sags. Software 800 (FIGS. 1-1–1-4A) illustrates these sequences in greater detail, in steps 961 through 909.

The inclusion of a "bleed" resistor 185 A in FIG. 6E across diode 185 will ameliorate the depressed voltage values. Since both diode 185, and its optional resistor, are electrically removed from the battery circuit when connector 132A is removed, there is no degradation of voltage or impedance by diode 185, or its optional resistor.

For further information on the use of diodes, see the section "Diode UPS."

Battery Voltage Look-Up Table

Look-up table 799 in FIGS. 1-1–1-45 lists battery cell-voltage ranges for commonly-used rechargeable battery chemistries. An observation of the voltage values indicates that a number of cell-pack configurations "look" like others. The voltage range of an 8-cell Ni-Cad or NiMH pack fall within the same voltage range as an 8-cell Li-Ion (Coke) pack, for example.

Fortunately, software 101 (FIGS. 1-1–1-4) and software 800 (FIGS. 1A-1–1A-9) are not looking at mean or average voltage values—software 101 reads voltages that are identifying cell-voltage *extremes*. Minimum cell-pack voltage (Vmin) and maximum cell-pack voltage (Vmax) vary considerably, especially Vmax. An 8-cell Li-Ion (Coke) pack can generate voltage readings as high as 16.80 VDC, while a similar cell construct for Ni-Cad or NiMH will only yield a maximum no-load voltage of 10.560 VDC.

Note that the maximum cell design voltages shown do not necessarily reflect the actual no-load output voltage a particular cell type is capable of producing. An NiMH cell, for example, will read approximately 1.46-volts when freshly charged. The 1.320-volt value shown in FIGS. 1-1–1-45 is the mathematical E°cell value. This lower voltage is used in the look-up table as a safety measure. Its use avoids excessively high Vout voltage values being delivered to a powered device.

All of the voltage values in look-up table 799 are industry-recognized cell design parameters. In the real world, battery pack state of charge/discharge will shift the voltage readings. Condition of the cells also plays a major role in depressing both Vmin and Vmax. Fortunately, the Vmin voltage values are more subject to depression under load conditions. The test load can be 750–900 ma, which is fairly substantial. Cells that are deeply discharged, or suffering from abuse or mistreatment, can be expected to drop precipitously in voltage when placed under load. Also, voltage and cell capacity are interrelated. Voltage drops as a function of cell capacity. Compromised cell capacity will quickly show up as a depressed under-load voltage (Vmin).

At the other extreme, Vmax is a no-load test. The most valid Vmax test will be one that introduces the least amount of load to the battery pack. Therefore, some attention should be paid to line-load look-up table 990 in FIG. 20. The lower the total resistive value of $LL^3$, the more effective will be Vmax tests. FIGS. 9A–C show various ways to wire a smart circuit. In light of decreasing overall resistance when reading Vmax, the optimum scenario is to wire the cells so that the load of the smart circuit is eliminated.

Transient cell "recovery" is a characteristic common to all battery chemistries. Cells that have had time to recover from a load event will temporarily regain increased no-load voltage characteristics. Thus, when Vmax is acquired, for some small amount of time (determined by how long it has been since the battery pack was used), the no-load voltage will read higher than the sustainable cell voltage. That is one reason why a Vmax value is acquired first, before the Vmin (load) acquisition (see steps 660 and 676 in software flowchart 101 in FIGS. 1-1–1-4). This "recovery" characteristic of rechargeable cells is beneficial to capturing a set of cell voltages that yield a significant spread of values between Vmax and Vmin.

Look-up table 799 in FIG. 15 expresses cell ideals, and is therefore, only a reasonable approximation of reality. But look-up table 799 is helpful to interpret software 101 (and 800) $Vref^1$ and $Vref^2$ values (see steps 662 and 682 in software flowchart 101).

A non-Limiting example of the applicability of look-up table 799 (FIG. 15) is illustrated using the table below for a battery pack voltage test that yields a Vmax of 14.00-volts, and a Vmin of 12.00-volts. Consulting look-up table 799, the following possible voltage matches are available:

Vmin = 12.00 VDC Vmax = 14.00 VDC

| Ni-Cad | NiMH | Li-Ion (Coke) | Li-Ion (Graphite) | Li-Polymer |
|---|---|---|---|---|
| 12.5/12.99 (10 cell) | 12.5/13.20 (10 cell) | **10.00/16.80 (4 cell)** | 14.40/16.40 (4 cell) | **12.0/16.80 (4 cell)** |
| 15.00/15.59 (12 cell) | 15.00/15.84 (12 cell) | 7.50/12.60 (6 cell) | 10.80/12.30 (6 cell) | 9.0/12.60 (3 cell) |
| | | **10.00/16.80 (8 cell)** | 14.40/16.40 (8 cell) | **12.0/16.80 (8 cell)** |
| | | | | 9.0/12.60 (6 cell) |

Note that the Vmin 12-volt, and Vmax 14.00-volt parameters each fits at least one of all of the above voltage ranges. However, only the four battery packs shown in bold fit both acquired voltage parameters. Since the Li-Ion Coke and Polymer 4-cell packs and 8-cell packs only differ in the capacity of each pack (see footnote 15), these can be considered the same. Therefore, only one valid voltage-range match of a battery cell's chemistry is achieved by implementing software 101's $Vref^1$ and $Vref^2$ calculations. The 12-cell Ni-Cad and NiMH packs are included because the minimum cell voltage of these packs can be as low as 12.00-volts.

The result of software 101's SORT and LIST steps 706 and 708 is as follows:

$Vref^1$=10.00 volts

Vmin=12.00 volts

Vmax=14.00 volts $Vref^2$=16.80 volts

Cell Impedance

While not addressed in look-up table 799 (FIG. 15), battery cell impedance can be a valid indicator of cell type. All cells increase impedance as a function of discharge. As such, decreases in voltage are related to changes in battery discharge levels. So too, do impedance changes reflect battery discharge states. These changes in voltage and impedance aren't very pronounced in Ni-Cad and NiMH cell chemistries, but Li-Ion cells do show clearly defined impedance changes that track with decreases in voltage. Impedance checks can be integrated into software 101 or 800, if further granularity in identifying a battery pack's discharge state is required. Such added complexity is usually unwarranted, since it will only come into play when the Vmin and Vmax readings are from a deeply discharged battery pack. A deeply discharged pack can result in only a minimal voltage spread between Vmin and Vmax, but cell "recovery" characteristics typically preclude that. Even then, battery and powered device circuits are designed to allow a sufficient battery reserve that Vmin and Vmax will still be reliable indicators. Do not use impedance testing if diode 185 in FIG. 6E is implemented, or if a smart circuit is wired into the powerlines, as shown in FIGS. 9A and B.

Connector Removal

Software 101 (FIGS. 1-1–1-4) then moves to a new machine state in step 716, with a user prompt to remove a connector 132 already in Position #1 (FIGS. 6B and 17) from its battery pack 134 (FIG. 2). Steps 718–720 verify that line voltage has dropped to 0 VDC, indicating that connector 132 has been removed from battery pack 134. Further validation of the presence or absence of connector 132 is achieved in steps 722–736, which is the previously-described line-load test. In step 736, software 101 anticipates that the cord/connector combination has reported back an Ohm value that matches $LL^3$ in look-up table 990 (FIG. 20), i.e., male connector 132 is removed from its associated battery pack 134. If the response to the query in step 736 is FALSE, software 101 loops back to step 716, first generating a user prompt 734 to remind user to remove connector 132. These prompts are not always available, in which case software 101 continuously loops through the voltage and line load sampling steps 716–736, until the answer to the test in step 736 became TRUE (YES).

Step 732 can be configured in software 101 to return an actual value, instead of the specific $LL^F$=$LL^3$ query shown. Thus, the results of a look-up table matching in step 730 can be any one of the pre-defined "Identifiers" in table 990 (FIG. 20). For example, the Ohm-value match value can be reported as an actual value $LL^2$, instead of NOT A MATCH to $LL^3$. Thus configured, software 101 can execute an appropriate user prompt 734 that matches the $LL^2$ hardware configuration detected. By returning the appropriate value (e.g., $LL^0$, $LL^1$, $LL^2$, etc.) the user prompt can be better suited to the machine state at that time.

Look-up table 990's value $LL^2$ indicates, for example, that a power cord 115, and connector 132 are attached (see FIG. 2), but that resistor-equipped connector cap 540 in FIG. 6D is in place. A user prompt would indicate a need to remove connector cap 540. Obviously, connector 132 is removed from battery back 134, since it would be impossible to reattach connector cap 540 while connector 132 is inserted in battery pack 134. The response for software 101's sequence of steps 716–736 would be FALSE, because a user has put some hardware elements into an unexpected non-compliant state by reattaching connector cap 540 to its connector. In software 800, as defined in FIGS. 1A-1–1A-9, the entire sequence of various hardware states is detailed. Software 800 loops back to the appropriate sequence (steps 823–835 ) to issue a user prompt associated with a reported value of $LL^2$ (user prompt 834). Software 101 can be similarly configured.

Connector Reinsertion

Steps 738–758 indicate a new machine state, with connector 132 to be reinserted in battery pack 134 with its green side (Position #2 in FIG. 17) upward (FIG. 2). FIG. 6C shows connector 132 in Position #2. Again, a powerline voltage check 740–742 is performed prior to a line load sampling 744–754.

Note that the response to step 742's question "Vin Detected?" can differ in the anticipated TRUE/FALSE response at any voltage check in the flowchart. The TRUE answer is NO, and the FALSE (error response) is YES in step 742 (and also, for example, to the same question in step 720). Software 101 does not want to see a line voltage in this software sequence. In voltage verification steps 644 and 674, for example, the TRUE response is YES, and the FALSE response is NO. Steps 644 and 674 expect a line voltage to be present.

Power Delivery Sequence

Software 101 (FIGS. 1-1–1-4), in steps 760–798, addresses the final configuration of power supply 122's output voltage (see FIG. 2), and power delivery to a powered device 136. Step 714 has already defined the most probable (and safest) output voltage for a power supply 122 (FIG. 2). A second possible output voltage "Vavr" (Average Voltage) is also available from step 712. Software 800 details additional steps taken to determine a "Vbst," (Best Voltage).

Power supply 122 is turned on in software step 762. The system state, at this juncture, is that powered device 136 has not yet been turned ON. Software 101 executes an output-voltage confirmation in steps 764–768. Note that MCU 102's A/D I/O port #1 (110 in FIG. 2A) is polled to acquire line voltage. If the commanded Vout value in step 760 matches the acquired line voltage in step 764, a TRUE value (YES) is reported in step 768. If the two voltage values do not match, an error loop 770 occurs, and software 101 tries to reconfigure power supply 132. If this loop fails after three attempts, a critical error occurs and power supply 132 is totally shut down.

Step 772 acquires a powerline load value $LL^{H}$. This line load needs to be converted to a value that reflects the new Vout from steps 760–768. This is a calculated value, using previously stored line load value $LL^{G}$ from step 148, multiplied by the value of Vout (from step 760). The result becomes new voltage-adjusted value $LL^{H}$ in step 776. The new load value is stored in memory as $LL^{6}$, and is made available in look-up table 990 (FIG. 20). A verification is made on the load calculation in step 778, to confirm that acquired load value $LL^{6}$ is the same as calculated value $LL^{H}$.

Steps 780–785 is a sequence of powerline voltage acquisitions. This sequence differs from previous line-voltage acquisition activities. This set of two voltage values is specific to determining possible changes in output voltage commands to power supply 122. Step 780 acquires a no-load voltage (Vnol), which is stored in memory (step 781). Then, a load at A/D I/O port #4 (106 in FIG. 2A) is introduced into the circuit, in step 782. The resistive load available at port #4 is substantial, being within a range of 750–900 ma. A second voltage is acquired as Vlod, but this value is voltage under load (783). The additional 750–900 ma drain on the powerlines roughly simulates the operational power requirements of a powered device 136 (FIG. 2).

The two stored voltage values Vnol (a no-load voltage stored in step 781), and Vlod (an underload voltage stored in step 784) are compared in step 785. If the two voltage values are within a tolerance of 5% to each other, no output voltage adjustments are made to power supply 122. However, if there is more than a 5% deviation between the load (Vlod) and no-load (Vnol) voltages, a voltage adjustment is commanded in step 786. This helps to avoid voltage sags that could occur when the powered device turns on. Software 101 uses this basic approach to assure that a power supply 122's (FIG. 2) output voltage does not drop below the Vout value of Vmin when the load of the powered device is induced in the system (i.e., when the powered device is turned on).

Powered Device is Turned ON

Software 101 (FIG. 1) concludes in steps 787–798. Step 787 prompts a user to turn on powered device 136 (FIG. 2). Software 101 samples powerline load (step 788) to determine whether this user action has happened. The load value will likely be expressed as any increase in current above previously defined load value $LL^{6}$ from step 776 (and available in look-up table 990 (FIG. 20). This new line load value $LL^{1}$ has stored in step 789 as $LL^{7}$, and is compared to $LL^{6}$ in step 790.

The timing of line load sampling steps 788–790 is relevant. If, as a non-limiting example, a powered device 136 in FIG. 2 is a laptop computer, a BIOS POST sequence will occur within a window of the first 5–30 seconds after a user turns on device 136 (the time at which the BIOS POST occurs can vary from laptop to laptop). FIG. 19 illustrates a BIOS POST event. Hardware devices within a powered device are turned ON and OFF during this activity, so it would be appropriate to sample line load during this 8 seconds of intense activity. The large spikes in current draw are easily detectable as confirmation that the powered device is activated. A template of a BIOS POST in FIGS. 1-1–1-49 can be implemented in software 101, which is used to identify the type of powered device being powered. Other powered devices, for example a CD-ROM audio player, would not exhibit the characteristic boot sequence of a laptop computer. This device-class identification process is not critical to the operation of software 101, or any related hardware.

Once the BIOS POST has completed its hardware testing, a reasonably representational $LL^{1}$ value can be acquired by software 101 in steps 791–796.

Steps 791–797 are a repeat of steps 780–786, as previously discussed. Again, this is a voltage-stability check used specifically to assure that the output voltage of power supply 122 (FIG. 2) does not sag in the actual under-load conditions being created by the powered device 134.

The final sequence 798 in software 101 (FIGS. 1-1–1-4) is a continuous monitoring of powerline voltage. Software 101 is looking for a power disconnect, which would occur when a user removes connector 132 from battery pack 134 (rig. 2). If a zero-voltage value is detected, software 101 immediately commands MCU 102 to shut down power supply 122. This is to ensure that a connector 132 is not powered while its electrical contacts are exposed to a user.

Software 101 also monitors powerline load during its monitoring sequences 798, sampling current readings and comparing them to Ohm values expressed in look-up table 990 (FIG. 20). Any regression to resistive value $LL^{6}$ indicates that a powered device has been turned OFF, but that a connector 132 is still attached to a battery pack 134. Recognizing this OFF state can be useful for power conservation—as power supply 122 (FIG. 2) can be put into a standby or sleep mode. If power supply 122 is put into such a wait mode, software 101 retains its last Vout value, should a user turn the powered device back ON. However, if a powered device is turned OFF, *and* connector 132 is*removed* from battery pack 134, power supply 122 is shut down. If a user reconnects the same powered device, software 101 executes again, in its entirety.

Software for In-Line, Corded Power-Delivery Hardware

Note: Matter presented in this section is often also described in the previous software sections, as well as throughout the hardware sections. Any relevant matter is assumed to be included here by reference, as if it were presented here in full.

Hardware

FIGS. 1A-1–1-9 illustrate software 800 that operates primarily with external power conversion adapter hardware, a non-limiting example of which is device 335B in FIGS. 13 and 13-1 (and shown diagrammatically as 400 in FIG. 13A), or equivalent external power adapters. The hardware is comprised of manually-selectable output-voltage indicator 337, configurable DC/DC (or AC/DC) power converter 122A, blink/solid LED indicator 402, powerline switch 526, and a source of logic, controller and data acquisition, such as microcontroller (MCU) 102A.

In operation, a user manipulates voltage selector 504 in selectable indicator 337 (FIGS. 13 and 13A). MCU 102A acquires at least one voltage from a battery 508B of an associated powered device 508C that is attached at output connector 508. The attachment is via a connector 132 (reference FIGS. 6–6D), and a power cord 508A.

At least one acquired, or processor calculated, voltage value is stored in MCU 102A's memory 518A as a value which, when matched at selector indicator 337, serves as a confirmation that a user has properly configured voltage selector 504. When a voltage match is confirmed, MCU 102A locks out voltage selector 337 from any further inputs, and also illuminates LED 402 to confirm to a user that power adapter 400 is properly configured.

LED 402 can illuminate in a non-limiting number of ways, such as blinking, solid ON/OFF, or by changing color. The rate of blink will be used herein as a non-limiting example of how LED 402 operates. Rate of blink slows as voltage selector 504 moves away from the target voltage to be matched and, conversely, LED blink rate accelerates as voltage selector 504 is rotated toward the desired voltage. When an acceptable voltage match is achieved, LED 402 stays solid ON in this example.

Once selector 337 (FIG. 13A) is properly configured, MCU 102A configures power converter 122A to output the desired voltage. Next the MCU verifies, at conductors 527 and 529, that the output voltage is correct, then MCU 102A closes powerline switch 526, allowing power to flow to powered device 508C.

Power converter 122A can also be an AC-input/DC-output power converter (or even a DC-to-AC inverter). Those skilled in the art can make changes to software 800 (FIGS. 1A-1–1A-9) to provide compatibility and operability with AC power. Some features of power box 400 (FIGS. 1-1–1-43A) and software 800 do not operate the same, such as the initial voltage initialization process between a power source and power box 400.

Hardware Variants

Manual voltage selector 337 is not essential to the operation of configurable power adapter 335B in FIGS. 13 and 13-1 (diagrammatically device 400 in FIGS. 1-1–1-43A). MCU 102A is capable of automatically configuring power converter 122A without any user intervention. This would be a preferred mode for delivering a matched voltage to a powered device.

An alternative modality uses a simple voltage comparator circuit to match a voltage input from a battery source 508B (FIGS. 13A) to an output voltage of a power converter 122A. The battery voltage value in the comparison is Vmax (no-load voltage). The actual output of a power converter 122A (Vout) would be depressed by 10% of Vmax or, a more simple approach, would be expressed as:

$$V\text{max}-1\text{ volt}=V\text{out}$$

An LED 402 is used to indicate a successful voltage match. A gated FET serves as a switch 526 to create an electrical path between power converted 122A and battery 508B, and the FET also switches the LED circuit ON.

FIG. 11 shows a variant, with an intermediate power conversion box 357 that is inserted in-line between a manually configurable power adapter 335A and a host device 349's battery pack 355. This configuration of power-conversion box 357 is comprised of an MCU 102A (FIG. 13A), an LED 338, and a powerline switch 526A (reference switches 526 and 526A in FIG. 13A for equivalents). Power conversion box 357, having acquired at least one voltage from battery 355, then samples the output voltage of power adapter 335A while a user rotates selector 337. Once the output voltage from power adapter 335A matches the desired voltage, the MCU in box 357 illuminates its LED as described above. Powerline switch 526 (or 526A) is held closed by MCU 102A as long as the output voltage from power adapter 335A matches the defined voltage. Should a user rotate selector 337 in FIG. 13A to a position that is not a match, even while power adapter 335A (FIG. 11) is in operation, software 800 commands MCU 102A to open powerline switch 526 (or 526A), which discontinues power to powered device 508C.

Hybrids

FIG. 10 is essentially the same as FIG. 11, except that power conversion box 357 in FIG. 11 has been integrated in battery housing 347 in FIG. 10. Battery housing 347 can be an empty plastic shell, or have some (or all) of its battery cells removed. Because migration of MCU 102C, power switch 526C, and optional LED 338C to battery 347's enclosure creates a dedicated device specific to a mating powered device 349. In the early 2,000s, automotive accessory voltage could change to 42 VDC. Whatever voltage is currently in use is considered relevant here. While restrictive in being dedicated to a particular powered device 349, such a battery housing assembly 347 eliminates the external power conversion box 357 shown in FIG. 11.

FIG. 10 shows a laptop computer 349, with a dedicated battery pack 347 which contains an MCU 102C that is pre-programmed with the input voltage required to properly power laptop 349. In an alternative modality, the pre-programmed voltage information can be expressed as digital data, made available to an external power adapter 335 by means of powerline modulation. A modulator/demodulator 339 in battery 347, and its corresponding MD/DM 339A in power adapter 335, provide a simple, yet effective means of communicating data between the two devices. Given that FIG. 10 includes a battery 347 with a dedicated specific voltage, and that power adapter 335 can adjust its voltage output, powerline modulation can occur at a known voltage, which simplifies the operation of the modulators/demodulators 339 and 339A. Those skilled in the art can readily implement the powerline communications of this modality of the invention.

Integrating battery cells into a battery housing 347 in FIG. 10, along with one of the electronic assemblies described above, allows a powered device 349 to have a battery reserve. Should there be a disruption of input power along cord 341, a partial battery would serve as an effective emergency Uninterruptable Power Supply (UPS). A power switch 526C, a diode 185, or a power FET (or equivalents) is used to switch from external power to battery power (see FIG. 6E, and related text section "Diode UPS").

The use of smaller cell sizes, with lower capacity, provides reasonable power reserves, as battery back-up. Using smaller cell sizes does not necessarily translate to reduced battery capacity. For example, the 18 mm cells manufactured when Li-Ion was evolving as a battery technology in 1995–'96 have lower capacity ratings than today's 17 mm (or even 15 mm) cell sizes. Also, polymer cells show promise of equaling or exceeding older cylindrical cell capacities. Polymer cells are more space (volumetrically) efficient than cylindrical cells. Therefore, smaller and more energy-dense cell, and evolving polymer space-saving cell configurations, help to ensure that there be little trade off when integrating electronics into existing battery pack enclosures.

Input Power

Input power to power conversion box 400 in FIG. 13A can be either a fixed input voltage, or is a power source that can have a configurable output voltage, equivalent to that described in FIGS. 2 through 5A. If the input voltage to power box 400 is coming from a fixed voltage source, MCU 102A in FIG. 13A is wired with its own voltage regulator, so that MCU 102A is powered as soon as electrical input is available at lines 505 and 507.

If the input voltage is coming from a source of variable voltage that has its own control capabilities, such as assembly 100 in FIG. 2, power box 400 in FIG. 13A "signals" to its controllable input power source that it is functioning. A controllable power source 100 has been pre-configured with resistive values that are specific to a power box 400 (as detailed in the following "Software Operation" section. In sensing these resistive loads, and finding them to match expected pre-determined values, a controllable input power source 100 delivers voltages expected by power box 400 at the appropriate time. Thus, as seen in software flowchart 800 in FIGS. 1A-1–1A-9, a +5 VDC power signal is first delivered to power box 400, which powers its MCU 102A only. Once power box 400 has been configured by its user to the correct output voltage (as described above) LED 402 changes its state (e.g., turns ON). This indicates a change in the overall load sensed by controllable input power source 100, which then increases its power to a pre-determined value. This predetermined voltage value may be 12 VDC (for example, if power box 400 is to be used in an automobile), or the output voltage can configure to 15, or 28 VDC (as a non-limiting example of which is a power box 400 manufactured to operate at such voltages because its intended use is on an airplane where such input voltages are common).

An alternative power source is available from which MCU 102A in power box 400 (FIG. 13A) can be powered. Battery 508B can power MCU 102A when a user attaches connector 132 to couple battery 508B to power box 400. Note that, in the description of a unique connector 132 in FIGS. 6–6C, the connector must be inserted in the manner shown in FIG. 6B for power to be available. FIG. 6E, and its associated description in the section "Diode UPS", define a non-limiting means of configuring the circuit within a battery 508B with a diode, so that there is only one position for a connector 132. The connector modality in FIG. 6E resolves the issue of a dual-position connector 132, and provides a convenient means of powering MCU 102A.

Software Operation

Figures 1, 1A, 2, 3, 4, 5, 6, 7, 8, 9:
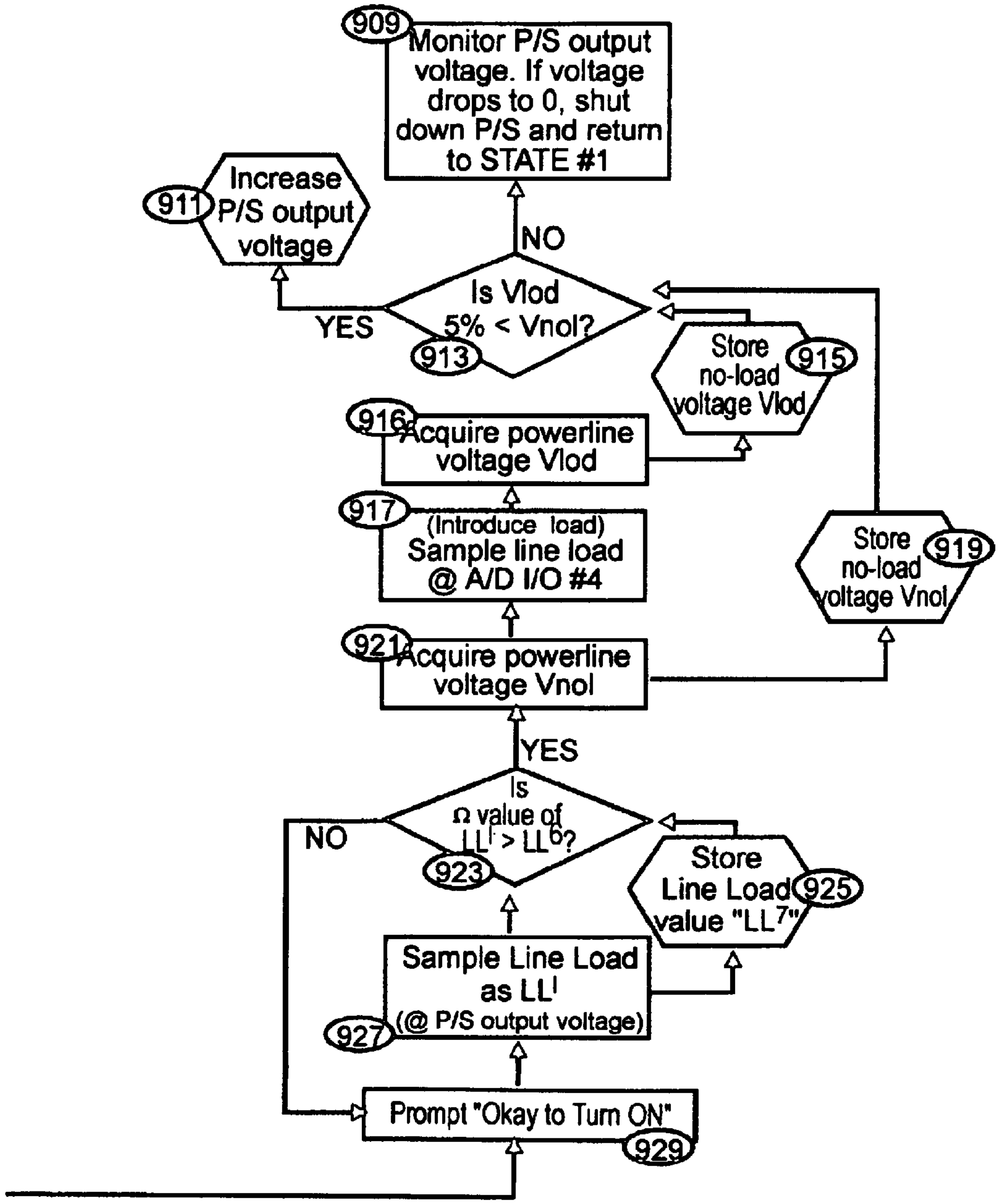

Software 800 in FIGS. 1A-1–1A9, in its first state (steps 801–805 ), determines the characteristics of its input power source. Software 800 assumes that there is power available as soon as its associated hardware (for example, power box 400 in FIGS. 1-1–1-43A) is connected to a power source. In the modality shown here, that power source outputs either 5 VDC (as detected in software voltage-comparator steps 802–803 ), 15 VDC (in voltage-comparator step 804), or 9–14 VDC (in voltage-comparator step 805).

If the detected input voltage is 5 VDC, software 800 is pre-programmed to execute all processes shown in FIGS. 1A-1–1A-9. A 5 VDC-detected input voltage is an indication to software 800 that it is connected to specific matching hardware. Such hardware as exemplified in assembly 100 FIG. 2, and its related software 101 in FIGS. 1-1–1-4, are configured to perform interactions with hardware equivalent to 400 in FIG. 13A and software 800. As a non-limiting example of which is that MCU 102A in FIG. 13A performs functions, such as turning on LED 402, that alter the overall detectable load of hardware 400. Software 101 is configuring its power converter 122A to output a low voltage (in this non-limiting example, +5 VDC) from its power converter 122A. Software 101, and related hardware 100 as exemplified in FIG. 2, is monitoring the load at input powerlines 114 and 166 (which are the same as powerlines 505 and 507 in FIG. 13A). When LED 402 in FIG. 13A turns on, software 101 detects that change in load (the value of which was predetermine at the time of manufacture of power box 400). Software 101 then changes its output voltage to 28 VDC. Software 800 in FIGS. 1A-1–1A-9, senses the change in input voltage from +5 VDC to 28 VDC, and switches on DC/DC power converter 122A in FIG. 13A, via control line(s) 510.

By this non-limiting example, it is seen that software 101 in FIGS. 1-1–1-4 performs rudimentary handshakes and acknowledgments with software 800 in FIGS. 1A-1–1A-9. Software 101 responds to load changes at powerlines 114 and 116. Software 800 in FIGS. 1A-1–1A-9 provides dearly defined resistive loads at appropriate times in its processes, which are indicators to software 101 of various states in hardware 400 in FIG. 13A.

To simplify this line load-based handshaking, input lines 505 and 507 (FIGS. 1-1–1-43A) are switch-isolated (516A) from DC/DC power converter 122A. Only MCU 102A is drawing power from the 5-volt input. This also means that any powerline activities downstream of converter 122A are not detectable by software 101 in FIGS. 1-1–1-4 along powerlines 114 and 116 in FIG. 2 (505 and 507 in FIG. 13A). Therefore, a resistor array 509 is pre-configured to induce three specific pre-determined load values detectable by software 101 at powerlines 114 and 116 (505 and 507). Basically, upstream hardware 100 in FIG. 2 (or equivalents) with its software 101, needs only to detect three pre-determined resistive load values. Load value #1 serves as a device ID, which tells hardware 100 (and its software 101) that a compatible device 400 is attached. This handshake function can also be performed by a simple resistor in connector 103 (FIG. 2) that attaches a power box 400 in FIG. 13A to a hardware assembly 100 in FIG. 2. The pin outs of connector assembly 103, which provides a means of detecting the presence of a power box 400.

A powerline load value #2, detectable by software 101 in FIGS. 1-1–1-4 is used to notify software 101 of the proper time to reconfigure the power output of its power supply 122 (in FIG. 2). The previous voltage of 5 VDC changes to 28 VDC (or any other pre-determined output voltage deemed appropriate).

A powerline load value #3, detectable by software 101 in FIGS. 1-1–1-4 is used to notify software 101 to shut down its power supply 122. This is for critical error states, such as hardware 400 in FIG. 13A experiencing over-voltage, over current, excessive thermal activity, or other abnormalities of operation. This shut-down capability is not defined specifically in software 800 in FIGS. 1A-1–1A-9, but anyone skilled in the art can readily include such safety checks and error-reporting states. In such a shut-down condition, software 101 defaults to its standby output voltage of 5 VDC. Also, power supply 122 will stay in its 5-volt state as long as a connector assembly 103 (FIG. 2) remains attached. If software 101, having reconfigured the output of its power supply 122 in FIG. 2 to the low-voltage (5-volt) standby mode, does not find powerline load values that matches expected values, software 101 executes a total shut down of power supply 122. Not all of these functions are detailed in software flowchart 101 in FIGS. 1-1–1-4, nor software flowchart 800 in FIGS. 1A-1–1A-9, but those skilled din the art can easily add such functions to the existing software, using existing shut-down processes described in various places throughout this document.

Intra-Device Communications

Power source 100 in FIG. 2 and power box 400 in FIG. 13A can communicate with more sophistication than the basic resistive-load schema defined above. With proper power factor correction (PFC) and powerline filtering, traditional powerline modulation can be performed over the low-voltage lines. Since such methodologies are well understood and familiar to anyone who is skilled in the art and who is familiar with X-10-style (X-10 USA Inc., Closter, N.J.), or Echelon (Palo Alto, Calif.) powerline communications, they are not detailed here.

Even using two resistors in resistor array 509 that can be switched in and out of powerline 505 and 507 in FIG. 13A, a rudimentary 1 and 0 binary "code" can be constructed. Because the voltage along the powerlines that connect power source 100 in FIG. 2 to power box 400 in FIG. 13A can include two voltages (5 VDC and 28 VDC, for example), the resistor "code" must have two value sets, one for each voltage. Also, since the output-line load downstream of power converter 122A in FIG. 13A can fluctuate considerably while powered device 508C is in operation, adequate power factor correction and line-load filtering between power source 100 and power box 400 is important.

See also the section "Software Operation" above, for information about powering an MCU from a battery power source, and the operation of a powerline modulation schema in hardware and software.

Vin differentiators

Vin-detection 803, 804, or 805 differentiates whether software 800 in FIGS. 1A-1–1A-9 is executing with its hardware 400 (FIG. 13A), or equivalent, connected to an automotive or commercial aircraft power source. Automotive output voltages to devices like those on which software 800 resides can range from 9–16 VDC. Commercial aviation voltages are 15 VDC (+/−1 volt), or 28 VDC. While 15 VDC is within the spectrum of automotive output voltages, rarely do automotive voltages run that high. Typically 13.5 VDC is the upper limit of real-world automotive voltages at the dashboard. Thus, by detecting and differentiating input-voltage parameters, software 800 can be configured to perform functions unique to its operational environment.

As a non-limiting example of which is that aviation functions can preclude charging the battery of a powered device. FIGS. 6A–E, 7, 8, and 9A–D show methods of disabling battery charging, while still delivering power to a host device. Software 800 relies on detecting a match for input voltage as an initial indicator of its operational environment. If input voltage parameters indicate an aviation voltage (15 VDC or 28 VDC), software 800 runs subroutines that are specific to unique hardware (connectors referenced FIGS. 6A–E, for example) that are only used on commercial aircraft. Thus, elemental input-voltage-sensing function in software steps 803–805 in FIGS. 1A-1–1A-9 provide differentiators that define intended operations within specific environments.

Output I/O Activity Detection

Before performing any activities related to the power output side of a hardware power box 400 in FIG. 13A, or an equivalent, step 807 in software 800 (FIGS. 1A-1–1A-9) locks out any inputs from manual voltage selector 337. All activity of LED 402 is latched up. This is precautionary, only. Because MCU 102, and not the actual rotating of manual voltage selector 337, controls power converter 122A, any user manipulation of voltage selector dial 504 cannot impact the operation of power converter 122A.

Software 800 in FIGS. 1A-1–1A-9 monitors other user activities, particularly those associated with output connector 508 in FIG. 13A. A user may have to attach a cord 115 and/or a connector (132 in FIG. 2) to connector 508, for example. In anticipation of this, software 800 monitors output powerline activity at MCU inputs 525 and 527, which comprises A/D I/O Port #1 (see software step 809, and elsewhere). If user has already attached a connector 132 (FIG. 2) to a battery pack 508B (FIG. 13A), battery voltage is available at MCU 102's A/D I/O Port #1. This is feasible, in that a user could have attached a connector 132, and connected that to a battery (see FIG. 6B). After having done so, only then would a user attach the power input lines 505 and 507 in FIG. 13A to a power source. Thus, MCU 102 would be powered only after the battery connection was made, so software 800 would be "blind" to previous battery- and connector-related user actions. Software 800 can be rewritten to accommodate this. The power from a battery 508B can turn on MCU 102A, using inputs 527 and 525. Thus, MCU 102A can be functional as soon as power from battery 508B is available on powerlines 523 and 524.

Software sequence 809–811 is a simple voltage check at A/D I/O Port #1. If no voltage is present, the user has not yet reached the stage of attaching power box 400's output cord 523 and 524 to a battery pack (see battery 355 in FIG. 11, for example).

Having detected, in steps 809–811, no voltage at A/D port #1, software 800 in FIGS. 1A-1–1A-9 executes sequence 812–822, which is powerline load detection. Conductor 519, with its load 521 strapped across to conductor 527, comprises what is identified as A/D I/O Port #3 in software flowchart 800 (FIGS. 1A-1–1A-9). This port is a dedicated current-sensing A/D I/O of MCU 102 A in FIG. 13A.

Look-Up Table

Software 800 in FIGS. 1A-1–1A-9 differentiates from among a series of eight separate and distinct load-related events. These are defined in line-load look-up table 990 in FIG. 20. States for a power cord, connector, and battery connection are defined. This list assumes that a power cord and connector are discrete assemblies, and that a user must attach a connector to the cord. Look-up table 990 also assumes that there is a cap on a connector (see item 530 in FIG. 6D). Two states $LL^4$ and $LL^5$ differentiate whether a battery pack is removed from, or is installed in, its associated powered device. Not all of these states need be present for software 800 to operate. These powerline load states are separately defined to show where, in the sequence of software processes described in software flowchart 800 (FIGS. 1A-1–1A-9), each is monitored.

Look-up table 990 (FIG. 20) links an Ohm-value to each configuration of connector, cord and battery pack. In software 800, each reference to "Look-up Table of Ω Values" (815, 831, 844, etc.) compares an acquired powerline load value to each of the pre-defined resistive values in look-up table 990. Thus, if the captured Ohm-value in software step 816 is 0.32 Ohms, then only $LL^1$ is valid. The null-value $LL^0$ is not considered in any of software 800's comparisons, because it indicates no user activity, and is therefore the absence of any other "LL" value.

All pre-defined Ohm values in look-up table 990 (FIG. 20), are defined in the manufacture of the power cord, connector (and its cover), and battery packs. Allowable manufacturing tolerance is indicated as 5%.

Voltage Check, Then Load

Software 800 in FIGS. 1A-1–1A-9 is structured so that a voltage check always precedes a load check at the output powerlines, for example output powerlines 523 and 524 in FIGS. 1-1–1-43A. There are two reasons for this two-step sequence. Both reasons are related to monitoring user activities, and knowing what a user is doing with an output power cord 508A, its connector 132, and especially a battery pack 508C. First, a user may have already performed an action that is further along in flowchart 800 than the present step in software 800. As a non-limiting example, if the Vin test in step 809–811 yields a correct reading, step 813 indicates a GOTO step 883 "Battery Connected." If a user connects to battery 508B prior to software step 809, software 800 has a way of checking for such out-of-sequence user activity.

Second, power converter 122A in FIG. 13A must be turned on to do a line load test during power-output functions. For example, software steps 812–822 represent a typical line load test sequence. Power converter 122A is turned on in step 812. If, at that moment, a user is inserting a connector 132 into a battery pack 508C in a manner that will allow battery voltage to flow (see FIG. 6C), there will be two contending voltages on powerlines 523 and 524 of power box 400 (FIG. 13A). If the battery's output voltage is higher than 3 VDC, power will flow into power converter 122A's output (this assumes that power switch 526 is closed). If a battery voltage is less than 3 VDC, power from converter 122A will flow into battery 508B. This situation can damage either power converter 122A, or battery pack 508C.

Diode protecting power converter 122A's output lines in FIG. 13A is prudent, and has been discussed in the section "Diode UPS" but, incorporating diodes in a battery pack may not be advisable. Diodes in the battery pack can distort the battery values (particularly voltages) being reported by a smart battery circuit. Optional powerline switch 526 can be used as a safety valve. This switch is only closed after confirmation that powerlines 523 and 524 are inactive. Software 800 handles this issue by always sampling output-line voltage at MCU 102A's input lines 525 and 527 (as exemplified in steps 809–811 ) before initiating a load-sampling sequence.

After sampling line load, as exemplified in sequence 812–822 in flowchart 800 (FIGS. 1A-1–1A-9), if no look-up table 990 confirmation of a resistance-value match is found, software 800 error loops back to another voltage sampling 809–811. In some software sequences, screen displays or other user indicators are employed to prompt a user to perform a desired action. A non-limiting example of this is step 834, where a screen display prompts a user to remove the cap from a male connector (reference FIG. 6D). Note that the error loop then reverts to a line-voltage check first (steps 823–824 ), before again sampling for a change in load (indicating that the cap 530 has been removed from connector 540 in FIG. 6D). Screen displays are discussed in the section "GUI Considerations."

Making the Batter Connection

Software 800 in FIGS. 1A-1–1A-9 performs a series of output-line voltage and powerline load samplings, starting at step 809 and continuing to step 876. During these steps, various user screen prompts (821, 834, 848, 863 and 876) can be indicated in order to direct a user to properly configure power cord 508A, and the correct Position #1 and Position #2 sequencing of connector 132 into battery pack 508B (reference FIGS. 6–6C, and FIG. 17).

Once a connector 132 and power cord 508A assembly has been properly configured (FIG. 13A), software 800 continues to perform output powerline voltage samplings, as indicated in steps 877–882. This Vin sampling sequence loops continuously, until a line voltage indicates that battery 508B is properly connected in its Position #1 to power box 400. Once connector 132 is properly mated to battery 508C, a polarity check is performed in flowchart 800's step 883A Acquiring Battery Data Software 800 in FIGS. 1A-1–1A-9 executes steps 884–892 to acquire a battery Vmax (Maximum Voltage) value. This is a no-load voltage reading of the cells inside the battery housing. MCU 102's A/D I/O Port #1 (conductors 525 and 527 in FIG. 13A) acquires this value in step 884.

In step 888, the Vmax value is compared to look-up table 799 (FIG. 15). Look-up table 799 is comprised of a database of individual cell voltages, with known combinations of cells in battery packs. All common cell chemistries are charted in look-up table 799.

Look-up table 799 (FIG. 15) is not critical to the proper operation of software 800. However, there can be battery pack conditions that are at the fringes of "normal" voltages. For example, a battery pack that is at a very low state of charge. A deeply discharged battery pack condition will not distort the Vmax (no load) value acquired in software 800's step 884. This deeply-discharged battery scenario is a good reason to avoid using resistors in output power cords, connectors, etc., since these will only apply unnecessary loads when acquiring a Vmax value. If the resistance is substantial, the voltage range between Vmax and Vmin will be unnecessarily depressed. Because the battery cells are not under load when the Vmax value is acquired, the battery pack will most likely read close to its nominal manufacturer's "design" voltage. All battery chemistries exhibit a transient voltage "recovery" characteristic when at rest. This is often experienced with a flashlight that will no longer light. After the flashlight rests for a period of time, the bulb will momentarily respond.

Cell voltage look-up table 799 (FIG. 15), referenced in software steps 888 and 899, will aid in identifying deeply discharged battery packs. The Vmin (under load), and Vmax (no load) values will be distorted when compared to the expected voltage readings for a battery pack that has been charged. Note that batteries that are freshly charged will swing to the opposite end of the voltage-reading spectrum, with high Vmax (no load) values. In that respect, freshly charged battery packs are considered as "abnormal" as deeply discharged ones, when interpreting look-up table 799.

Vmin

Software 800 in FIGS. 1A-1–1A-9 acquires a Vmin voltage value in steps 893–903. A load 517 is introduced in the powerline at MCU 102A's conductors 522A and 527 as A/D Power Port #4 (FIG. 13A). This load should be of sufficient impedance to depress the battery pack 508B's output voltage. If the battery packs to be addressed by the invention are for laptops, as a non-limiting example, the load should be at least 750 mA (based on a typical laptop drawing 1.2–1.5 Amps from a battery pack). If the load is too small, there may not be enough difference between the Vmax (no load) and Vmin (load) voltage values. High resistive loads also pull down a battery's voltage more quickly.

A Vmax (no load) voltage value is stored in memory 518A as Vref$^2$ (step 892), and a Vmin (under load) voltage value is stored as Vref$^1$ (step 903 ). If look-up table 799 (FIG. 15) of single battery cell voltages v. cells-per-pack is properly structured, the two acquired voltage values Vmax and Vmin can determine the optimum output voltage for power converter 122 A in FIG. 13A. Step 907 in software 800 determines an accuracy for values Vref$^2$ and Vref$^1$ with a tolerance of less than 5%, when compared to look-up table 799. This error-factoring rules out look-up table 799's potential errors, such as in a situation that could occur if both Vmin and Vmax were statistically improbable (i.e., values don't fall within a set of known voltage values), or voltages that are otherwise flawed as reliable baseline values.

In steps 913–914 of software 800 (FIGS. 1A-1–1A-9), Vref$^2$ and Vref$^1$ are listed and sorted in ascending order. If all acquired voltages are from a stable battery pack, i.e., one that isn't freshly charged (or precipitously near total discharge), the sequence of voltages will be:

Vref$^1$

Vmin

Vmax

Vref$^2$

This ordering indicates that look-up table 799's (FIG. 15) values confirmed that there was a correct configuration of cells in a battery pack that, by their design cell voltages, indicated that the actual load and no-load voltages acquired (Vmin and Vmax respectively) are within normal parameters.

If the results of the LIST and SORT processes in steps 913 and 914 differs from that shown above, an error state is reported in step 915 of software 800 (FIGS. 1A-1–1A-9). If the outcome of step 914's LIST and SORT is a valid voltage progression, from lowest to highest, then MCU 102A (FIG. 13A) uses Vmin as a first output voltage at which to configure the Vout of a power converter 122A.

Vmin and Vmin

The output voltage of a battery pack, under load, is expressed as Vmin. Some battery references may identify Vmin as a battery's Constant Current Voltage (CCV). The input voltage to a battery's powered device can also be expressed as Vmin, or the minimum operating voltage of the device. Understanding the relationship of a battery's Vmin to its associated powered device's Vmin will shed some light on what relevance software 800's voltage acquisition has to successfully delivering an optimized voltage to a powered device.

For the sake of clarity, battery output voltage Vmin will be labeled, for purposes of this discussion, "BattVmin," while a powered device's minimum operating voltage will be labeled "PDVmin." BattVmin is closely related to PDVmin, because PDVmin determines how deeply a powered device's battery pack will be allowed to discharge (expressed here as a function of voltage, and not a "fuel gauge" reading of battery capacity). A powered device's minimum operating voltage, ideally, would only be slightly above its battery pack's lowest possible discharge voltage.

The lowest possible discharge voltage of a battery is determined by a "point of no return" in voltage, below which the battery will face potential internal cell damage. For example, a Ni-Cad cell, rated at a manufacturer's design voltage of 1.25 volts, would be damaged if that cell's voltage dropped below 1.0 volts. At such a low voltage, the risk of permanent cell reversal is significant. "Cell reversal" means that the cell suffers internal damage which renders the cell incapable of being filly recharged. Thus, for the safety of the battery pack, cell voltages would never be allowed to drop below 1.0 volts. For a 10-cell pack that is rated at 15-volts, as an example, the lowest BattVmin would be 10.0 volts.

Since manufacturers of powered devices always want to optimize the run time of the batterypowered product before its battery needs to be recharged, the device's minimum operating voltage PDVmin would likely be very close to its battery's BattVmin, e.g., 10.0 volts in this example. In reality, the device's lowest operational voltage would probably be below 10.0 volts, to allow for the transient sag in the battery's output voltage that occurs when the device turns on (sudden load). Although device manufacturers are often tempted to run the battery voltage down to absolute minimums, a reserve of 10% or more is a often allowed. In the case of a laptop computer, for example, this 10% is necessary to allow sufficient battery power for a user to exit all applications and shut down the computer, before the battery reaches its BattVmin voltage. Thus, a 15-volt battery pack, capable of being discharged to 10.0 volts, would have a theoretical artificial PDVmin shut-down voltage (allowing a 10% reserve) of 10.1-volts.

Thus, we have the following voltages, in descending order:

Battery pack design voltage=15.0 volts

Device's pre-set battery shut down voltage (BattVmin)=10.1 volts

Battery pack minimum safe recovery voltage=10.0 volts

Device's minimum operational voltage (PDVmin)=<10.0 volts

It can be surmised that the under-load voltage Vmin acquired in step 896 of software 800 (FIGS. 1A-1–1A-9) will be above its powered device's pre-set battery shut down voltage of 10.1 volts. Since the powered device's minimum operating voltage (PDVmin) is less than 10.0 volts, any voltage above that might properly operate the device. The conditional "might properly operate the device" is relevant, because any input voltage to the device below the pre-set shut down voltage of 10.1 volts would trigger a shut down! But, for purposes of software 800's optimizing the input voltage to a powered device, as long as the output voltage of power converter 122 in FIG. 13A is no less than 10.1 volts, the powered device the converter is powering will operate satisfactorily. At these extremes of the voltage spectrum, a powered device may produce "low battery" warnings.

In reality, the optimum voltage delivered to such a powered device in the example should be above 11.00 volts. Software 800 operates with a load that is conservative, when acquiring BattVmin (i.e., Vmin). Since the 750–900 mA load applied when acquiring Vmin is typically only 50–60% of the operational load of the powered device, BattVmin is slightly higher that it would be if a full 1.5 Amp load were applied (assuming that the battery has already been partially discharged). In light of this, the acquired voltage value Vmin should be used only as a first output voltage to a host device. Although not probable, Vmin may not provide sufficient voltage to properly power the powered device. Since Vmin is below Vmax (see step 907), it is certainly a safe first voltage to apply. The description and figures related to software 101 (FIGS. 1-1–1-4) further discuss output-voltage-compensation strategies.

Vmax

Vmax, as a valid voltage value on which to base the output of power converter 122 in FIG. 13A can be used as a safe operational voltage for some battery-powered devices. Vmax is a no-load voltage value. As such, it can be substantially higher than the battery's manufactured design voltage. For example, a Ni-Cad battery pack having a design voltage of 12.00 volts can yield a no-load Vmax value of 14.6 volts, especially if the battery has just been charged. Most powered devices allow for a reasonably generous over-voltage, because batteries exhibit a transient "pulse" voltage when first turned on that delivers a substantial upward voltage spike.

Batteries react to load differently than continuous-power converters. Power converter 122A in FIG. 13A is designed to not exhibit significant voltage drops under load. Pronounced output voltage drops can create problems when Vmin- or Vref[1]-level voltages are delivered. Under a substantial load, a voltage drop from a calculated Vref[1] could plummet below PDVmin, causing the powered device to shut down.

Having stated that, observations of actual power delivery from an external power converter indicate that output voltages at battery design voltages can trigger unexpected results. In particular, some powered devices will respond to voltage sags from a battery design voltage by displaying user warnings that the battery requires charging. This behavior will also result if the selected voltage is delivered by a power converter that does not also deliver sufficient amperage at the selected voltage. Stable voltage outputs under a variety of loads, and adequate amp-ratings will resolve many of these secondary issues when delivering power through a powered device's battery port.

Alternative Optimum-Voltage Calculation

Software 800 in FIGS. 1A-1–1A-9 provides an alternative method of determining an optimize output voltage for a converter 122A in FIG. 13A. Steps 909–912 indicate an output-voltage calculation that is both simple, and reliable. Acquired Vmin, from steps 893–897, and acquired Vmax, from steps 884–885, are added together, and the result is divided by two (step 911). The resulting voltage value is stored in memory in step 912 as Vavr (Voltage Average). While this less complicated process for determining an output voltage may seem too simplistic, it's accuracy is only tainted by battery packs that are deeply discharged. Deeply discharged batteries exhibit very limited spreads between Vmin and Vmax, and the resulting Vavr voltage can be too low for the powered device to sustain operations, especially if a power converter 122A exhibits voltage sags under load. By and large, the calculation method employed in step 911 is very acceptable, and this simple method is also used by software 101 (FIGS. 1-1–1-4).

Determining "Best" Vout Value

Software 800 in FIGS. 1A-1–1A-9 defines steps 940–946 as determining the "best" power converter output voltage (Vout) value. Two voltage-optimization methods are indicated, as in the discussions of steps 911 and 918 in the section below "Is It ON?". Since the powered device has not yet To this point in software 800) been tested with either the method of step 911 , or step 918's method, it would seem that selecting the "best" voltage method is impossible. Essentially, that is true. However, both voltage-optimization methods discussed here have a commonality, and even some similarities. The commonality is that, barring any rejections because of acquisition or calculation errors during each process, both methods will yield output voltage values that are between a powered device's PDVmin (shut down) and a battery's no-load Vmax (peak voltage).

The similarity of the two voltage-determination methods is that the resulting voltage from one method is usually quite close to the result of the other. Vmin and Vavr tend to be voltage values within 10% of each other. This is true only if a battery is neither freshly charged, nor deeply discharged. The more complex method involving look-up tables (see software steps 884–908 in software flowchart 800 in FIGS. 1A-1–1A-9) will quickly detect these extreme cases, while the simple calculation method expressed in step 911 won't.

To more efficiently determine which of the two methods is the most probably reflective of the true charge/discharge state of a battery pack, software solutions such as fizzy logic, expert-rules-based logic, or adaptive neural networks will reveal probabilities of success. However, such complex approaches, while acknowledged as potentially beneficial, would tax the processing and memory power of an MCU 102A (FIG. 13A). Such complex software is also not justifiable, because the number of probable failures to power a device using the two defined methods in software 800 are statistically near zero. The various look-up tables use din software 800 (FIGS. 1A-1–1A-9) and 101 (FIGS. 1-1–1-4) provide a basis for exploring artificial intelligence. Also, many of the "rules" expressed tacitly and implicitly through the decision tress, calculations, and error loops of software 800 and 101 point to a rules-based expert system. Those skilled in the art of artificial intelligence software will be able to integrate fuzzy logic, adaptive neural networks, and similar disciplines into software 800 (or 101).

It must be kept in mind that battery-powered devices exhibit a wide range of tolerated input voltages between Vmin and Vmax. Only fringe situations, more related to those battery packs that are deeply discharged than those that are freshly charged, may precipitate power delivery errors. If properly constructed and used, the look-up tables associated with steps 888 and 899 in software 800 will almost totally eliminate problems associated with deeply discharged batteries. These mostly-depleted batteries will be quickly identified by Vmin and Vmax voltages that fall outside values in look-up table 799 (FIG. 15).

Use of Impedance

Battery cell impedance can be a valid indicator of cell type. All cells increase impedance as a function of discharge. As such, decreases in voltage have some relationship with changes in battery discharge levels. So too, do impedance changes reflect battery discharge states. These changes in voltage and impedance aren't very pronounced in Ni-Cad and NiMH cell chemistries, but Li-Ion cells do show clearly defined impedance changes that track with decreases in voltage. Impedance checks can be integrated into software 101 or 800 (FIGS. 1-1–1-4 and FIGS. 1A-1–1A-9, respectively), if further granularity in identifying a battery pack's discharge state is required. Such added complexity is usually unwarranted, since it will only come into play when the Vmin and Vmax readings are from a deeply discharged battery pack. Even then, battery's and powered device's power circuits are designed to allow a sufficient battery reserve that Vmin and Vmax will still be reliable indicators. Do not use impedance testing if diode 185 in FIG. 6E is implemented, or if the smart circuit is wired into the powerlines, as shown in FIGS. 9A and B.

Manually Selecting Output Voltages

Step 942 in software flowchart 800 (FIGS. 1A-1–1A-9) activates manual voltage selector 337's I/O line 506 in FIG. 13A. A user, by rotating selector dial 504, can match MCU 102A's "Best" output voltage value (step 946).

In the alternative, MCU 102A can compare a user's voltage selection to software 800's "best" voltage selection, and confirm if they are a match. The perspective as to how the computed best voltage value and a user's selected output voltage value interact is left to the discretion of a product designer. This model of considering a user-selected voltage as the constant to which a best output voltage is compared applies to hardware applications like those in FIGS. 10 and 11. If a power adapter 335 is of a fixed output voltage, a software-800-enabled module 357 gives a user feedback as to whether the fixed-voltage power adapter 335 is an adequate match to voltage requirements of a powered device 349.

MCU 102 A retrieves from memory stored voltage values in steps 940 and 944. How the "best" voltage is determined is discussed above in "Determining 'Best' Vout Value." Once the best Vout value is determined, that value is compared to a pre-configured look-up table of possible selector voltage values (step 950). This look-up table (not shown) consists of each voltage value on the face of selector 337, with an assigned computer-readable value (binary, hex, "byte-word," etc.). Software 800 converts the "best" Vout value to the same language (binary, hex, byte-word, etc.), then looks for an exact match in this look-up table.

Software 800 in FIGS. 1A-1–1A-9, having compared (in step 952) it's "best" output voltage value to the voltage values available on selector 337's dial face (FIG. 13A), determines whether or not an available selector-dial value will exactly match the computer-generated "best" Vout in step 954. If the answer is NO, step 960 looks for a reasonable match, i.e., one that is within +/−5% of the desired value. If this statement fails, a critical error is generated (step 962), which loops software back to steps 885–918 (this loop is not graphically shown in flowchart 800). In looping back to the voltage calculation processes, no new data acquisition is performed. Instead, previously-acquired voltage values are retrieved from memory and recalculated. Steps that involve user activities are also eliminated in this voltage-value recalculation loop. If the voltage recalculation (steps 885–918) fail a second time, software 800 would shut down power converter 122A (FIG. 13A). The user then would be prompted to restart the entire process.

If a selector dial 337 voltage value is not an exact match to computer-generated best Vout (steps 952, 954 ), but is within software step 960's +/−5% allowable error factor, software 800 is conservative and accepts a "near-best" selector-dial voltage as the target (step 968 labels this voltage value as VLout). Voltage target VLout is stored in memory in step 964, for later access. If there was an exact match available as a result of comparator step 954, it is labeled as Vbst in step 958, and stored for future reference (step 956).

Following the operation of software 101 (FIGS. 1-1–1-4), a software sequence can be implemented into software 800 whereby MCU 102A's "best" output voltage value (step 946) overrides any considerations of a user's incorrect manual voltage selections. Thus, if the user fails to manipulate voltage selector 504 (FIG. 13A), or continues to select incorrect voltages, software 800 defaults to applying MCU 102A's "best" voltage value instead. The techniques for such software are to be found in the sections which discuss software 101, and which are illustrated in FIGS. 1-1–1-4.

LED-Assisted Voltage Selector Operation

Previously described selector voltage value look-up table in the "Manually Selecting Output Voltages" section above contains the voltage values displayed on the face of selector 337 (FIG. 13A) arranged in ascending order. The programming code considers the "voltage-to-be-matched" as a target, and each incremental voltage value above or below it is considered x-points away from the target voltage. Thus, as a non-limiting example, if the design of the hardware is to have a user rotate selector dial 504 until its pointer matches MCU 102's "best" voltage value, software 800 assists the user by indicating whether the user is turning selector dial 504's pointer closer-to, or farther-from the target voltage. For example, if the target voltage is 12-volts, and the pointer on selector dial 504 is at 18-volts when a user starts the voltage-match process, should the user move the dial pointer from its present position at 18 to a new position at 19, software 800 would detect the look-up table's point count moving in the wrong direction, i.e., moving away from the target voltage, instead of toward *toward* it.

In the non-limiting example used throughout this section, voltage-match confirmation is indicated to a user via LED 402 in FIG. 13A. LED 402 features variable-rate blinking. As user moves selector dial 504 further away from the target voltage, software 800 uses point-count values associated with all voltages above and below the target voltage to control the blink rate of LED 402. Slower LED blink rates are associated with voltage values farthest from the target voltage. Faster rates occur at numbers nearer to the target voltage value. The fastest LED blink rate occurs at the voltage values directly adjacent (on either side) to the target. Thus, the LED blink rate assists a user's manipulation of selector dial 504 by blinking more slowly as pointer 504 is rotated away from the target voltage. More rapid blinking occurs as selector dial 504 is rotated in a direction toward the target voltage. Final visual confirmation of a valid voltage match is a non-blinking, solid ON state of LED 402.

When software 800 in FIGS. 1A-1–1A-9 is ready to accept a user-selected voltage in step 966, there is either an exact-matching (or almost-exact-matching) voltage value that serves as a target. Step 970 indicates that either Vbst (an exact voltage match), or VLout (an almost-exact voltage match) is available as a target. Since the criteria for a valid VLout "almost-exact" voltage is that it must be within 5% of an exact match (see step 960), the use of VLout is not necessarily a less-effective target voltage. As a hypothetical example, if the Vbst voltage (exact match) happened to be 16 volts, a corresponding VLout (almost-exact) voltage target can be as high as 16.9 volts. The nearest selector 337 value is 17 volts, so 17 volts would be the valid target. Note that, even though 15.1 volts would mathematically be as "almost-exact" a valid target as 16.9 volts, such split-decisions that precisely straddle a Vbst value always defer to the higher voltage value. The higher voltage is preferred because a 5% error factor is magnified at the higher voltages. A 5% error at 3 volts is only 0.15 volt, while 5% of 24 volts is a full 1.2 volts. Another way of looking at the 5% error-factor is that it would depress all battery design voltages by a full 5% if the lower voltage value approach was used. Essentially, a battery pack rated at 15 VDC by the manufacturer would be treated as a derated 14.25 VDC pack, just because of the allowable voltage selector error.

Software 800 in FIGS. 1A-1–1A-9 can also employ an alternative Boolean statement to determine the relative blink rate of an LED 402 (FIG. 13A). Instead of a point count that controls the blink rate of the LED, software steps 970–994 describe an LED blink-rate control that compares two acquired voltages. One of the two acquired voltages will always be closer to the target voltage than the other. Instead of using absolute comparisons of each acquired voltage to the target voltage value as described above, software 800's Boolean statement determines the relative relationship of the last two previous voltages acquired. For example, assuming that the target voltage is 15 volts, if the first acquired voltage from selector 337 (step 970, then stored as a value VS1 in step 974) is 9 volts, and the second acquired voltage from selector 337 (step 976, then stored as VS2 in step 978) is 7.2 volts, a simple mathematical comparison of VS1 to VS2 is performed:

$$Vbst\text{ (actual target voltage)}-VS1=\text{“}X\text{”}$$

$$Vbst\text{ (actual target voltage)}-VS2=\text{“}Y\text{”}$$

or

15−9=6 (*X*)

15−7.2=7.8 (*Y*)

Then, "X" and "Y" are compared, to determine if the first acquired voltage is larger or smaller than the second acquired voltage:

Is "Y">"X"?

or

Is 7.8>6?

If the answer is TRUE (YES), then the voltage selector is being rotated away from the target voltage. If TRUE is reported, the LED blinks slower than the last reported answer.

If the answer is FALSE (NO), then the voltage selector is being rotated toward the target voltage. if FALSE is reported, the LED blinks faster than the last reported answer.

NOTE: any voltage values higher than the target voltage will yield negative numbers when deducted from the target, i.e.:

*Vbst* (actual target voltage)−*VS*1="*X*"

*Vbst* (actual target voltage)−*VS*2="*Y*"

or

15−18=(−3)

15−19=(−4)

Negative numbers are considered as their positive counterparts. Thus, a value of "−3" is treated as "3," and "4" is read as "4." This eliminates the need to know whether the selector dial is at values above or below the target value, since the Boolean statement Is "Y">"X"?

would have to be inverted for values above the target voltage. Discarding the "−" sign avoids this complexity in a straightforward manner.

Since the blink rate is relative only to a last-reported result, and not relative to the target voltage value, the first blink rate is determined arbitrarily. Thus, if selector dial arrow pointer is only two dial-indicators away from the target, the first blink rate is "medium-slow," and the next blink rate (the selector arrow is now only one value away from a match) is a "medium" blink rate. If the selector matches the target on the next dial movement, the LED goes to full-ON. The user is only concerned with achieving a selector rotation direction that is an improvement, so the relative speed of the LED blink is important.

Connector Unplugged

Software 800 in FIGS. 1A-1–1A-9 uses a line-voltage test (steps 922–926 ), followed by a line-load test (steps 928–938 ), to determine that a connector 132 (FIGS. 13A, and 6) has been removed from battery 508C. Once output voltages have been calculated, the user activity of removing a male connector 132 from battery pack 508B (FIG. 13A) is important. In its Position #1, connector 132 creates a circuit that could cause power from a power converter 122A to flow into the cells in battery 508B. This is not desirable. Software 800 relies on its model of always repeatedly sampling powerline voltage to determine if battery 508B is in the power circuit. Once the battery voltage on the powerlines is no longer detected, in steps 922 and 924, software 800 has successfully confirmed that connector 132 has been removed from battery pack 508B. Also, as described in software 101 (FIGS. 1-1–1-4), power converter 122 A always operates at a minimal output voltage (1.5–3 VDC) through all software sequences before step 983, when a full operational voltage is applied to the powerlines.

The next connector 132 insertion will look like that shown in FIG. 6C (reference Position #2 in FIG. 17). Battery 182 has been electromechanically bypassed, and the newly created circuit will deliver power directly to battery 508B's associated power device 508C. Because power will be flowing from power converter 122A in FIG. 13A connector 132, a reinsertion of connector 132 oriented again as it was previously in FIG. 6B (position #1) will cause power to flow into battery cells 182. This is undesirable.

Given this situation, hardware design can add a layer of safety, in terms of supporting software 800 to ensure that a connector 132 is removed and no longer in Position #1. FIGS. 13 and 13-1 shows voltage selector 337 being manipulated with a male connector 404 (connector plug 404 is best illustrated as connector 540 in FIG. 6D). Blade tip 548 in FIG. 6D fits a slotted selector dial 504 in FIGS. 13 and 13-1. A user needs a male connector 404 in order to operate voltage selector dial 504. Therefore, software 800 can rely on the fact that, if activity at voltage selector dial 504 is detected (as it would be along conductor 506 in FIG. 13A), a male connector 404 (FIGS. 13 and 13-1) is not connected to a battery pack at that moment.

This user activity of using the tip of the male connector as a tool to rotate the manual voltage selector can be verified by repeating software 800's steps 922–938 (FIGS. 1A-1–1A-9). Software steps 922 and 926 will verify that no voltage from a battery is flowing on the output power lines. Software 10 steps 928–938 (line load test) will further indicate that male connector 404 in FIG. 13 is either attached to a power cord (assuming that the male connector is removable), or that it has been removed. In look-up table 990 (FIG. 20) Ohm-value $LL^1$ indicates that a connector 404 has been removed from the cord, while Ohm-value $LL^3$ shows that a cord and connector 404 are mated.

If the shaft below selector dial face 504 in FIGS. 13 and 13-1 is slotted 337A to a depth that allows the entire blade of male connector 404 (reference detail in FIG. 6D) to be inserted, a resistor 337B can be integrated into the slot. The metal tip 548 of male connector 404 comes into electrical contact with resistor 337B, creating a circuit. Software 800 then detects the actual presence of the male connector's blade in the dial slot, via a line between resistor 337B and MCU 102A's A/D converter. This would require an entry in look-up table 990 (FIG. 20) expressed as $LL^8$. This Identifier would express an Ohm-value that equates to the cumulative load of a power cord, connector 404, and the newly added resistor 337B. This approach is similar to the use of a resistor-equipped cover cap 530 for connector 540 in FIG. 6D, which is referenced as if it were here in its entirety. Newly-created resistor value $LL^8$ should not be the same Ohm value as that used in cap 540, to avoid confusing $LL^8$ with $LL^2$. This methodology is only valid if connector 540 cannot be removed from its cord.

By using a male connector 404 in FIGS. 13 and 13-1to rotate selector dial 504, software 800 can account for the whereabouts of the male connector, especially that male connector 404 is not inserted in a battery pack. User selection of an output voltage by rotating selector dial 504 creates a time period during which software 800 does not have to address a user's possible incorrect reinsertion of male connector 404 into a battery pack. By continued sampling of line voltages and line load (steps 922–938), software 800 tracks user activities with a male connector 404 with better accuracy, but it is described in the text and figures for software 101 in the Description, and is referenced here as if were here in its entirety.

Avoiding "Blind" Power Application

The section "Connector Unplugged" above defines a method of tracking a male connector 404 (FIGS. 13 and 13-1), once it is removed from a battery pack (see software 800's steps 920–938 in FIGS. 1A-1–1A-9). However, there is still a period of time during which a user is expected to reinsert male connector 404 into a battery pack. Male connector 404 must be inserted in its Position #2 (reference FIG. 6C), and not in its previous Position #1 (see FIG. 6B). If a user reinserts connector 404 in Position #1, an application of power from power converter 122 in FIG. 13A onto powerlines 523 and 524 will find the battery voltage also present on that line. Such contention on the powerline is to be avoided, since it can compromise either battery cells 182 (FIG. 6B), or power converter 122A Software 800 is limited to detecting line voltages, since sampling line load requires outputting a low-voltage power signal from power converter 122 onto powerlines 523 and 524 (FIG. 13A). Sampling line voltage only will not yield sufficient data at MCU 102 A to allow software 800 to differentiate between a removed male connector 132, and a male connector 132 that is properly inserted in its Position #2 (see FIG. 6C). If the battery voltage is higher than this low-voltage power signal, the dominant battery voltage will flow into the active power converter 122.

This dilemma can be resolved in several ways with slight changes in hardware. A straightforward approach is to diode-protect power converter 122. Strapping a diode between the positive output powerline at TB1 (in FIGS. 4-1 and 4-2) and pin 20 (ground) on connector header J1 will avoid battery power driving into a power converter 122 (FIG. 13A).

Female connector and wiring in assembly 212A (FIG. 6E) can be protected with diode 185 on spring-loaded connectors 176 and 178.

A user who has invested the effort to construct a connector and cord combination, removed a connector cap (FIG. 6D), inserted that connector in its Position #1 (reference FIG. 6B), then removed the connector and used it to adjust manual voltage selector 504 (FIGS. 13 and 13-1), exhibits behavior that has a high probability of continuing the process by completing the remaining last action inserting the connector into the battery pack. Common sense suggests that, since a user is performing these actions in order to use a powered device, that the sequence of actions will be completed.

Given all of the above, software 800 can safely proceed to step 985 and turn on power converter's output voltage with little concern for encountering a connector that is not connected to its associated battery pack. A male connector 132 can only be in three states:

1). Male connector 132 is not attached to anything (FIG. 6), or

2). Male connector 132 is attached to a battery pack in incorrect Position #1 (FIG. 6B), or 3). Male connector 132 is attached to a battery pack in correct Position #3 (FIG. 6C).

If power is delivered from power converter 122A in FIG. 13A to a male connector 132 in states #1 or #3 above, no consequences are incurred. Since software 800 continues to perform line voltage and line load tests (steps 961–945 ) as soon as low-voltage output power is turned on, confirmation of states #1 or #3 will be immediate.

If male connector 132's possible state #2 occurs, the continuous line voltage samplings (steps 987–985 ) performed by software 800 immediately detects the voltage from a battery. Thus, the window of time in which a user error inserting a male connector incorrectly can happen only in the milliseconds it takes to loop back to a repeat of a line voltage sampling sequence 987–985. In conclusion, any real-world concern about delivering power to an incorrectly inserted male connector is statistically insignificant. If there is a concern, adequate hardware modifications within a battery pack, as described above, can be made to totally eliminate any possible ambiguous situations.

"No Activity" State

Since MCU 102A (FIG. 13A), is capable of determining an optimized output voltage for power converter 122A, user activity at selector dial 504 is not essential to the operation of software 800 and its related hardware. Therefore, a lack of response from a user in software steps 942–998 should not prevent software 800 (FIGS. 1A-1–1A-9) and its hardware from executing the remaining sequences required to deliver output power. A reasonable amount of time should be allocated during which software 800 will expect user voltage-selector 504 activity. Since MCU 102A does provide a clock generator (152 in FIG. 3A), a timing function can be used to establish a window of anticipated selector dial 504 activity. This function is not detailed in software flowchart 800, but one skilled in the art can implement this additional timing sequence.

Software 800 does have certain indicators that point toward a user having omitted the voltage selector sequence 942–998. The primary indicator is the location and position of a male connector 132 in FIG. 13A (reference FIGS. 6–6C). As previously noted, connector 132 can only be in one of three states: still inserted (see FIG. 6B), removed (see FIG. 6), or reinserted in its next position (see FIG. 6C). The processes of determining these connector states has already been addressed, by sampling line voltage and line load (see chart 1001 in FIG. 17, and the related description for software 101).

Once the removal of connector is detected in software 800 (steps 922–938), the next activity is that of a user rotating voltage selector dial 337 (FIG. 13A), in preparation for reinserting connector 132 into battery 508B. A time delay allocated for this anticipated next user activity is important. Assuming that there is no method available for prompting a user to reinsert connector 132 (step 936), software 800 has no choice but to wait. The section "Disconnected Selector 'Key'" above addresses various monitoring steps performed by software 800, to determine when connector 132 is removed and reinserted.

NOTE: Power box 400 (FIG. 13A), does have one user prompting device. LED 402 can be an effective attention-getter. Blinking the LED at different rates (or having it change colors) helps to focus a user on the next required connector action.

NOTE: The sequential reference numbering in software flowchart 800 stops advancing at step 998, then continues with declining numbers at step 995.

Final Vin and Line Load Samplings

Steps 987 and 985 in software flowchart 800 (FIGS. 1A-1–1A-9) represent the last voltage check prior to activating power converter 122A (FIG. 13A). This Vin sampling loop, like all others in software 800, continuously repeats, and is always followed immediately by a line-load test (steps

983–973). Vin test 987–985 is looking for a no-line-voltage status, prior to executing line-load test 983–973. If Vin test 987–985 reports back a state of voltage on the powerlines, male connector 132 has been incorrectly inserted into battery pack 508B (as indicated in FIG. 6B). The resulting error state causes software 800 to loop back to step 989.

A final load test in steps 983–973 prior to activating power converter 122A (FIG. 13A) is identifying a resistive load value on the powerlines that validates male connector 132's proper insertion into battery pack 508B (reference FIG. 6C). The load-value for this state is not fully known. It cannot be, because software 800 and its associated hardware have no determination capabilities of whether it has interacted with this specific powered device 508C. Each device—including its associated battery—to which the system described herein will be connected is considered by the software to be a previously unknown battery-powered device. Every powered device will exhibit different load values, resulting from the impedance of circuits inside the powered device 508C (downstream of battery pack 508B).

However, software 800's look-up table 990 (FIG. 20) can know its pre-determined load value $LL^4$. The load values of all hardware elements (power cord, male connector, and battery pack wiring) are known, because they are manufactured to exhibit specific identifiable resistive loads. $LL^4$ is an Ohm-value expression of the mathematical sum of the three elements: power cord, connector, and battery pack. If internal battery pack wiring circuits in FIGS. 9A–9D are manufactured to return a fixed impedance value, then $LL^4$ in FIG. 20 is predetermined. Since $LL^4$ has a known resistance (Ohm) value, any load detected in software 800 steps 983–973 that is greater than (>) $LL^4$ is considered to be the additional load added by a powered device's internal circuitry. This circuitry in a powered device exists between the device's battery contacts and the ON/OFF switch, and it typically will include a charging circuit, and possibly elements like a battery selector and keyboard controller. Thus, $LL^5$ in look-up table 990 is defined as any load that is greater than $LL^4$, but only if the resistive value of the battery pack's internal wiring is known.

As will be seen, capturing and logging the value that becomes $LL^5$ is necessary, because it is needed later in software steps 951–945, and sequence 927–923.

"OFF" Selector Mode

Steps 996–997 in software 800 (FIGS. 1A-1–1A-9) define the resolution of user manipulation of voltage selector dial 337 (FIG. 13A), with step 996 being the command from MCU 102A to turn LED 402 full ON (no blink), indicating to the user a successful voltage match. Software 800 then shuts down Selector I/O line 506 in step 997. Once selector I/O 506 is shut down, no activity at selector dial 504 is acknowledged by MCU 102A, or its associated software 800. The safety aspects of this are obvious. This is a useful feature if a power adapter 400 is used on an airplane, or other confined area where power problems can pose serious safety risks.

There is, however, one exception to this total disengagement of selector dial 337 (FIG. 13A). The "OFF" selector dial position has a separate line 511 to MCU 102A. The OFF selector setting is effectively a user "panic button." A user can totally shut down power box 400 by turning selector pointer 504 to the OFF position. The detents on either side of the OFF position are more aggressive than the others on dial 337, so a user must make a concerted effort to put pointer 504 into the OFF position. The area of the faceplate at the OFF label is painted red to indicate the special significance of "OFF."

The user does have to disconnect a male connector 132 (reference FIG. 6D) or equivalent, in order to rotate selector pointer 504 (see 404 in FIGS. 13 and 13-1) . . . and, disconnecting power is exactly the desired user response to an emergency situation. Disconnecting male connector 404 in FIGS. 13 and 13-1 will not compromise the operation of a powered device, since female receptacle assembly 179 (FIG. 6) closes its spring contacts 176 and 178, allowing battery 182 to take over the task of powering its associated device (see also an alternative safeguard in FIG. 6E, and related text in the section "Diode UPS").

Reconfiguring Input Power

As indicated in the section "Software Operation," power box 400 (FIG. 13A) and its associated software 800 (FIGS. 1A-1–1A-9) are capable of communicating with its input power source (reference module 100 in FIG. 2). Software 800 manipulates resistor array 509 in power box 400, adding resistive elements to create a discernible change in the overall load detectable at input powerlines 505 and 507 (powerlines 505 and 507 in FIG. 13A are the same as powerlines 114 and 116 in FIG. 2). Such is the case in software step 997. When a voltage match at selector 337 has been achieved, LED 402 is illuminated full ON (step 996). In conjunction with this, a discernible power load is created, by inserting a load from resistor array 509 on powerlines 505 and 507, as a non-limiting example.

This pre-determined increase in load from resistor array 509 in FIG. 13A is sensed by power module 100 in FIG. 2, which is already delivering a voltage (3–5 VDC, for example) to power box 400 in FIG. 13A. This increase in line load indicates to software 101 (FIGS. 1-1–1-4) resident on MCU 102 (FIG. 2) that power box 400 has issued a call for increased power. Power module 100 responds by increasing power supply 122's output voltage to a predetermined value, for example, 28 VDC.

Software 800 in power adapter 400 samples input line voltage at MCU 102's A/D I/O Port #2 (518), and detects the change in input voltage from a low voltage (3–5 VDC, for example), to the new higher voltage (see software steps 995 and 993). Sufficient input power for DC/DC converter 122A is now available.

Resets and Resumes

Although it is acceptable for MCU to go off-line momentarily during the change in its input voltages described above in "Reconfiguring Input Power," this would not be the best method for such a transition. Among the many reasons why a full shutdown of all systems in power adapter 400 is inadvisable is that the timing of such an event would be difficult to determine without a reliable communications link between power box 400 (FIG. 13A) and power module 100 (FIG. 2). As a non-limiting example, power box 400 could shut down, not realizing that power module 100 had not received power box 400's signal to increase voltage. Although the risk-tolerant design of power box 400 and its software 800 allow for a clean recovery from a shut down, this would pose some awkwardness, not the least of which is that a user who had just finished receiving a voltage match confirmation (as a solidly lit LED 402), would see the LED go out for a brief period of time.

Software 800, in its shutdown mode (not detailed in software flowchart 800 (FIGS. 1A-1–1A-9)), loops back to step 807, but not before writing all stored values to non-volatile memory. Such a reset allows software 101 to recover, and to even go back to the last executed step prior to shutdown, if necessary. As a default, this mode of resuming from the last-executed line of code is not prudent. First, depending on where in the sequence of interrelated event sequences software 800 shuts down, a user may perform some undetected and undesirable activity, such as removing a connector 132 in FIG. 13A, and reinserting it in an unwanted position. This could happen, since the extinguished LED could precipitate such user behavior.

Another reason to consider not employing a full resume after shut down is that power adapter 400 does not have a battery backed-up clock. A first user, seeing the LED extinguish during a planned input voltage change, could disconnect power box 400 (FIG. 13A) from its power module 100 (FIG. 2) at connector 103. This first user may leave and, some indeterminate time later, a second user may connect a different power adapter 400 to the same power module 100. Neither device can distinguish this series of events as being anything different than a momentary shutdown of power adapter 400, while power module 100 reconfigures its output voltage. It is much safer, and efficient, to treat every shutdown as the termination of all activity. Resetting at software step 807 is the only reliable way to deal with all such critical error events. The only reasonable reset-and-resume event in software 800 is the voltage transition at step 965.

Keeping the MCU Up

Instead of shutting down MCU 102A (FIG. 13A) momentarily while power module 100 in FIG. 2 switches from a low voltage output to a higher voltage that is required to drive power converter 122A, MCU 102A can be kept active by traditional temporary power storage methods. These hold-up methods can include an internal battery. (see also FIGS. 6E to 6F-1, and related text in the section "Diode UPS").

User Prompts

Step 991, and 989 (FIGS. 1A-1–1A-9) indicate prompts to a user. The first prompt is to reattach a male connector 540 (reference FIG. 6D) to its power cord. If the cord and male connector are hardwired, this prompt is not required. Step 989 prompts a user to insert a male connector 540 to a battery pack in its Position #2 (see FIG. 6C). If there is no adequate prompting method, such as a display screen, series of LEDs (see FIGS. 1-1–1-44), etc., then steps 965 and 967 are not executed.

Whether software 800 has user prompts available is not very material. Users only have to perform elemental, easily-executed connector-related events. LED 402 available on power box 400 (FIG. 13A) can be an effective way of signaling a user to move the process along. This method must be used with caution, so as not to confuse a user who only expects to see LED activity while engaged in rotating voltage selector dial 337. A multi-color LED can be beneficial here, perhaps with a label suggested by the non-limiting example in FIGS. 1-1–1-44.

Power Delivery

After the correct output voltage "Vout" is configured (software step 969) at power converter: 122A in FIG. 13A, software 800 activates the output of power converter 122A in step 965. If optional power switch 526 is employed, it is held open at this point. The output of converter 122A is thus available on the main powerlines 523 and 524. It is desirable not to have power flow into battery 508B's circuitry until after the correct Vout of power converter 122A is verified by to MCU 102 A. A/D I/O lines 525 and 527 can be used to confirm that converter 122 A is delivering the correct voltage. However, since MCU's A/D lines 525 and 527 are downstream of power switches 526 and 526A, the way to prevent power delivery to a battery circuit 508B is to include a controllable power switch 508G in the battery's circuit. Battery MCU 102D controls power switch 508G. MCU 102A in power box 400 communicates a request to open switch 508G by powerline modulation to battery 508B's MCU 102D (as described in the sections "Data Paths," and "Other Data Links").

Software step 953 compares MCU 102A's commanded voltage to converter 122A with the actual output of converter 122A. If there is a mismatch, error 959 is reported, and software 800 loops back to step 969 to configure the converter once more. If both the commanded voltage and the actual output voltage match in step 953, software 800 signals MCU 102A to open switch 526. Power then flows along powerlines 523 and 524 to connector 508, then along power cord 508A, into connector 132, then through battery pack 508B's wiring, and finally into powered device 508C.

Two line-load checks are performed in software steps 951–933. These two line-load samplings constitute a final check that the power circuitry from power box 400 to powered device 508C is still intact. Previously-stored line load value $LL^G$ (see step 971) is retrieved from memory 518A Look-up table 990's value $LL^5$ (FIG. 20) is used as a baseline, since Ohm value $LL^5$ is a valid load value that tested the entire circuit.

Software step 951 acquires this line load value. In step 949, a calculation is made to provide an Ohm value at the new output voltage that is equivalent to the $LL^5$ Ohm value previously acquired in step 981 at a lower voltage. This value is stored in memory as $LL^6$. Finally, in step 957, the newly-acquired Ohm value $LL^6$ is compared to $LL^5$. If the values (with this mathematical adjustment for different voltages) are the same, a user prompt is displayed that the powered device can be turned on (step 929).

Voltage Compensation

The line-load sampling sequence in steps 917–913 utilizes resistive load 517 at MCU 102A's A/D I/O port #4 (conductors 522A and 527 in FIG. 13A). This load test provides an opportunity to observe how power converter 122A responds to a reasonable simulation of a total system load. The load at A/D I/O Port #4 should be in the range of 600–900 mA. 750 mA is a reasonable value. Step 937 samples line voltage, while the additional load in steps 917–913 is still applied. If the output voltage of power converter 122A drops by 5% or more (step 913), step 911 increases converter 122A's output voltage by 10%.

This voltage compensation step is not necessary if power converter 122A's design adequately protects against voltage sags. In reality, power converter 122A cannot be a perfect power conversion device across its 3–24 volt output range. So, performing a voltage compensation sequence is a reasonable way to enhance a power converter 122A's inherent voltage stability limitations.

Is It On?

The issue of user prompts, or lack thereof, has already been addressed. Power box 400 in FIG. 13A continues to monitor (step 909) powerline activities throughout its operational use. Repeated samplings of line load can provide information as to whether a powered device 508C has been turned ON (and later, turned OFF). Steps 927–923 are a repeat of software 800's previous line-load sequence in steps 951–945, except the newly acquired Ohm value $LL^1$ is compared to the stored $LL^6$ value. If $LL^7$ expresses more load than $LL^6$, then it is reasonable to assume that the increase can be attributed to the powered device 508C being turned ON. The value of $LL^7$ is stored in memory 518A.

Software 800 continues to sample line load by repeating steps 927–923. As long as a reported value of an $LL^1$ that is greater than $LL^6$ is reported, software 800 assumes that powered device 508C (FIG. 13A) is still turned ON. If an $LL^6$ value is acquired, it can be safely assumed that powered device 508C has been turned OFF, and that power cord 508A and connector 132 are still attached to battery pack 508B. One cannot compare any acquired $LL^7$ value to any other. Powered devices exhibit dynamic, not static, loads, so the only valid logic statement that can be used is that if an $LL^7$ is greater than the stable value of $LL^6$, the device must be ON.

Line-voltage samplings are also continued. If line voltages fluctuate, either upward or downward, software 800 can correct any irregularities by issuing commands to power converter 122A to increase or decrease the Vout setting. These sequences are not specifically defined in software flowchart 800 (FIGS. 1A-1–1A-9), but the numerous references to line voltage sampling and voltage commands allow one skilled in the art to add these software functions. This process shouldn't be over-done. All power converters exhibit some voltage fluctuations, so the use of software compensation is to be done sparingly and judiciously. An important element that will moderate excessive voltage compensations is the duty cycle at which voltage samples are acquired. The more frequent the sampling rates, the more probable will be unnecessary software-driven voltage compensations. Also, any individual voltage compensation should be evaluated relative to the baseline voltage Vout in step 969.

Helpful information to avoid excessive voltage compensations 911 in FIGS. 1A-1–1A-9 can include tracking voltage adjustment trends. A consistent pattern of upward adjustments is a reasonable indicator that the baseline voltage stored in step 957 was too low. Determining an increase in baseline voltage is not a simple matter, so it should always be approached cautiously and with a substantial, long-term voltage history to support the decision. As a non-limiting example, if power is being delivered to a laptop computer, initial deviations in load (which precipitate voltage fluctuations) are usually created by the BIOS POST activities, as powered sub-systems and devices are intentionally turned ON and OFF. These hardware activities are not representational of anything but BIOS diagnostics. Hardware devices cycled ON and OFF during the BIOS POST may never be called upon during later user operations.

Line-voltage monitoring steps 921–913 in software 800 (FIGS. 1A-1–1A-9) are also used to determine a specific user activity, namely, disconnecting power by removing connector 132 from battery pack 508B FIG. 13A). As soon as a 0-volt state is detected in step 938, MCU 102 A and software 800 immediately issue a shutdown command to power converter 122A. Precursors of this disconnect state include changes in line load which are identified with an Ohm value previously identified as $LL^6$. Ohm value $LL^6$ corresponds to powered device 508C being turned OFF. If the answer to software test in step 945 is FALSE (NO), software 800 commands power conventer 122A in FIG. 13A to shut down.

Although the description above contains many specificities, these should not be construed as limiting the scope of the invention, but as merely providing illustrations of some of the presently-preferred embodiments of this invention. The scope of the invention should be determined by the appended claims and their legal equivalents, rather than by the examples given.

I claim:

1. A system for selecting and applying a proper operating voltage for a previously undetermined battery-powered device, comprising:

means for sampling battery voltage of the previously undetermined battery associated with said powered device, to produce a sampled battery voltage;

means for providing a reference voltage;

means for comparing said sampled battery voltage and said reference voltage;

means for adjusting said reference voltage and selecting a value of said reference voltage that most closely matches said sampled battery voltage; and means for powering said powered device from a power source having an output voltage equal to said selected value of said reference voltage in the absence of said battery being connected to said powered device.

2. The system as claimed in claim 1, comprising:

means for providing a visual indication signifying that said sampled battery voltage and said adjusted reference voltage are most closely matched.

3. The system as claimed in claim 2, comprising:

means for choosing the next higher value of reference voltage when said sampled battery voltage is in between two values of reference voltages, one value being below said sampled battery voltage and one value being above said sampled battery voltage.

4. The system as claimed in claim 1, comprising:

means for protecting said power source from being inadvertently connected to said battery.

5. An apparatus for applying a power signal to previously undetermined battery-powered device, comprising:

a transportable power-conversion module having two sets of at least two conductors each, the first set terminating at a source of power, and the second set terminating at a connector interface interposed at an I/O port of said device for selectively accessing said device and said battery, said module further including:

a processor/controller for executing program instructions for acquiring information from the previously undetermined battery as the basis for computing a reference voltage for adjusting an output of a configurable regulator;

a user-manipulable selector also for adjusting said regulator to a voltage value;

a visual indicator for prompting a user as to whether a selected value is valid or invalid, based on the processor/controller comparing each selected value to the reference voltage value;

further program instructions for transferring adjusted voltage information from a local non-volatile memory area to an accessible non-volatile memory area associated with the device;

the user having selected a valid voltage value, said processor/controller provides a distinguishable prompt to said user, configures said regulator to output a power signal, and writes voltage value information to said memory area of the device, whereby the power signal is applied to the now-determined device, and later retrieval of information about the power signal from memory associated with said device eliminates future user manipulation of the selector.

6. The apparatus of claim 5, further including a second connector located at the module-terminus of said second set of conductors for detaching said conductors from the module as a removable power cord, said memory area being electrically coupled to the conductors either at said connector interface, or at the second connector;

said processor/controller writes said adjusted voltage value to the memory by varying power signals output from said regulator according to a format compatible with the memory, and by the user later reattaching the now-configured power cord to the apparatus, said processor retrieves the previously stored voltage value from the memory at the second connector, compares the value to voltage values previously stored in said local non- volatile memory, then configures the output of said regulator.

7. The apparatus of claim 6, wherein said connector interface is also electro-mechanically compatible with a pre-existing power-input jack of the device.

8. The apparatus of claim 5, wherein said processor/controller writes said adjusted voltage value to an accessible non-volatile memory area at the device, then later retrieves the voltage value from the device's memory when the user reattaches said module to said device and, after comparing the retrieved value to those previously stored in the local memory, said processor/controller configures the output of said regulator.

9. The apparatus of claim 8, wherein said non-volatile memory area is located in the power-input circuit of the device, so that reattaching said device to the apparatus at its power-input jack provides said processor/controller access to the device's memory area by applying a predetermined power signal from the regulator to the memory, thereby eliminating the need to turn on the device in order to access the memory.

10. The apparatus of claim 8, further including a modulator/demodulator at both the apparatus and the device for transferring voltage value information by the processor/controller modulating said predetermined power signal along two conductors.

11. The apparatus of claim 8, further including a dedicated data I/O connector located on the external housing of the apparatus for mating to a compatible connector located on an accessible external surface of the device, thereby eliminating data-specific conductor-cables.

12. The apparatus of claim 5, further including wireless communications for transferring power-related information between the memory areas at said apparatus and at said device.

13. The apparatus of claim 5, wherein the memory area is in the device at a location accessible to the apparatus via the I/O port, and the apparatus further includes program instructions for, upon the user reattaching the apparatus to the I/O port, causing the processor/controller to retrieve from the memory the previously-stored voltage value as the basis for then configuring the output voltage of the regulator, thereby eliminating any user manipulation.

14. The apparatus of claim 5, further including a spring-driven rotating reel onto which said power cord is retracted and stowed;

a latching mechanism that prevents the extended cord from inadvertently retracting while in use, the unlatching of which is by the user applying a slight over-extension motion to the already extended cord, then releasing said cord;

a receiving housing for capturing said connector plug so that the plug still remains accessible to the user when the cord is in its fully retracted configuration.

15. The apparatus of claim 5, wherein said user-manipulable selector is a positionable dial upon which an indicia of a multiplicity of selectable voltage values is displayed.

16. The apparatus of claim 5, wherein said user-manipulable selector is a screen displaying an image that shows the voltage value that the user has selected by manipulating a data-input device.

17. An apparatus for applying a power signal to a battery-powered device, comprising:

a module as a battery enclosure of a dimensional size and shape to fit within an existing battery compartment of said device;

a connector interface located along a suitable exterior surface of the enclosure so as to mate with an existing interface in the battery compartment when the enclosure is installed into the battery compartment;

a connector receptacle exposed along an accessible face of the installed enclosure at which a user connects a mateable plug that is electrically coupled at the terminus of at least two conductors directed to a power source;

a processor for executing program instructions;

a memory area for storing power-related information;

an A/D converter accessible to said processor capable of receiving a wide range of input power signals from either AC or DC power sources;

a first regulator for converting input AC power signals to a DC signal that is compatible with the anticipated power-input requirements of the device;

a second regulator for converting input DC power signals to an output signal that is compatible with said power-input requirements, and at least one energy storage element as a source of power for said device and internal circuitry of the apparatus.

18. An apparatus for applying a power signal to a previously undetermined battery-powered device, comprising:

a transportable intermediate module for interconnecting between said device and an AC/DC or DC/DC power-conversion peripheral that requires a user to select from a multiplicity of available voltages a valid output voltage for adjusting the power signal to the device;

two sets of at least two conductors each:

the first set being for receiving power signals from the peripheral, the conductors terminating at a user-accessible receptacle for accepting a power-output plug of the peripheral;

the second set being for power output from the module, with conductors terminating at a connector interface interposed at an I/O port of said device, said interface providing selective access to said device and said battery;

a processor/controller including program instructions for acquiring power-related information from the battery as the basis for computing a reference voltage value that is adjusted to optimize said reference voltage value for each specific device, a now-optimized voltage value being written to an area of non-volatile memory;

as the user makes selections, a visual indicator prompts the user as to whether a selected value is valid or invalid, based on the processor/controller acquiring and comparing each distinct power signal received;

said processor/controller also for controlling a switch which prevents any invalid received voltage from passing through the module to the device;

said processor/controller provides a distinguishable prompt to said user after the user having selected a valid voltage value, and then allows the power signal from the peripheral to flow to the device.

19. A system for applying a power signal to at least one of one or more previously undetermined battery-powered devices attached thereto, comprising:

an embedded apparatus having an exposed connector receptacle as a port to which a user connects a device by attaching a compatible connector plug of a power cord, said cord comprised of at least two conductors;

at least two conductors for attaching said apparatus to a power source, and said apparatus further comprising:

a processor/controller for executing program instructions;

an A/D converter accessible to said processor/controller for acquiring power signals from the attached device;

a voltage regulator capable of having its output power signals configured by said processor/controller;

a memory area for storing power-related information; and an indicator capable of varying its visual characteristics, for prompting said user, whereby the user attaching the device to the power port causes the processor to acquire information about the device's power requirements, so as to configure the controllable regulator to output a power signal compatible with said device, then activating the indicator to prompt the user that the device is being powered.

20. The system of claim 19, further including in the apparatus a spring-driven rotating reel onto which said power cord is retracted and stowed;

a latching mechanism that prevents the extended cord from inadvertently retracting while in use, the unlatching of which is by the user applying a slight over-extension motion to the already extended cord, then releasing said cord;

a receiving housing for capturing said connector plug so that the plug still remains accessible to the user when the cord is in its fully retracted configuration.

21. The system of claim 19, further including in the apparatus wireless communications for transferring power-related information between the said apparatus and said device.

22. The system of claim 19, wherein said indicator is a display screen for prompting the user.

23. The system of claim 19, further including additional program instructions for acquiring machine readable data that was previously written to a memory area located in said power cord so as to be now accessible to the processor/controller, whereby retrieving from the memory at the power cord data for determining the power requirements of the device enables the processor/controller to configure said regulator to output the power signal to said device.

* * * * *